US012595178B2

(12) United States Patent  
Hirano et al.

(10) Patent No.: US 12,595,178 B2  
(45) Date of Patent: Apr. 7, 2026

(54) FILM-LIKE GRAPHITE, MANUFACTURING METHOD FOR SAME, AND BATTERY USING SAME

(71) Applicant: Mitsubishi Chemical Corporation, Tokyo (JP)

(72) Inventors: Kenji Hirano, Tokyo (JP); Keisuke Wada, Tokyo (JP); Tomoyoshi Yamashita, Tokyo (JP); Norimichi Kawabe, Tokyo (JP); Takuya Suzuki, Tokyo (JP); Miwa Yanagidate, Tokyo (JP); Kouhei Takatani, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 165 days.

(21) Appl. No.: 18/354,942

(22) Filed: Jul. 19, 2023

(65) Prior Publication Data

US 2023/0357022 A1 Nov. 9, 2023

Related U.S. Application Data

(63) Continuation of application No. PCT/JP2022/001986, filed on Jan. 20, 2022.

(30) Foreign Application Priority Data

| | | |
|---|---|---|
| Jan. 20, 2021 | (JP) | 2021-007441 |
| Feb. 19, 2021 | (JP) | 2021-024960 |
| Mar. 3, 2021 | (JP) | 2021-033870 |
| Nov. 30, 2021 | (JP) | 2021-194427 |
| Dec. 16, 2021 | (JP) | 2021-204228 |
| Dec. 16, 2021 | (JP) | 2021-204500 |

(51) Int. Cl.  
*C01B 32/205* (2017.01)  
*H01M 4/587* (2010.01)

(52) U.S. Cl.  
CPC ........... *C01B 32/205* (2017.08); *H01M 4/587* (2013.01); *C01P 2002/88* (2013.01); *C01P 2004/02* (2013.01); *C01P 2004/03* (2013.01); *C01P 2006/10* (2013.01); *C01P 2006/32* (2013.01); *C01P 2006/40* (2013.01)

(58) Field of Classification Search  
CPC ...... C01B 32/205; C01B 32/21; H01M 4/587; H01M 4/663; H01M 10/0525; H01M 2004/027; C01P 2002/88; C01P 2004/02; C01P 2004/03; C01P 2006/10; C01P 2006/32; C01P 2006/40; B32B 2307/202; B32B 2307/302; B32B 2307/72; B32B 2307/7376; B32B 2457/10; B32B 7/12; B32B 9/007; B32B 9/04

See application file for complete search history.

(56) References Cited

U.S. PATENT DOCUMENTS

| | | | |
|---|---|---|---|
| 2007/0013094 A1* | 1/2007 | Bischofsberger | ..... A61L 31/084 264/29.6 |
| 2010/0062220 A1 | 3/2010 | Nishikawa | |
| 2010/0196716 A1 | 8/2010 | Ohta et al. | |
| 2015/0044364 A1* | 2/2015 | Katayama | ............. C04B 35/522 427/227 |
| 2015/0086881 A1* | 3/2015 | Zhamu | ................... H01G 11/68 429/231.95 |
| 2019/0233293 A1 | 8/2019 | Won et al. | |
| 2021/0017438 A1* | 1/2021 | Murashima | ............. H01L 23/36 |

FOREIGN PATENT DOCUMENTS

| | | |
|---|---|---|
| JP | 2007-031237 A | 2/2007 |
| JP | 2007-204301 A | 8/2007 |
| JP | 2008-024571 A | 2/2008 |
| JP | 2009-295921 A | 12/2009 |
| JP | 2010-189267 A | 9/2010 |
| JP | 2011-088817 A | 5/2011 |
| JP | 2016-153356 A | 8/2016 |
| JP | 2017-11 4098 A | 6/2017 |
| JP | 2019-131459 A | 8/2019 |
| WO | WO 2006/129632 A1 | 12/2006 |
| WO | WO 2019/212284 A1 | 11/2019 |

OTHER PUBLICATIONS

English Translation for Bischofsberger et al (WO 2004/101433 A2) (Year: 2004).*  
International Search Report issued Apr. 5, 2022 in PCT/JP2022/001986 filed on Jan. 20, 2022 2 pages.  
Japanese Notice of Reasons for Refusal issued Jul. 30, 2024 in Japanese Application No. 2022-576741 with English Machine translation, 12 pgs.  
Extended European Search Report issued Sep. 26, 2024 in European Patent Application No. 22742648.3, 10 pages.

* cited by examiner

*Primary Examiner* — Nathan L Van Sell

(74) *Attorney, Agent, or Firm* — Oblon, McClelland, Maier & Neustadt, L.L.P.

(57) ABSTRACT

A film-like graphite that satisfies the following condition (1) or condition (2) described below. Condition (1): a graphite crystal orientation degree P is 96% or more with respect to a film plane. Condition (2): a graphite crystal orientation degree P is 94% or more with respect to a film plane and a thickness is 42 μm or more.

30 Claims, 12 Drawing Sheets

FILM-LIKE GRAPHITE, MANUFACTURING METHOD FOR SAME, AND BATTERY USING SAME

CROSS-REFERENCE TO RELATED APPLICATIONS

The present application is a bypass continuation of international application PCT/JP2022/001986, filed on Jan. 20, 2022, and claims the benefit of the filing date of Japanese Appl. No. 2021-007441, filed on Jan. 21, 2021, Japanese Appl. No. 2021-024960, filed on Feb. 19, 2021, Japanese Appl. No. 2021-033870, filed on Mar. 3, 2021, Japanese Appl. No. 2021-194427, filed on Nov. 30, 2021, Japanese Appl. No. 2021-204228, filed on Dec. 16, 2021, and Japanese Appl. No. 2021-204500, filed on Dec. 16, 2021, the content of each of which is incorporated by reference.

TECHNICAL FIELD

The present invention relates to a film-like graphite that is thick, has a high thermal conductivity, is excellent in a heat dissipation performance, and furthermore is excellent in flexibility, a manufacturing method of the same, and a battery using the same.

BACKGROUND ART

The data processing capacity of electronic devices such as smartphones has been significantly improved, and the amount of heat generation has also increased remarkably. On the other hand, electronic devices have become smaller and thinner, and a heat dissipation body inside an electronic device is required to have higher performance and lighter weight. A film-like graphite has been known as a flexible heat dissipation body that is excellent in the heat dissipation performance and lighter in weight than metal or other materials (for example, Patent Documents 1 to 6).

In addition, it is desired that lithium-ion batteries and all-solid batteries rapidly remove, in particular, heat generated during quick charging to prevent overheating.

CITATION LIST

Patent Documents

[Patent Document 1]
PCT International Publication No. WO2006/129632
[Patent Document 2]
Japanese Unexamined Patent Application, First Publication No. 2017-114098
[Patent Document 3]
Japanese Unexamined Patent Application, First Publication No. 2008-24571
[Patent Document 4]
Japanese Unexamined Patent Application, First Publication No. 2010-189267
[Patent Document 5]
Japanese Unexamined Patent Application, First Publication No. 2007-031237
[Patent Document 6]
Japanese Unexamined Patent Application, First Publication No. 2016-153356

SUMMARY OF INVENTION

Technical Problem

In recent years, as the higher heat dissipation performance has been required, the demand for a film-like graphite that is thicker and has a higher thermal conductivity than those in the related art has increased. However, it is difficult to manufacture the film-like graphite that is thicker and has a higher thermal conductivity.

Film-like graphite is typically obtained by a polymer film, which is typified by polyimide, being heated to 2,400° C. or higher. However, when a thick polymer film is used, a part of a film surface is likely to be peeled off due to decomposition gas generated from the surface and the inside of the film during heating, or the film is likely to be broken due to foam occurring in the film. Therefore, the film-like graphite may not be obtained, and even though the film-like graphite is obtained, the thermal conductivity is likely to decrease. Even though the temperature is gradually increased to avoid the issue due to decomposition gas, a film-like graphite with low flexibility is likely to be formed.

Therefore, in order to ensure the required heat dissipation performance, it is necessary to use a plurality of thin film-like graphite sheets in an overlapping manner. However, the heat dissipation performance of a laminate as a whole deteriorates because a material having a low thermal conductivity such as an adhesive is used when the plurality of film-like graphite sheets are laminated. Therefore, it has been important to develop a thick film-like graphite with a high thermal conductivity that is formed of a film-like graphite alone and has the sufficient heat dissipation performance.

It is disclosed in Patent Document 1 that a film-like graphite having a maximum thickness of 57 μm is manufactured from a polymer film having a thickness of 125 μm by an electric heating method. However, the thickness of the film-like graphite disclosed in Patent Document 1 is insufficient.

It is disclosed in Patent Document 2 that a surface of a polyimide film is roughened, two polyimide films are laminated to increase the thickness, thereby obtaining a laminated film, and a film-like graphite having a maximum thickness of 160 μm is manufactured from the laminated film. However, in Patent Document 2, despite the fact that the processing in a graphitization step is performed at a temperature increase rate as relatively low as 3° C./min, foaming cannot be sufficiently reduced, and there is room for further improvement in the thermal conductivity.

It is disclosed in Patent Document 3 that when a polymer film having a thickness of 80 μm or more and 300 μm or less is used, a temperature increase rate is set as low as 2° C./min or lower in the graphitization step to suppress the amount of foaming gas per unit time, thereby obtaining a thick film-like graphite. However, when the temperature increase rate in the graphitization step is lowered, and the time required for the graphitization step becomes long, the productivity of the film-like graphite is deteriorated, and the graphite structure is excessively grown, which can cause insufficient flexibility. Therefore, deterioration in handleability, for example, an increase in the damage probability of the film-like graphite is caused during processing such as cutting out the film-like graphite into a desired size for a device such as a smartphone or bonding the film-like graphite to an adhesive.

It is disclosed in Patent Document 4 that a foamed state of a graphitized film can be known by the confirmation of the amount of boundary lines (wrinkles) from an SEM image of a surface of the graphitized film, and according to the confirmation result, the superiority or inferiority of bending resistance can be predicted. However, the graphitized film disclosed in Patent Document 4 has insufficient thermal conductivity.

It is disclosed in Patent Document 5 that it is possible to provide a graphitized film that includes a graphite layer formed close to a film surface with the very high density and a mixture layer of an air layer and a graphite layer rich in the air layer formed inside the graphitized film, thereby achieving both the high thermal conductivity and flexibility. However, the graphitized film obtained by this method also has insufficient thermal conductivity.

It is disclosed in Patent Document 6 that a thermal conductivity of 1,800 W/mK can be achieved by the reduction in a thickness of a graphite sheet to 9.6 μm or less. However, the amount of heat transport depends on both the thermal conductivity and the thickness, and the amount of heat transport also decreases when the film thickness is thin.

As described above, the methods of obtaining a film-like graphite having excellent thermal conductivity have been studied from the past. However, particularly with regard to a thick film, only those having a low thermal conductivity have been obtained, and a film-like graphite has been demanded with high thermal conductivity maintained regardless of the film thickness.

In addition, while the film-like graphite has high heat dissipation performance, the film-like graphite is expensive as compared with other heat dissipation bodies. One of the causes is that the film shrinks during the manufacturing of the film-like graphite, and an area ratio to a polymer film which is a raw material is about 70% to 75%.

In lithium-ion secondary batteries and all-solid batteries, it is common to use aluminum foil as a cathode current collector and copper foil as an anode current collector. Although such metal foil has high electrical conductivity, there has been a demand for a material having higher thermal conductivity in order to rapidly remove heat generated during quick charging to prevent overheating.

An object according to one aspect of the present invention is to provide a film-like graphite that is thick, has a high thermal conductivity, is excellent in a heat dissipation performance, and furthermore is excellent in flexibility, with low-cost manufacturing, and a manufacturing method of the film-like graphite.

In addition, an object according to another aspect of the present invention includes providing a film-like graphite that has a high thermal conductivity and is excellent in a heat dissipation performance, particularly a film-like graphite that has an excellent thermal conductivity even though the film is thick, and providing a manufacturing method of the film-like graphite.

An object according to still another aspect of the present invention includes providing a film-like graphite that is thick, has a high thermal conductivity, is excellent in a heat dissipation performance, and furthermore, has a high electrical conductivity, and a lithium-ion battery and an all-solid battery, in which the film-like graphite is used as a current collector.

Solution to Problem

A first aspect of the present invention has the following aspects.

[1] A film-like graphite that satisfies the following condition (1) or condition (2),
  Condition (1): a graphite crystal orientation degree P is 96% or more with respect to a film plane,
  Condition (2): a graphite crystal orientation degree P is 94% or more with respect to a film plane and a thickness is 42 μm or more.

[2] A film-like graphite that satisfies the following condition (3) or condition (4),
  Condition (3): a film thickness a (μm) is 58 μm or more and a thermal conductivity b (W/mK) is 800 W/mK or more in a direction along a film plane,
  Condition (4): a film thickness a (μm) is 50 μm or more, a thermal conductivity b (W/mK) is 1,350 W/mK or more in a direction along a film plane, and a×b≥100,000.

[3] A film-like graphite, wherein a product (a×b) of a film thickness a (μm) and a thermal conductivity b (W/mK) in a direction along a film plane is 88,000 or more.

[4] The film-like graphite that satisfies the following condition (5) and condition (6) according to any one of [1] to [3], wherein
  Condition (5): when a film thickness is denoted by a (μm) and a thermal conductivity is denoted by b (W/mK) in a direction along a film plane, the film-like graphite satisfies Expression 1a, $$2{,}140 \leq 12a + b \qquad \text{Expression 1a}$$

Condition (6): a minimum bending radius measured in a bend test is 16 mm or less.

[5] A film-like graphite, wherein a number N of a plurality of bright regions obtained from an image in a vertical cross-section of the film-like graphite with respect to a film plane, in which bright parts and dark parts observed in a polarization microscope image are binarized, a film thickness H (μm), and a film width W (μm) satisfy Expression 7 or Expressions 8 and 9, $$N/H/W \leq 0.015 \qquad (7)$$

$$N/H/W \leq 0.04 \qquad (8)$$

$$H \geq 42 \qquad (9).$$

[6] A film-like graphite, wherein an average area of a plurality of bright regions obtained from an image in a vertical cross-section of the film-like graphite with respect to a film plane, in which bright parts and dark parts observed in a polarization microscope image are binarized, is 22 μm² or more, or a film thickness is 42 μm or more and the average area is 9 μm² or more.

[7] The film-like graphite according to any one of [1], and [3] to [6], wherein the film-like graphite has a thickness of 58 μm or more.

[8] The film-like graphite according to any one of [1], and [3] to [7], wherein the film-like graphite has a thermal conductivity b (W/mK) of 800 W/mK or more in the direction along the film plane. [9] The film-like graphite according to any one of [1] to [8], wherein the film-like graphite has a density of 1.7 g/cm³ or more.

[10] The film-like graphite according to any one of [1] to [9], wherein the film-like graphite has an electrical conductivity of 9,000 S/cm or more in a direction along the film plane.

[11] The film-like graphite according to any one of [1] to [10], wherein the film-like graphite has a multilayer structure in which a plurality of layers overlap with each other, the multilayer structure has a width of 40 μm or more and a thickness of 8 μm or more, and an angle between a direction of each layer constituting the multilayer structure and a direction along the film plane is 200 or less.

[12] The film-like graphite according to [11], wherein each layer constituting the multilayer structure has a large number of unevenness, and adjacent layers are in contact with each other at a large number of positions.

[13] The film-like graphite according to [11] or [12], wherein each layer constituting the multilayer structure has a flat surface or a smooth curved surface, and adjacent layers are in close contact with each other.

[14] The film-like graphite according to any one of [1] to [3] and [5] to [13], wherein a minimum bending radius measured in a bend test is 16 mm or less.

[15] The film-like graphite according to any one of [1] to [14], wherein when a pressure of 100 MPa is applied to the entire film plane of the film-like graphite to compress the entire film plane in an environment of 25° C., a ratio ($T_a/T_b$) of a film thickness $T_a$ after compression to a film thickness $T_b$ before compression is 0.7 or more.

[16] The film-like graphite according to any one of [1] to [15], wherein in Tension-Free U-shape Folding Test, a folding number is 10,000 or more until breakage when measurement are performed at a bending radius R of 2 mm and a bending angle of 180°.

[17] The film-like graphite according to any one of [1] to [16], wherein the film-like graphite has a thermal conductivity of 1 W/mK or more and 20 W/mK or less in a direction perpendicular to the film plane.

[18] The film-like graphite according to any one of [1] to [17], wherein a ratio (surface area/film area) of a surface area to a film area is 1.05 or more.

[19] The film-like graphite according to any one of [1] to [18], wherein a layer formed of an adhesive or a pressure-sensitive adhesive is not included in the film-like graphite in a film thickness direction.

[20] The film-like graphite according to any one of [1], [2], and [4] to [19], wherein a product (a×b) of a film thickness a (μm) and a thermal conductivity b (W/mK) in a direction along a film plane is 88,000 or more.

[21] The film-like graphite according to any one of [1] to [4], and [6] to [20], wherein a number N of a plurality of bright regions obtained from an image in a vertical cross-section of the film-like graphite with respect to a film plane, in which bright parts and dark parts observed in a polarization microscope image are binarized, a film thickness H (μm), and a film width W (μm) satisfy Expression 7 or Expressions 8 and 9, $$N/H/W \leq 0.015 \qquad (7)$$

$$N/H/W \leq 0.04 \qquad (8)$$

$$H \geq 42 \qquad (9).$$

[22] The film-like graphite according to any one of [1] to [5], and [7] to [21], wherein an average area of a plurality of bright regions obtained from an image in a vertical cross-section of the film-like graphite with respect to a film plane, in which bright parts and dark parts observed in a polarization microscope image are binarized, is 9 μm² or more, or a film thickness is 42 μm or more and the average area is 9 μm² or more.

[23] A manufacturing method for a film-like graphite comprising a heating step of heating a raw film made of an organic polymer to obtain a film-like graphite, wherein in the heating step, a laminated film in which two or more polymer films made of an organic polymer are bonded to each other by a pressure-sensitive adhesive or an adhesive is used as the raw film.

[24] A manufacturing method for a film-like graphite comprising:
a carbonization step of carbonizing a raw film made of an organic polymer to obtain a carbonized film; and a graphitization step of graphitizing the carbonized film to obtain a graphitized film,
wherein a film-like graphite that has a thermal conductivity of 800 W/mK or more and a minimum bending radius of 16 mm or less according to a bend test is manufactured from the raw film that has a thickness of 150 μm or more at a maximum value in a temperature increase range of 60° C. or higher during optional 30 minutes in a temperature increase pattern obtained by a monotonic temperature increase in a temperature increase history of 2,000° C. or higher in the graphitization step.

[25] A manufacturing method for a film-like graphite comprising:
a carbonization step of carbonizing a raw film made of an organic polymer to obtain a carbonized film; and
a graphitization step of graphitizing the carbonized film to obtain a graphitized film,
wherein the carbonization step includes a heating step in a mixed gas, in which the raw film is heated in a mixed gas with an organic gas and an inert gas mixed.

[26] The manufacturing method for a film-like graphite according to [25], wherein a mixed gas that contains a gaseous substance (A) consisting of at least one of acetylene or an acetylene derivative, and an inert gas is used as the mixed gas.

[27] The manufacturing method for a film-like graphite according to [25] or [26], wherein at least a part of the heating step in the mixed gas is carried out at a temperature of $T_f$ or lower,
where in a thermogravimetric analysis in which a measurement sample made of the raw film is heated to 1,000° C. at a temperature increase rate of 10° C./min while flowing nitrogen gas at a flow velocity of 200 mL/min, and a temperature and a weight of the measurement sample are recorded, $T_f$ (° C.) is a highest temperature among temperatures at which a weight reduction rate (weight reduction per unit time) of the measurement sample observed is 10% or more of a maximum value of the weight reduction rate.

[28] The manufacturing method for a film-like graphite according to [27], wherein a period of 30 minutes or more in which an average temperature increase rate is 5° C./min or less is included in a temperature range of $T_s$ or higher and $T_f$ or lower in a temperature increase pattern obtained by a monotonic temperature increase in a temperature increase history in the heating step in the mixed gas,
where in the thermogravimetric analysis, $T_s$ (° C.) is a lowest temperature among temperatures of 100° C. or higher at which a weight reduction rate of the measurement sample observed is 0.8% or more of a maximum value of the weight reduction rate.

[29] The manufacturing method for a film-like graphite according to any one of [23] to [28], wherein a maximum heating temperature $T_{max}$ in the graphitization step is 2,400° C. or higher and 2,900° C. or lower.

[30] The manufacturing method for a film-like graphite according to any one of [24] to [29], wherein a laminated film in which two or more polymer films made of an organic polymer are bonded to each other by a pressure-sensitive adhesive or an adhesive is used as the raw film.

[31] A manufacturing method for a film-like graphite comprising:
a carbonization step of carbonizing a raw film made of an organic polymer to obtain a carbonized film; and a graphitization step of graphitizing the carbonized film to obtain a graphitized film, wherein a ratio $(S_g/S_m)$ of an area $S_g$ of the graphitized film to an area $S_m$ of the raw film is 0.8 or more.

[32] The manufacturing method for a film-like graphite according to [31], wherein a film-like graphite that has a density of 1.7 g/cm³ or more is obtained from the graphitized film that has a density of less than 1.7 g/cm³ 3 by a press step of compressing or rolling the graphitized film.

[33] A battery that is a lithium-ion secondary battery or an all-solid battery, the battery comprising the film-like graphite according to any one of [1] to [22] that is used as a current collector or a negative-electrode active material and negative-electrode current collector.

[34] The film-like graphite according to any one of [1] to [22], wherein the film thickness is preferably 42 μm or more and 250 μm or less, more preferably 50 μm or more and 200 μm or less, still more preferably 58 μm or more and 180 μm or less, even still more preferably 64 μm or more and 150 μm or less, and yet even still more preferably 72 μm or more and 150 μm or less, particularly preferably 75 μm or more and 150 μm or less, more particularly preferably 80 μm or more and 130 μm or less, even particularly preferably 85 μm or more and 130 μm or less, still particularly preferably 100 μm or more and 130 μm or less, and most preferably 102 μm or more and 120 μm or less.

[35] The film-like graphite according to any one of [1] to [22], and [34], wherein the thermal conductivity in the direction along the film plane is preferably 800 W/mK or more and 2,200 W/mK or less, more preferably 1,000 W/mK or more and 2,200 W/mK or less, still more preferably 1,200 W/mK or more and 2,200 W/mK or less, even still more preferably 1,350 W/mK or more and 2,200 W/mK or less, yet even still more preferably 1,400 W/mK or more and 2,200 W/mK or less, particularly preferably 1,550 W/mK or more and 2,200 W/mK or less, and most preferably 1,600 W/mK or more and 2,200 W/mK or less.

[36] The film-like graphite according to any one of [1] to [22], [34], and [35], wherein the product (a×b) of the film thickness a (μm) and the thermal conductivity b (W/mK) in the direction along the film plane is preferably 88,000 or more and 500,000 or less, more preferably 110,000 or more and 500,000 or less, still more preferably 135,000 or more and 400,000 or less, particularly preferably 140,000 or more and 300,000 or less, and most preferably 160,000 or more and 270,000 or less.

[37] The film-like graphite according to any one of [1] to [22], and [34] to [36], wherein the thermal conductivity in the direction perpendicular to the film plane is preferably more than 0 W/mK and 20 W/mK or less, more preferably 0.5 W/mK or more and 15 W/mK or less, still more preferably 1 W/mK or more and 10 W/mK or less, and particularly preferably 3 W/mK or more and 10 W/mK or less.

[38] The film-like graphite according to any one of [1] to [22], and [34] to [37], wherein the electrical conductivity in the direction along the film plane is preferably 9,000 S/cm or more and 30,000 S/cm or less, more preferably 10,000 S/cm or more and 20,000 S/cm or less, still more preferably 11,000 S/cm or more and 18,000 S/cm or less, particularly preferably 12,000 S/cm or more and 15,000 S/cm or less, and most preferably 1,3500 S/cm or more and 15,000 S/cm or less.

[39] The film-like graphite according to any one of [4] to [22], and [34] to [38], wherein a value of 12a+b represented by Expression 1a is preferably 2,140 or more and 5,000 or less, more preferably 2,200 or more and 4,500 or less, still more preferably 2,250 or more and 4,000 or less, even still more preferably 2,350 or more and 3,800 or less, particularly preferably 2,550 or more and 3,800 or less, and most preferably 2,750 or more and 3,700 or less.

[40] The film-like graphite according to any one of [1] to [22], and [34] to [39], wherein the minimum bending radius is preferably more than 0 mm and 16 mm or less, more preferably more than 0 mm and 13 mm or less, still more preferably more than 0 mm and 10 mm or less, particularly preferably 0 mm or more and 8 mm or less, and most preferably more than 0 mm and 6 mm or less.

[41] The film-like graphite according to any one of [1] to [22], and [34] to [40], wherein the density is preferably 1.7 g/cm³ or more and 2.2 g/cm³ or less, more preferably 1.8 g/cm³ or more and 2.1 g/cm³ or less, and still more preferably 1.9 g/cm³ or more and 2.0 g/cm³ or less.

[42] The film-like graphite according to any one of [1] to [22], and [34] to [41], wherein the film-like graphite has the multilayer structure in which the plurality of layers are overlapped with each other, and a width of the multilayer structure is preferably 40 μm or more and 100 μm or less, more preferably 45 μm or more and 80 μm or less, and still more preferably 50 μm or more and 70 μm or less.

[43] The film-like graphite according to any one of [1] to [22], and [34] to [42], wherein the film-like graphite has the multilayer structure in which the plurality of layers are overlapped with each other, and a thickness of the multilayer structure is preferably 8 μm or more and 20 μm or less, and more preferably 10 μm or more and 15 μm or less.

[44] The film-like graphite according to any one of [1] to [22], and [34] to [43], wherein the film-like graphite has the multilayer structure in which the plurality of layers are overlapped with each other, and the angle between each layer constituting the multilayer structure and the direction along the film plane is preferably more than 0° and 20° or less, more preferably more than 0° and 150 or less, and still more preferably more than 0° and 100 or less.

[45] The film-like graphite according to any one of [1] to [22], and [34] to [44], wherein the film-like graphite has the multilayer structure in which the plurality of layers are overlapped with each other, adjacent layers are in close contact with each other, and no void between the adjacent layers is ascertained in an image of crack propagation in mode I fracture surface of the film-like graphite, which is observed by a scanning electron microscope (SEM), even though the observation is carried out at an acceleration voltage of 10 kV and a magnification of 1,000 times.

[46] The film-like graphite according to any one of [1] to [22], and [34] to [45], wherein when a pressure of 100 MPa is applied to the entire film plane of the film-like graphite to compress the entire film plane in an environment of 25° C., a ratio $(T_a/T_b)$ of a film thickness $T_a$ after compression to a film thickness $T_b$ before compression is preferably 0.7 or more and 1.0 or less, more preferably 0.8 or more and 1.0 or less, and still more preferably 0.9 or more and 1.0 or less.

[47] The manufacturing method for a film-like graphite according to any one of [23] to [32], wherein the thickness of the raw film is preferably 75 μm or more and 550 μm or less, more preferably 125 μm or more and 500 μm or less, still more preferably 150 μm or more and 450 μm or less, even still more preferably 175 μm or more and 400 μm or less, particularly preferably 200 μm or more and 375 μm or less, and most preferably 250 μm or more and 270 μm or less.

[48] The manufacturing method for a film-like graphite according to any one of [23] to [32], and [47], wherein the organic polymer is preferably a polymer that has an aromatic ring, more preferably a polymer that is selected from the group consisting of polyimide, polyamide, polythiazole, polyoxadiazole, polybenzoxazole, polybenzobisoxazole, polybenzothiazole, polybenzobisthiazole, polybenzimidazole, polybenzobisimidazole, and polyparaphenylenevinylene and that has an aromatic ring, and still more preferably polyimide having an aromatic ring.

[49] The manufacturing method for a film-like graphite according to any one of [23] to [32], [47], and [48], wherein the carbonization step includes a heating step in a mixed gas, in which the raw film is heated in a mixed gas with an organic gas and an inert gas mixed, and a concentration of the organic gas in the mixed gas is preferably 2% by volume or more and 95% by volume or less, more preferably 5% by volume or more and 50% by volume or less, still more preferably 10% by volume or more and 40% by volume or less, particularly preferably 20% by volume or more and 30% by volume or less, and most preferably 25% by volume or more and 30% by volume or less.

[50] The manufacturing method for a film-like graphite according to any one of [23] to [32], and [47] to [49], wherein the carbonization step includes a heating step in a mixed gas, in which the raw film is heated in a mixed gas with an organic gas and an inert gas mixed, and a maximum heating temperature at the heating step in the organic gas is preferably 400° C. or higher and 1,000° C. or lower, more preferably 450° C. or higher and 800° C. or lower, and still more preferably 500° C. or lower and 600° C. or lower.

[51] The manufacturing method for a film-like graphite according to any one of [23] to [32], and [47] to [50], wherein the maximum heating temperature $T_{max}$ in the graphitization step is preferably 2,400° C. or higher and 3,000° C. or lower, more preferably 2,700° C. or higher and 2,900° C. or lower, and still more preferably 2,750° C. or higher and 2,800° C. or lower.

[52] The manufacturing method for a film-like graphite according to any one of [23] to [32], and [47] to [51], wherein the ratio $(S_g/S_m)$ of the area $S_g$ of the graphitized film to the area $S_m$ of the raw film is preferably 0.8 or more and 1.2 or less, more preferably 0.9 or more and 1.1 or less, and still more 1.0 or more and 1.1 or less.

[53] The manufacturing method for a film-like graphite according to [23] to [32], and [47] to [52], the method further comprising a press step of compressing or rolling the graphitized film.

[54] The manufacturing method for a film-like graphite according to [53], a density of the film-like graphite obtained in the press step is preferably 1.6 g/cm³ or more and 2.2 g/cm³ or less, more preferably 1.7 g/cm³ or more and 2.1 g/cm³ or less, and still more preferably 1.8 g/cm³ or more and 2.0 g/cm³ or less.

A second aspect of the present invention has the following aspects.

[1] A film-like graphite that has a film thickness of 58 μm or more, a thermal conductivity of 800 W/mK or more in a direction along a film plane, and satisfies the following condition (1) and condition (2), Condition (1): when a film thickness is denoted by a (μm) and a thermal conductivity is denoted by b (W/mK) in a direction along a film plane, the film-like graphite satisfies Expression 1a, $$2,140 \leq 12a+b \qquad \text{Expression 1a}$$

Condition (2): a minimum bending radius measured in a bend test is 16 mm or less.

[2] The film-like graphite according to [1], wherein the film-like graphite has a density of 1.7 g/cm³ or more.

[3] The film-like graphite according to [1] or [2], wherein the film-like graphite has a multilayer structure in which a plurality of layers overlap with each other, the multilayer structure has a width of 40 μm or more and a thickness of 8 μm or more, and an angle between a direction of each layer constituting the multilayer structure and the direction along the film plane is 200 or less.

[4] The film-like graphite according to any one of [1] to [3], wherein when a pressure of 100 MPa is applied to the entire film plane of the film-like graphite to compress the entire film plane in an environment of 25° C., a ratio $(T_a/T_b)$ of a film thickness $T_a$ after compression to a film thickness Tb before compression is 0.7 or more.

[5] A manufacturing method for a film-like graphite comprising:

a carbonization step of carbonizing a raw film made of an organic polymer to obtain a carbonized film; and a graphitization step of graphitizing the carbonized film to obtain a graphitized film, wherein the carbonization step includes a heating step in an organic gas, in which the raw film is heated in a mixed gas with an organic gas and an inert gas mixed.

[6] The manufacturing method for a film-like graphite according to [5], wherein a mixed gas that contains a gaseous substance (A) consisting of at least one of acetylene or an acetylene derivative, and an inert gas is used as the mixed gas.

[7] The manufacturing method for a film-like graphite according to [5] or [6], wherein at least a part of the heating step in an organic gas is carried out at a temperature of $T_f$ or lower, where in a thermogravimetric analysis in which a measurement sample made of the raw film is heated to 1,000° C. at a temperature increase rate of 10° C./min while flowing nitrogen gas at a flow velocity of 200 mL/min, and a temperature and a weight of the measurement sample are recorded, $T_f$ (° C.) is a highest temperature among temperatures at which a weight reduction rate (weight reduction per unit time) of the measurement sample observed is 10% or more of a maximum value of the weight reduction rate.

[8] The manufacturing method for a film-like graphite according to [7], wherein a period of 30 minutes or more in which an average temperature increase rate is 5° C./min or less is included in a temperature range of $T_s$ or higher and $T_f$ or lower in a temperature increase pattern obtained by a monotonic temperature increase in a temperature increase history in the heating step in an organic gas, where in the thermogravimetric analysis, $T_s$ (° C.) is a lowest temperature among temperatures of 100° C. or higher at which a weight reduction rate of the measurement sample observed is 0.8% or more of a maximum value of the weight reduction rate.

[9] The manufacturing method for a film-like graphite according to any one of [5] to [8], wherein a maximum heating temperature $T_{max}$ in the graphitization step is 2,400° C. or higher and 2,900° C. or lower.

[10] A manufacturing method for a film-like graphite comprising:

a carbonization step of carbonizing a raw film made of an organic polymer to obtain a carbonized film; and a graphitization step of graphitizing the carbonized film to obtain a graphitized film, wherein a film-like graphite that has a thermal conductivity of 800 W/mK or more and a minimum bending radius of 16 mm or less according to a bend test is manufactured from the raw film that has a thickness of 150 μm or more at a maximum value in a temperature increase range of 60° C. or higher during optional 30 minutes in a temperature increase pattern obtained by a monotonic temperature increase in a temperature increase history of 2,000° C. or higher in the graphitization step.

[11] The manufacturing method for a film-like graphite according to any one of [5] to [10], wherein a laminated film in which two or more polymer films made of an organic polymer are bonded to each other by a pressure-sensitive adhesive or an adhesive is used as the raw film.

[12] A manufacturing method for a film-like graphite comprising:

a carbonization step of carbonizing a raw film made of an organic polymer to obtain a carbonized film; and a graphitization step of graphitizing the carbonized film to obtain a graphitized film, wherein a ratio ($S_g/S_m$) of an area $S_g$ of the graphitized film to an area $S_m$ of the raw film is 0.8 or more.

[13] The manufacturing method for a film-like graphite according to [12], wherein a film-like graphite that has a density of 1.7 g/cm$^3$ or more is obtained from the graphitized film that has a density of less than 1.7 g/cm$^3$ 3 by a press step of compressing or rolling the graphitized film.

[14] The film-like graphite comprising a multilayer structure in which a plurality of layers overlap with each other, wherein the multilayer structure has a width of 40 μm or more and a thickness of 8 μm or more, an angle between a direction of each layer constituting the multilayer structure and a direction along a film plane is 200 or less, and the film-like graphite has a density of 1.7 g/cm$^3$ or more.

[15] The film-like graphite according to [14], wherein the thickness is 58 μm or more.

[16] The film-like graphite according to [14] or [15], wherein a minimum bending radius measured in a bend test is 16 mm or less.

[17] The film-like graphite according to any one of [14] to [16], wherein each layer constituting the multilayer structure has a large number of unevenness, and adjacent layers are in contact with each other at a large number of positions.

[18] The film-like graphite according to any one of [14] to [16], wherein each layer constituting the multilayer structure has a flat surface or a smooth curved surface, and adjacent layers are in close contact with each other.

[19] A film-like graphite, wherein a film thickness a (μm) is 50 μm or more, a thermal conductivity b in a direction along a film plane is 1,350 W/mK or more, and a product of a and b is 100,000 or more.

[20] A film-like graphite, wherein a product (a×b) of a film thickness a (μm) and a thermal conductivity b (W/mK) in a direction along a film plane is 88,000 or more.

[21] The film-like graphite according to [19] or [20], wherein the film-like graphite has a density of 1.7 g/cm$^3$ or more.

[22] The film-like graphite according to any one of [19] to [21], wherein a minimum bending radius measured in a bend test is 16 mm or less.

[23] The film-like graphite according to any one of [1] to [4], and [14] to [22], wherein in Tension-Free U-shape Folding Test, a folding number is 10,000 or more until breakage when measurement are performed at a bending radius R of 2 mm and a bending angle of 180°.

[24] The film-like graphite according to any one of [1] to [4], and [14] to [23], wherein a layer formed of an adhesive or a pressure-sensitive adhesive is not included in the film-like graphite in a film thickness direction.

[25] A manufacturing method for the film-like graphite according to [10], wherein in Tension-Free U-shape Folding Test, a folding number is 10,000 or more until breakage when measurement are performed at a bending radius R of 2 mm and a bending angle of 180°.

[26] The film-like graphite according to any one of [1] to [4], and [14] to [24], wherein the film thickness is preferably 42 μm or more and 250 μm or less, more preferably 50 m or more and 200 m or less, still more preferably 58 μm or more and 180 μm or less, even still more preferably 64 μm or more and 150 μm or less, and yet even still more preferably 72 μm or more and 150 μm or less, particularly preferably 75 μm or more and 150 μm or less, more particularly preferably 80 μm or more and 130 μm or less, even particularly preferably 85 μm or more and 130 μm or less, still particularly preferably 100 μm or more and 130 μm or less, and most preferably 102 μm or more and 120 μm or less.

[27] The film-like graphite according to any one of [1] to [4], [14] to [24], and [26], wherein the thermal conductivity in the direction along the film plane is preferably 800 W/mK or more and 2,200 W/mK or less, more preferably 1,000 W/mK or more and 2,200 W/mK or less, still more preferably 1,200 W/mK or more and 2,200 W/mK or less, even still more preferably 1,350 W/mK or more and 2,200 W/mK or less, yet even still more preferably 1,400 W/mK or more and 2,200 W/mK or less, particularly preferably 1,550 W/mK or more and 2,200 W/mK or less, and most preferably 1,660 W/mK or more and 2,200 W/mK or less.

[28] The film-like graphite according to any one of [1] to [4], [14] to [24], [26], and [27], wherein a value of 12a+b represented by Expression 1a is preferably 2,140 or more and 5,000 or less, more preferably 2,200 or more and 4,500 or less, still more preferably 2,250 or more and 4,000 or less, even still more preferably 2,350 or more and 3,800 or less, particularly preferably 2,550 or more and 3,800 or less, and most preferably 2,750 or more and 3,700 or less.

[29] The film-like graphite according to any one of [1] to [4], [14] to [24], and [26] to [28], wherein the product (a×b) of the film thickness a (μm) and the thermal conductivity b (W/mK) in the direction along the film plane is preferably 88,000 or more and 500,000 or less, more preferably 110,000 or more and 500,000 or less, still more preferably 135,000 or more and 400,000 or less, particularly preferably 140,000 or more and 300,000 or less, and most preferably 160,000 or more and 270,000 or less.

[30] The film-like graphite according to any one of [1] to [4], [14] to [24], and [26] to [29], wherein the minimum bending radius is preferably more than 0 mm and 16 mm or less, more preferably more than 0 mm and 13 mm or less, still more preferably more than 0 mm and 10 mm or less, particularly preferably more than 0 mm and 8 mm or less, and most preferably more than 0 mm and 6 mm or less.

[31] The film-like graphite according to any one of [1] to [4], [14] to [24], and [26] to [30], wherein the density is preferably 1.7 g/cm$^3$ or more and 2.2 g/cm$^3$ or less, more preferably 1.8 g/cm$^3$ or more and 2.1 g/cm$^3$ or less, and still more preferably 1.9 g/cm$^3$ or more and 2.0 g/cm$^3$ or less.

[32] The film-like graphite according to any one of [1] to [4], [14] to [24], and [26] to [31], wherein the film-like graphite has the multilayer structure in which the plurality of layers are overlapped with each other, and a width of the multilayer structure is preferably 40 μm or more and 100 μm or less, more preferably 45 μm or more and 80 μm or less, and still more preferably 50 μm or more and 70 μm or less.

[33] The film-like graphite according to any one of [1] to [4], [14] to [24], and [26] to [32], wherein the film-like graphite has the multilayer structure in which the plurality of layers are overlapped with each other, and a thickness of the multilayer structure is preferably 8 μm or more and 20 μm or less, and more preferably 10 μm or more and 15 μm or less.

[34] The film-like graphite according to any one of [1] to [4], [14] to [24], and [26] to [33], wherein the film-like graphite has the multilayer structure in which the plurality of layers are overlapped with each other, and the angle between each layer constituting the multilayer structure and the direction along the film plane is preferably more than 0° and 20° or less, more preferably more than 0° and 15° or less, and still more preferably more than 0° and 100 or less.

[35] The film-like graphite according to any one of [1] to [4], [14] to [24], and [26] to [34], wherein the film-like graphite has the multilayer structure in which the plurality of layers are overlapped with each other, adjacent layers are in close contact with each other, and no void between the adjacent layers is ascertained in an image of crack propagation in mode I fracture surface of the film-like graphite, which is observed by a scanning electron microscope (SEM), even though the observation is carried out at an acceleration voltage of 10 kV and a magnification of 1,000 times.

[36] The film-like graphite according to any one of [1] to [4], [14] to [24], and [26] to [35], wherein when a pressure of 100 MPa is applied to the entire film plane of the film-like graphite to compress the entire film plane in an environment of 25° C., a ratio $(T_a/T_b)$ of a film thickness $T_a$ after compression to a film thickness $T_b$ before compression is preferably 0.7 or more and 1.0 or less, more preferably 0.8 or more and 1.0 or less, and still more preferably 0.9 or more and 1.0 or less.

[37] The manufacturing method for a film-like graphite according to any one of [5] to [13], and [25], wherein the thickness of the raw film is preferably 75 μm or more and 550 μm or less, more preferably 125 μm or more and 500 μm or less, still more preferably 150 μm or more and 450 μm or less, even still more preferably 175 μm or more and 400 μm or less, particularly preferably 200 μm or more and 375 μm or less, and most preferably 250 μm or more and 270 μm or less.

[38] The manufacturing method for a film-like graphite according to any one of [5] to [13], [25], and [37], wherein the organic polymer is preferably a polymer that has an aromatic ring, more preferably a polymer that is selected from the group consisting of polyimide, polyamide, polythiazole, polyoxadiazole, polybenzoxazole, polybenzobisoxazole, polybenzothiazole, polybenzobisthiazole, polybenzimidazole, polybenzobisimidazole, and polyparaphenylenevinylene and that has an aromatic ring, and still more preferably polyimide having an aromatic ring.

[39] The manufacturing method for a film-like graphite according to any one of [5] to [13], [25], [37], and [38], wherein the carbonization step includes a heating step in a mixed gas, in which the raw film is heated in a mixed gas with an organic gas and an inert gas mixed, and a concentration of the organic gas in the mixed gas is preferably 2% by volume or more and 95% by volume or less, more preferably 5% by volume or more and 50% by volume or less, still more preferably 10% by volume or more and 40% by volume or less, particularly preferably 20% by volume or more and 30% by volume or less, and most preferably 25% by volume or more and 30% by volume or less.

[40] The manufacturing method for a film-like graphite according to any one of [5] to [13], [25], and [37] to [39], wherein the carbonization step includes a heating step in a mixed gas, in which the raw film is heated in a mixed gas with an organic gas and an inert gas mixed, and a maximum heating temperature at the heating step in the organic gas is preferably 400° C. or higher and 1,000° C. or lower, more preferably 450° C. or higher and 800° C. or lower, and still more preferably 500° C. or lower and 600° C. or lower.

[41] The manufacturing method for a film-like graphite according to any one of [5] to [13], [25], and [37] to [40], wherein the maximum heating temperature $T_{max}$ in the graphitization step is preferably 2,400° C. or higher and 3,000° C. or lower, more preferably 2,700° C. or higher and 2,900° C. or lower, and still more preferably 2,750° C. or higher and 2,800° C. or lower.

[42] The manufacturing method for a film-like graphite according to any one of [5] to [13], [25], and [37] to [41], wherein the ratio $(S_g/S_m)$ of the area $S_g$ of the graphitized film to the area $S_m$ of the raw film is preferably 0.8 or more and 1.2 or less, more preferably 0.9 or more and 1.1 or less, and still more preferably 1.0 or more and 1.1 or less.

A third aspect of the present invention has the following aspects.

[1] A film-like graphite that has a film thickness of 58 μm or more, a thermal conductivity of 800 W/mK or more in a direction along a film plane, a thermal conductivity of 1 W/mK or more and 20 W/mK or less in a direction perpendicular to the film plane, and satisfies the following condition (1), Condition (1): when a film thickness is denoted by a (μm) and a thermal conductivity is denoted by b (W/mK) in a direction along a film plane, the film-like graphite satisfies Expression 1a $$2,140 \leq 12a+b \qquad \text{Expression 1a.}$$

[2] The film-like graphite according to [1], wherein a minimum bending radius measured in a bend test is 16 mm or less.

[3] The film-like graphite according to [1] or [2], wherein the film-like graphite has a density of 1.7 g/cm³ or more.

[4] The film-like graphite according to [1], wherein the film-like graphite has a multilayer structure in which a plurality of layers overlap with each other, the multilayer structure has a width of 40 μm or more and a thickness of 8 μm or more, and an angle between a direction of each layer constituting the multilayer structure and the direction along the film plane is 200 or less.

[5] The film-like graphite according to [1], wherein when a pressure of 100 MPa is applied to the entire film plane of the film-like graphite to compress the entire film plane in an environment of 25° C., a ratio $(T_a/T_b)$ of a film thickness $T_a$ after compression to a film thickness $T_b$ before compression is 0.7 or more.

[6] A film-like graphite, wherein a product (a×b) of a film thickness a (μm) and a thermal conductivity b (W/mK) in a direction along a film plane is 88,000 or more, and the film-like graphite has a thermal conductivity of 1 W/mK or more and 20 W/mK or less in a direction perpendicular to the film plane.

[7] The film-like graphite according to [6], wherein a minimum bending radius measured in a bend test is 16 mm or less.

[8] The film-like graphite according to [6] or [7], wherein the film-like graphite has a density of 1.7 g/cm³ or more.

[9] The film-like graphite according to any one of [1] to [8], wherein in Tension-Free U-shape Folding Test, a folding number is 10,000 or more until breakage when measurement are performed at a bending radius R of 2 mm and a bending angle of 180°.

[10] The film-like graphite according to any one of [1] to [9], wherein a layer formed of an adhesive or a pressure-sensitive adhesive is not included in the film-like graphite in a film thickness direction.

[11] The film-like graphite according to any one of [1] to [10], wherein the film thickness is preferably 42 μm or more and 250 μm or less, more preferably 50 μm or more and 200 μm or less, still more preferably 58 μm or more and 180 μm or less, even still more preferably 64 μm or more and 150 μm or less, and yet even still more preferably 72 μm or more and 150 μm or less, particularly preferably 75 μm or more and 150 μm or less, more particularly preferably 80 m or more and 130 μm or less, even particularly preferably 85 μm or more and 130 μm or less, still particularly preferably 100 μm or more and 130 μm or less, and most preferably 102 μm or more and 120 μm or less.

[12] The film-like graphite according to any one of [1] to [11], wherein the thermal conductivity in the direction along the film plane is preferably 800 W/mK or more and 2,200 W/mK or less, more preferably 1,000 W/mK or more and 2,200 W/mK or less, still more preferably 1,200 W/mK or more and 2,200 W/mK or less, even still more preferably 1,350 W/mK or more and 2,200 W/mK or less, yet even still more preferably 1,400 W/mK or more and 2,200 W/mK or less, particularly preferably 1,550 W/mK or more and 2,200 W/mK or less, and most preferably 1,660 W/mK or more and 2,200 W/mK or less.

[13] The film-like graphite according to any one of [1] to [12], wherein the thermal conductivity in the direction perpendicular to the film plane is preferably more than 0 W/mK and 20 W/mK or less, more preferably 0.5 W/mK or more and 15 W/mK or less, still more preferably 1 W/mK or more and 10 W/mK or less, and particularly preferably 3 W/mK or more and 10 W/mK or less.

[14] The film-like graphite according to any one of [1] to [13], wherein a value of 12a+b represented by Expression 1a is preferably 2,140 or more and 5,000 or less, more preferably 2,200 or more and 4,500 or less, still more preferably 2,250 or more and 4,000 or less, even still more preferably 2,350 or more and 3,800 or less, particularly preferably 2,550 or more and 3,800 or less, and most preferably 2,750 or more and 3,700 or less.

[15] The film-like graphite according to any one of [1] to [14], wherein the minimum bending radius measured in a bend test is preferably more than 0 mm and 16 mm or less, more preferably more than 0 mm and 13 mm or less, still more preferably more than 0 mm and 10 mm or less, particularly preferably more than 0 mm and 8 mm or less, and most preferably more than 0 mm and 6 mm or less.

[16] The film-like graphite according to any one of [1] to [15], wherein the density is preferably 1.7 g/cm$^3$ or more and 2.2 g/cm$^3$ or less, more preferably 1.8 g/cm$^3$ or more and 2.1 g/cm$^3$ or less, and still more preferably 1.9 g/cm$^3$ or more and 2.0 g/cm$^3$ or less.

[17] The film-like graphite according to any one of [1] to [16], wherein the film-like graphite has the multilayer structure in which the plurality of layers are overlapped with each other, and a width of the multilayer structure is preferably 40 μm or more and 100 μm or less, more preferably 45 μm or more and 80 μm or less, and still more preferably 50 μm or more and 70 μm or less.

[18] The film-like graphite according to any one of [1] to [17], wherein the film-like graphite has the multilayer structure in which the plurality of layers are overlapped with each other, and a thickness of the multilayer structure is preferably 8 μm or more and 20 μm or less, and more preferably 10 μm or more and 15 μm or less.

[19] The film-like graphite according to any one of [1] to [18], wherein the film-like graphite has the multilayer structure in which the plurality of layers are overlapped with each other, and the angle between each layer constituting the multilayer structure and the direction along the film plane is preferably more than 0° and 20° or less, more preferably more than 0° and 150 or less, and still more preferably more than 0° and 100 or less.

[20] The film-like graphite according to any one of [1] to [19], wherein the film-like graphite has the multilayer structure in which the plurality of layers are overlapped with each other, adjacent layers are in close contact with each other, and no void between the adjacent layers is ascertained in an image of crack propagation in mode I fracture surface of the film-like graphite, which is observed by a scanning electron microscope (SEM), even though the observation is carried out at an acceleration voltage of 10 kV and a magnification of 1,000 times.

[21] The film-like graphite according to any one of [1] to [20], wherein when a pressure of 100 MPa is applied to the entire film plane of the film-like graphite to compress the entire film plane in an environment of 25° C., a ratio ($T_a/T_b$) of a film thickness $T_a$ after compression to a film thickness $T_b$ before compression is preferably 0.7 or more and 1.0 or less, more preferably 0.8 or more and 1.0 or less, and still more preferably 0.9 or more and 1.0 or less.

[22] The film-like graphite according to any one of [1] to [21], wherein the product (a×b) of the film thickness a (μm) and the thermal conductivity b (W/mK) in the direction along the film plane is preferably 88,000 or more and 500,000 or less, more preferably 110,000 or more and 500,000 or less, still more preferably 135,000 or more and 400,000 or less, particularly preferably 140,000 or more and 300,000 or less, and most preferably 160,000 or more and 270,000 or less.

A fourth aspect of the present invention has the following aspects.

[1] A film-like graphite that has a film thickness of 58 μm or more, a thermal conductivity of 800 W/mK or more in a direction along a film plane, and an electrical conductivity of 9,000 S/cm or more in the direction along the film plane.

[2] The film-like graphite according to [1], wherein the film-like graphite has an electrical conductivity of 10,000 S/cm or more in the direction along the film plane.

[3] The film-like graphite according to [1], wherein the film-like graphite has an electrical conductivity of 11,000 S/cm or more in the direction along the film plane.

[4] The film-like graphite according to any one of [1] to [3], wherein when a film thickness is denoted by a (μm) and a thermal conductivity is denoted by b (W/mK) in the direction along the film plane, the film-like graphite satisfies Expression 1a, $$2,140 \leq 12a+b \qquad \text{Expression 1a.}$$

[5] The film-like graphite according to any one of [1] to [4], wherein a minimum bending radius measured in a bend test is 16 mm or less.

[6] The film-like graphite according to any one of [1] to [5], wherein the film-like graphite has a density of 1.7 g/cm$^3$ or more.

[7] The film-like graphite according to any one of [1] to [6], wherein the film-like graphite has a multilayer structure in which a plurality of layers overlap with each other, the multilayer structure has a width of 40 μm or more and a thickness of 8 μm or more, and an angle between a direction of each layer constituting the multilayer structure and the direction along the film plane is 200 or less.

[8] The film-like graphite according to any one of [1] to [7], wherein when a pressure of 100 MPa is applied to the entire film plane of the film-like graphite to compress the entire film plane in an environment of 25° C., a ratio ($T_a/T_b$) of a film thickness $T_a$ after compression to a film thickness $T_b$ before compression is 0.7 or more.

[9] A film-like graphite, wherein a product (a×b) of a film thickness a (μm) and a thermal conductivity b (W/mK) in a direction along a film plane is 88,000 or more, and the film-like graphite has a thermal conductivity of 1 W/mK or more and 20 W/mK or less in a direction perpendicular to the film plane.

[10] The film-like graphite according to [9], wherein a minimum bending radius measured in a bend test is 16 mm or less.

[11] The film-like graphite according to [9] or [10], wherein the film-like graphite has a density of 1.7 g/cm$^3$ or more.

[12] The film-like graphite according to any one of [1] to [11], wherein in Tension-Free U-shape Folding Test, a folding number is 10,000 or more until breakage when measurement are performed at a bending radius R of 2 mm and a bending angle of 180°.

[13] The film-like graphite according to any one of [1] to [12], wherein a layer formed of an adhesive or a pressure-sensitive adhesive is not included in the film-like graphite in a film thickness direction.

[14] A lithium-ion secondary battery or an all-solid battery, wherein the film-like graphite according to any one of [1] to [13] is used as a current collector.

[15] A lithium-ion secondary battery or an all-solid battery, wherein the film-like graphite according to any one of [1] to [13] is used as a negative-electrode active material and negative-electrode current collector.

[16] The film-like graphite according to any one of [1] to [13], wherein the film thickness is preferably 42 μm or more and 250 μm or less, more preferably 50 μm or more and 200 μm or less, still more preferably 58 μm or more and 180 μm or less, even still more preferably 64 μm or more and 150 μm or less, and yet even still more preferably 72 μm or more and 150 μm or less, particularly preferably 75 μm or more and 150 μm or less, more particularly preferably 80 μm or more and 130 μm or less, even particularly preferably 85 μm or more and 130 μm or less, still particularly preferably 100 μm or more and 130 μm or less, and most preferably 102 μm or more and 120 μm or less.

[17] The film-like graphite according to any one of [1] to [13], and [16], wherein the thermal conductivity in the direction along the film plane is preferably 800 W/mK or more and 2,200 W/mK or less, more preferably 1,000 W/mK or more and 2,200 W/mK or less, still more preferably 1,200 W/mK or more and 2,200 W/mK or less, even still more preferably 1,350 W/mK or more and 2,200 W/mK or less, yet even still more preferably 1,400 W/mK or more and 2,200 W/mK or less, particularly preferably 1,550 W/mK or more and 2,200 W/mK or less, and most preferably 1,660 W/mK or more and 2,200 W/mK or less.

[18] The film-like graphite according to any one of [1] to [13], [16], and [17], wherein the electrical conductivity in the direction along the film plane is preferably 9,000 S/cm or more and 30,000 S/cm or less, more preferably 10,000 S/cm or more and 20,000 S/cm or less, still more preferably 11,000 S/cm or more and 18,000 S/cm or less, particularly preferably 12,000 S/cm or more and 15,000 S/cm or less, and most preferably 1,3500 S/cm or more and 15,000 S/cm or less.

[19] The film-like graphite according to any one of [1] to [13], and [16] to [18], wherein a value of 12a+b represented by Expression 1a is preferably 2,140 or more and 5,000 or less, more preferably 2,200 or more and 4,500 or less, still more preferably 2,250 or more and 4,000 or less, even still more preferably 2,350 or more and 3,800 or less, particularly preferably 2,550 or more and 3,800 or less, and most preferably 2,750 or more and 3,700 or less.

[20] The film-like graphite according to any one of [1] to [13], and [16] to [19], wherein the minimum bending radius is preferably more than 0 mm and 16 mm or less, more preferably more than 0 mm and 13 mm or less, still more preferably more than 0 mm and 10 mm or less, particularly preferably more than 0 mm and 8 mm or less, and most preferably more than 0 mm and 6 mm or less.

[21] The film-like graphite according to any one of [1] to [13], and [16] to [20], wherein the density is preferably 1.7 g/cm$^3$ or more and 2.2 g/cm$^3$ or less, more preferably 1.8 g/cm$^3$ or more and 2.1 g/cm$^3$ or less, and still more preferably 1.9 g/cm$^3$ or more and 2.0 g/cm$^3$ or less.

[22] The film-like graphite according to any one of [1] to [13], and [16] to [21], wherein the film-like graphite has the multilayer structure in which the plurality of layers are overlapped with each other, and a width of the multilayer structure is preferably 40 μm or more and 100 μm or less, more preferably 45 μm or more and 80 μm or less, and still more preferably 50 μm or more and 70 μm or less.

[23] The film-like graphite according to any one of [1] to [13], and [16] to [22], wherein the film-like graphite has the multilayer structure in which the plurality of layers are overlapped with each other, and a thickness of the multilayer structure is preferably 8 μm or more and 20 μm or less, and more preferably 10 μm or more and 15 μm or less.

[24] The film-like graphite according to any one of [1] to [13], and [16] to [23], wherein the film-like graphite has the multilayer structure in which the plurality of layers are overlapped with each other, and the angle between each layer constituting the multilayer structure and the direction along the film plane is preferably more than 0° and 20° or less, more preferably more than 0° and 15° or less, and still more preferably more than 0° and 100 or less.

[25] The film-like graphite according to any one of [1] to [13], and [16] to [24], wherein the film-like graphite has the multilayer structure in which the plurality of layers are overlapped with each other, adjacent layers are in close contact with each other, and no void between the adjacent layers is ascertained in an image of crack propagation in mode I fracture surface of the film-like graphite, which is observed by a scanning electron microscope (SEM), even though the observation is carried out at an acceleration voltage of 10 kV and a magnification of 1,000 times.

[26] The film-like graphite according to any one of [1] to [13], and [16] to [25], wherein when a pressure of 100 MPa is applied to the entire film plane of the film-like graphite to compress the entire film plane in an environment of 25° C., a ratio ($T_a/T_b$) of a film thickness $T_a$ after compression to a film thickness $T_b$ before compression is preferably 0.7 or more and 1.5 or less, more preferably 0.8 or more and 1.3 or less, and still more preferably 0.9 or more and 1.2 or less.

[27] The film-like graphite according to any one of [1] to [13], and [16] to [26], wherein the product (a×b) of the film thickness a (μm) and the thermal conductivity b (W/mK) in the direction along the film plane is preferably 88,000 or more and 500,000 or less, more preferably 110,000 or more and 500,000 or less, still more preferably 135,000 or more and 400,000 or less, particularly preferably 140,000 or more and 300,000 or less, and most preferably 160,000 or more and 270,000 or less.

A fifth aspect of the present invention has the following aspects.

[1] A film-like graphite, wherein a graphite crystal orientation degree P, which is calculated by Expression 1 from a half-width W of a diffraction profile obtained from a ω scan of a (002) plane diffraction peak derived from a graphite hexagonal crystal detected in the vicinity of 2θ=26° by a θ/2θ scan method, is 96% or more with respect to a film plane direction.

$$P = \frac{180 - W}{180} \times 100 \qquad \text{Expression 1}$$

[2] A film-like graphite, wherein a graphite crystal orientation degree P, which is calculated by Expression 1 from a half-width W of a diffraction profile obtained from a ω scan of a (002) plane diffraction peak derived from a graphite hexagonal crystal detected in the vicinity of 2θ=26° by a θ/2θ scan method, is 94% or more with respect to a film plane direction, and a thickness is 42 μm or more.

$$P = \frac{180 - W}{180} \times 100 \qquad \text{Expression 1}$$

[3] The film-like graphite according to [1] or [2], wherein a ratio (surface area/film area) of a surface area to a film area is 1.05 or more.

[4] A manufacturing method for a film-like graphite comprising a heating step of heating a raw film made of an organic polymer to obtain a film-like graphite, wherein in the heating step, a laminated film in which two or more polymer films made of an organic polymer are bonded to each other by a pressure-sensitive adhesive or an adhesive is used as the raw film.

[5] A manufacturing method for a film-like graphite comprising a heating step of heating a raw film made of an organic polymer to obtain a film-like graphite, wherein the heating step includes a heating step in a mixed gas, in which the raw film is heated in a mixed gas with an organic gas and an inert gas mixed.

[6] The manufacturing method for a film-like graphite according to [5], wherein a mixed gas that contains a gaseous substance (A) consisting of at least one of acetylene or an acetylene derivative, and an inert gas is used as the mixed gas.

[7] The manufacturing method for a film-like graphite according to [5] or [6], wherein at least a part of the heating step in the mixed gas is carried out at a temperature of $T_f$ or lower, where $T_f$ (° C.) is a highest temperature among temperatures at which a weight reduction rate (weight reduction per unit time) of a measurement sample is 10% or more of a maximum value, which is obtained by heating the measurement sample made of the raw film to 1,000° C. at a temperature increase rate of 10° C./min while flowing nitrogen gas at a flow velocity of 200 mL/min and carrying out a thermogravimetric analysis of the raw film.

[8] The manufacturing method for a film-like graphite according to [7], wherein a period of 30 minutes or more in which an average temperature increase rate is 5° C./min or less is included in a temperature range of $T_s$ or higher and $T_f$ or lower in a temperature increase pattern obtained by a monotonic temperature increase in a temperature increase history in the heating step in the mixed gas, where in the thermogravimetric analysis, $T_s$ (° C.) is a lowest temperature among temperatures of 100° C. or higher and 0.8% or more of a maximum value of the weight reduction rate of the measurement sample.

[9] The manufacturing method for a film-like graphite according to any one of [5] to [8], wherein a laminated film in which two or more polymer films made of an organic polymer are bonded to each other by a pressure-sensitive adhesive or an adhesive is used as the raw film.

[10] The manufacturing method for a film-like graphite according to any one of [4] to [9], wherein a maximum heating temperature $T_{max}$ in the heating step is 2,400° C. or higher and 2,900° C. or lower.

[11] A manufacturing method for a film-like graphite comprising:

a carbonization step of heating a raw film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein the raw film has a thickness of 150 μm or more, a film-like graphite that has a thermal conductivity of 800 W/mK or more and a minimum bending radius of 16 mm or less according to a bend test is obtained at a maximum value in a temperature increase range of 60° C. or higher during optional 30 minutes in a temperature increase pattern obtained by a monotonic temperature increase in a temperature increase history of 2,000° C. or higher in the graphitization step.

[12] A manufacturing method for a film-like graphite comprising:

a carbonization step of heating a raw film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein a ratio ($S_g/S_m$) of an area $S_g$ of the graphitized film to an area $S_m$ of the raw film is 0.8 or more.

[13] The manufacturing method for a film-like graphite according to any one of [4] to [12], the method further comprising a press step of compressing or rolling the graphitized film to obtain a film-like graphite that has a density of 1.7 g/cm³ or more.

[14] A manufacturing method for a film-like graphite comprising:

a carbonization step of heating a raw film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein a maximum value in a temperature increase range during optional 30 minutes in a temperature increase pattern obtained by a monotonic temperature increase in a temperature increase history of 2,000° C. or higher in the graphitization step is set to 60° C. or higher.

[15] The manufacturing method for a film-like graphite according to [14], wherein a product of a film thickness a (μm) and a thermal conductivity b (W/mK) in a direction along a film plane is 40,000 or more.

[16] The manufacturing method for a film-like graphite according to [14] or [15], wherein the film-like graphite has a thickness a of 23 μm or less.

[17] A film-like graphite, wherein a graphite crystal orientation degree P, which is calculated by Expression 1 from a half-width W of a diffraction profile obtained from a ω scan of a (002) plane diffraction peak derived from a graphite hexagonal crystal detected in the vicinity of $2\theta=260$ by a $\theta/2\theta$ scan method, is 92% or more with respect to a film plane direction, a thickness is 58 μm or more, and a density is 1.6 g/cm$^3$ or more.

$$P = \frac{180 - W}{180} \times 100 \qquad \text{Expression 1}$$

[18] The film-like graphite according to any one of [1] to [3], and [17], wherein a layer formed of an adhesive or a pressure-sensitive adhesive is not included in the film-like graphite in a film thickness direction.

[19] The film-like graphite according to any one of [1] to [3], [17], and [18], wherein the graphite crystal orientation degree P is preferably 92% or more and less than 100%, more preferably 93% or more and 99% or less, still more preferably 94% or more and 99% or less, and particularly preferably 95% or more and 99% or less, and most preferably 96% or more and 99% or less.

[20] The film-like graphite according to any one of [1] to [3], and [17] to [19], wherein the thickness of the film-like graphite is preferably 15 μm or more and 250 μm or less, more preferably 30 μm or more and 200 μm or less, still more preferably 42 μm or more and 180 μm or less, even still more preferably 50 μm or more and 150 μm or less, particularly preferably 58 μm or more and 130 μm or less, still particularly preferably 70 μm or more and 120 μm or less, and most preferably 80 μm or more and 120 μm or less.

[21] The film-like graphite according to any one of [1] to [3], and [17] to [20], wherein a ratio (surface area/film area) of a surface area to a film area is preferably 1.05 or more and 1.5 or less, more preferably 1.06 or more and 1.5 or less, and still more preferably 1.07 or more and 1.3 or less.

[22] The manufacturing method for a film-like graphite according to any one of [4] to [10], wherein the heating step includes the carbonization step of carbonizing a raw film to obtain a carbonized film and the graphitization step of graphitizing the carbonized film to obtain a graphitized film.

[23] The manufacturing method for a film-like graphite according to [11] to [16], and [22], the method further comprising a press step of compressing or rolling the graphitized film.

[24] The manufacturing method for a film-like graphite according to any one of [4] to [16], [22], and [23], wherein the thickness of the raw film is preferably 20 μm or more and 550 μm or less, more preferably 45 μm or more and 400 μm or less, still more preferably 70 μm or more and 270 μm or less, and particularly preferably 120 μm or more and 270 μm or less.

[25] The manufacturing method for a film-like graphite according to any one of [4] to [16], and [22] to [24], wherein the organic polymer is preferably a polymer that has an aromatic ring, more preferably a polymer that is selected from the group consisting of polyimide, polyamide, polythiazole, polyoxadiazole, polybenzoxazole, polybenzobisoxazole, polybenzothiazole, polybenzobisthiazole, polybenzimidazole, polybenzobisimidazole, and polyparaphenylenevinylene and that has an aromatic ring, and still more preferably polyimide having an aromatic ring.

[26] The manufacturing method for a film-like graphite according to any one of [5] to [16], and [22], wherein the carbonization step includes a heating step in a mixed gas, in which the raw film is heated in a mixed gas with an organic gas and an inert gas mixed, and a concentration of the organic gas in the mixed gas is preferably 2% by volume or more and 95% by volume or less, more preferably 5% by volume or more and 50% by volume or less, still more preferably 10% by volume or more and 40% by volume or less, particularly preferably 20% by volume or more and 30% by volume or less, and most preferably 25% by volume or more and 30% by volume or less.

[27] The manufacturing method for a film-like graphite according to any one of [5] to [16], [22], and [26], wherein the carbonization step includes a heating step in a mixed gas, in which the raw film is heated in a mixed gas with an organic gas and an inert gas mixed, and a maximum heating temperature at the heating step in the organic gas is preferably 400° C. or higher and 1,000° C. or lower, more preferably 450° C. or higher and 800° C. or lower, and still more preferably 500° C. or lower and 600° C. or lower.

[28] The manufacturing method for a film-like graphite according to any one of [5] to [16], [22], [26], and [27], wherein the maximum heating temperature $T_{max}$ in the graphitization step is preferably 2,400° C. or higher and 3,000° C. or lower, more preferably 2,700° C. or higher and 2,900° C. or lower, and still more preferably 2,750° C. or higher and 2,800° C. or lower.

[29] The manufacturing method for a film-like graphite according to any one of [5] to [16], [22], and [26] to [28], wherein the ratio $(S_g/S_m)$ of the area $S_g$ of the graphitized film to the area $S_m$ of the raw film is preferably 0.8 or more and 1.2 or less, more preferably 0.9 or more and 1.1 or less, and still more preferably 1.0 or more and 1.1 or less.

[30] The manufacturing method for a film-like graphite according to [11] to [16], [22], and [23], a density of the film-like graphite obtained in the press step is preferably 1.6 g/cm$^3$ or more and 2.2 g/cm$^3$ or less, more preferably 1.7 g/cm$^3$ or more and 2.1 g/cm$^3$ or less, and still more preferably 1.8 g/cm$^3$ or more and 2.0 g/cm$^3$ or less.

A sixth aspect of the present invention has the following aspects.

[1] A film-like graphite, wherein a number N of a plurality of bright regions obtained from an image in a vertical cross-section of the film-like graphite with respect to a film plane, in which bright parts and dark parts observed in a polarization microscope image are binarized, a film thickness H (μm), and a film width W (μm) satisfy Expression 1b, $$N/H/W \leq 0.015 \qquad \text{Expression 1b.}$$

[2] A film-like graphite, wherein a number N of a plurality of bright regions obtained from an image in a vertical cross-section of the film-like graphite with respect to a film plane, in which bright parts and dark parts observed in a polarization microscope image are binarized, a film thickness H (μm), and a film width W (μm) satisfy Expression 2b and 3b, $$N/H/W \leq 0.04 \qquad \text{Expression 2b,}$$

$$H \geq 42 \qquad \text{Expression 3b.}$$

[3] A film-like graphite, wherein an average area of a plurality of bright regions obtained from an image in a vertical cross-section of the film-like graphite with respect to a film plane, in which bright parts and dark parts observed in a polarization microscope image are binarized, is 22 μm$^2$ or more, or a film thickness is 42 μm or more and the average area is 9 μm$^2$ or more.

[4] The film-like graphite according to any one of [1] to [3], wherein a ratio (film surface area/film area) of a film surface area to a film area is 1.05 or more.

[5] A manufacturing method for a film-like graphite comprising heating a raw film to obtain a film-like graphite, wherein the raw film is a laminated film in which two or more films made of an organic polymer are bonded to each other by a pressure-sensitive adhesive or an adhesive.

[6] A manufacturing method for a film-like graphite comprising a heating step of heating a raw film to obtain a film-like graphite, wherein the heating step includes a heating step in a mixed gas, in which the raw film is heated in a mixed gas with an organic gas and an inert gas mixed.

[7] The manufacturing method for a film-like graphite according to [6], wherein the organic gas is a gas consisting of at least one of acetylene or an acetylene derivative.

[8] The manufacturing method for a film-like graphite according to [6] or [7], wherein at least a part of the heating step in the mixed gas is carried out at a temperature of $T_f$ or lower, where $T_f$ (° C.) is a highest temperature among temperatures at which a weight reduction rate (weight reduction per unit time) of the raw film is 10% or more of a maximum value, which is obtained by heating the raw film to 1,000° C. at a temperature increase rate of 10° C./min while flowing nitrogen gas at a flow velocity of 200 mL/min and carrying out a thermogravimetric analysis of the raw film.

[9] The manufacturing method for a film-like graphite according to [8], wherein an average temperature increase rate of 5° C./min or less and a period of 30 minutes or more are included in a temperature range of $T_s$ or higher and $T_f$ or lower in the heating step in the mixed gas, where in the thermogravimetric analysis, $T_s$ (° C.) is a lowest temperature among temperatures of 100° C. or higher and 0.8% or more of a maximum value of the weight reduction rate (weight reduction per unit time) of the measurement sample.

[10] The manufacturing method for a film-like graphite according to any one of [6] to [9], wherein the raw film is a laminated film in which two or more films made of an organic polymer are bonded to each other by a pressure-sensitive adhesive or an adhesive.

[11] The manufacturing method for a film-like graphite according to any one of [5] to [10], wherein a maximum heating temperature $T_{max}$ in the heating step is 2,400° C. or higher and 2,900° C. or lower.

[12] A manufacturing method for a film-like graphite comprising:

a carbonization step of heating a raw film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein the raw film has a thickness of 150 µm or more, a film-like graphite that has a thermal conductivity of 800 W/mK or more and a minimum bending radius of 16 mm or less according to a bend test is obtained at a maximum value in a temperature increase range of 60° C. or higher during optional 30 minutes in a temperature increase pattern obtained by a monotonic temperature increase in a temperature increase history of 2,000° C. or higher in the graphitization step.

[13] A manufacturing method for a film-like graphite comprising:

a carbonization step of heating a raw film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein a ratio ($S_g/S_m$) of an area $S_g$ of the graphitized film to an area $S_m$ of the raw film is 0.8 or more.

[14] The manufacturing method for a film-like graphite according to any one of [5] to [13], the method further comprising a press step of compressing or rolling the graphitized film that has a density of less than 1.7 g/cm$^3$ to obtain a film-like graphite that has a density of 1.7 g/cm$^3$ or more.

[15] A manufacturing method for a film-like graphite comprising:

a carbonization step of heating a film made of an organic polymer at 1,500° C. or lower in a mixed gas with an organic gas and an inert gas mixed to obtain a carbonized film; and a graphitization step of heating the carbonized film at 2,000° C. or higher in an inert gas to obtain a graphitized film, wherein a maximum value in a temperature increase range during optional 30 minutes in a temperature increase pattern obtained by a monotonic temperature increase in a temperature increase history of 2,000° C. or higher in the graphitization step is set to 60° C. or higher.

[16] The manufacturing method for a film-like graphite according to [15], wherein a product of a film thickness a (µm) of the film-like graphite and a thermal conductivity b (W/mK) of the film-like graphite in a direction along a film plane is 40,000 or more.

[17] The manufacturing method for a film-like graphite according to [15] or [16], wherein the film-like graphite has a thickness a of 23 µm or less.

[18] The film-like graphite according to any one of [1] to [4], wherein a value of N/H/W represented by Expression (1a) is preferably 0.001 or more and 0.04 or less, more preferably 0.001 or more and 0.02 or less, and still more preferably 0.001 or more and 0.015 or less.

[19] The film-like graphite according to any one of [1] to [4], and [18], wherein, an average area of a plurality of bright regions obtained from an image in a vertical cross-section of the film-like graphite with respect to a film plane, in which bright parts and dark parts observed in a polarization microscope image are binarized, is preferably 9 µm$^2$ or more and 100 µm$^2$ or less, more preferably 10 µm$^2$ or more and 90 µm$^2$ or less, still more preferably 12 µm$^2$ or more and 80 µm$^2$ or less, particularly preferably 16 µm$^2$ or more and 70 µm$^2$ or less, and most preferably 22 µm$^2$ or more and 60 µm$^2$ or less.

[20] The film-like graphite according to any one of [1] to [4], [18], and [19], wherein the thickness of the film-like graphite is preferably 15 µm or more and 250 µm or less, more preferably 30 µm or more and 200 µm or less, still more preferably 42 µm or more and 180 µm or less, and even still more preferably 50 µm or more and 150 µm or less, particularly preferably 58 µm or more and 130 µm or less, still particularly preferably 70 µm or more and 120 µm or less, and most preferably 80 µm or more and 120 µm or less.

[21] The film-like graphite according to any one of [1] to [4], and [18] to [20], wherein a ratio (surface area/film area) of a surface area to a film area of the film-like graphite is preferably 1.05 or more and 1.5 or less, more preferably 1.06 or more and 1.5 or less, and still more preferably 1.07 or more and 1.3 or less.

[22] The film-like graphite according to any one of [5] to [17], wherein the thickness of the raw film is preferably 20 µm or more and 550 µm or less, more preferably 45 µm or more and 400 μm or less, still more preferably 70 μm or more and 270 μm or less, and particularly preferably 120 μm or more and 270 μm or less.

[23] The manufacturing method for a film-like graphite according to any one of [5] to [17], and [22], wherein the organic polymer is preferably a polymer that has an aromatic ring, more preferably a polymer that is selected from the group consisting of polyimide, polyamide, polythiazole, polyoxadiazole, polybenzoxazole, polybenzobisoxazole, polybenzothiazole, polybenzobisthiazole, polybenzimidazole, polybenzobisimidazole, and polyparaphenylenevinylene and that has an aromatic ring, and still more preferably polyimide having an aromatic ring.

[24] The manufacturing method for a film-like graphite according to any one of [5] to [17], [22], and [23], wherein the carbonization step includes a heating step in a mixed gas, in which the raw film is heated in a mixed gas with an organic gas and an inert gas mixed, and a concentration of the organic gas in the mixed gas is preferably 2% by volume or more and 95% by volume or less, more preferably 5% by volume or more and 50% by volume or less, still more preferably 10% by volume or more and 40% by volume or less, particularly preferably 20% by volume or more and 30% by volume or less, and most preferably 25% by volume or more and 30% by volume or less.

[25] The manufacturing method for a film-like graphite according to any one of [5] to [17], and [22] to [24], wherein the carbonization step includes a heating step in a mixed gas, in which the raw film is heated in a mixed gas with an organic gas and an inert gas mixed, and a maximum heating temperature at the heating step in the organic gas is preferably 400° C. or higher and 1,000° C. or lower, more preferably 450° C. or higher and 800° C. or lower, and still more preferably 500° C. or lower and 600° C. or lower.

[26] The manufacturing method for a film-like graphite according to any one of [5] to [17], and [22] to [25], the method further comprising a graphitization step of graphitizing the carbonized film to obtain a graphitized film, wherein the maximum heating temperature $T_{max}$ in the graphitization step is preferably 2,400° C. or higher and 3,000° C. or lower, more preferably 2,700° C. or higher and 2,900° C. or lower, and still more preferably 2,750° C. or higher and 2,800° C. or lower.

[27] The manufacturing method for a film-like graphite according to any one of [5] to [17], and [22] to [26], wherein the ratio $(S_g/S_m)$ of the area $S_g$ of the graphitized film to the area $S_m$ of the raw film is preferably 0.8 or more and 1.2 or less, more preferably 0.9 or more and 1.1 or less, and still more preferably 1.0 or more and 1.1 or less.

[28] The manufacturing method for a film-like graphite according to any one of [5] to [16], and [22] to [27], the method further comprising a graphitization step of graphitizing the carbonized film to obtain a graphitized film, and a press step of compressing or rolling the graphitized film.

[29] The manufacturing method for a film-like graphite according to [28], a density of the film-like graphite obtained in the press step is preferably 1.6 g/cm³ or more and 2.2 g/cm³ or less, more preferably 1.7 g/cm³ or more and 2.1 g/cm³ or less, and still more preferably 1.8 g/cm³ or more and 2.0 g/cm³ or less.

Advantageous Effects of Invention

According to the present invention, it is possible to provide the film-like graphite that is thick, has a high thermal conductivity, is excellent in a heat dissipation performance, and furthermore is excellent in flexibility, with low-cost manufacturing, and the manufacturing method of the film-like graphite.

DESCRIPTION OF EMBODIMENTS

Figure 1:
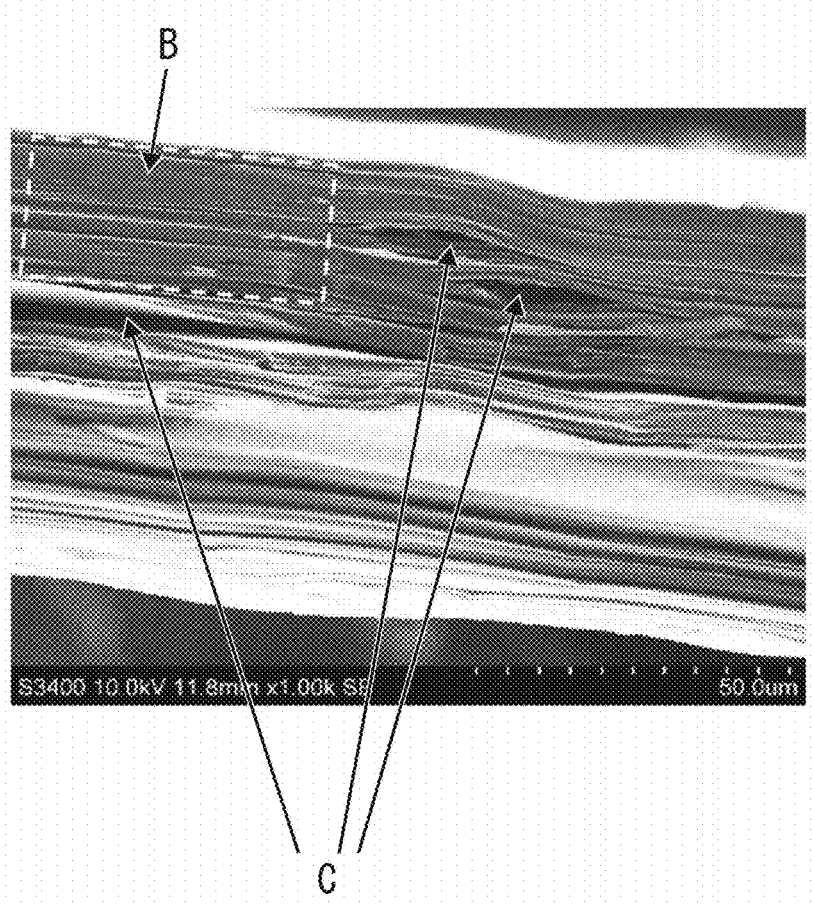
FIG. 1 is a fracture surface image of a film-like graphite of Example 5A observed by an SEM.

In the present specification, the term "film-like graphite" means a flexible film-like material that contains graphite as a main component and is composed of substantially only carbon.

The term "thickness" is a thickness measured using a standard external micrometer for any of a polymer film, a raw film, a carbonized film, a graphitized film, and a film-like graphite, and is an average value of thicknesses measured at five randomly selected positions.

[Film-Like Graphite]

A film-like graphite of the present invention is a film-like graphite that satisfies the following condition (1) or condition (2).

Condition (1): A graphite crystal orientation degree P is 96% or more with respect to a film plane.

Condition (2): A graphite crystal orientation degree P is 94% or more with respect to a film plane, and a thickness is 42 μm or more.

The film-like graphite of the present invention has a film thickness of 58 μm or more, and a thermal conductivity of 800 W/mK or more in a direction along the film plane.

A thickness of the film-like graphite of the present invention is preferably 42 μm or more, more preferably 50 μm or more, still more preferably 58 μm or more, even still more preferably 64 μm or more, yet even still more preferably 72 μm or more, particularly preferably 75 μm or more, more particularly preferably 80 μm or more, still more particularly preferably 85 μm or more, even still more particularly preferably 100 μm or more, and most preferably 102 μm or more. When the thickness is within the lower limit value or more, the heat dissipation performance per sheet of the film-like graphite is high, and the number of sheets of the film-like graphite required for heat dissipation of electronic devices and other devices can be reduced. In addition, the thickness of the film-like graphite of the present invention is preferably 250 μm or less, more preferably 200 μm or less, still more preferably 180 μm or less, even still more preferably 150 μm or less, particularly preferably 130 μm or less, and most preferably 120 μm or less. When the thickness is the above-described upper limit value or less, it is easy to make electronic devices and other devices thinner. Furthermore, it is easy to ensure a certain degree of flexibility in the film-like graphite.

The thermal conductivity of the film-like graphite of the present invention in the direction along the film plane is preferably 800 W/mK or more, more preferably 1,000 W/mK or more, still more preferably 1,200 W/mK or more, even still more preferably 1,350 W/mK or more, yet even still more preferably 14,000 W/mK or more, particularly preferably 1,550 W/mK or more, and more particularly preferably 1,600 W/mK or more. When the thermal conductivity is within the lower limit value or more, heat dissipation by the film-like graphite proceeds efficiently, and the number of sheets of the film-like graphite required for heat dissipation of electronic devices and other devices can be reduced. The higher thermal conductivity of the film-like graphite of the present invention in the direction along the film plane is more favorable, and the upper limit thereof is substantially about 2,200 W/mK.

The thermal conductivity of the film-like graphite in the direction along the film plane is calculated according to Expression 2 below.

$$b = \alpha \times d \times c \qquad \text{Expression 2}$$

Here, each symbol in Expression 2 has the following meanings.

b: Thermal conductivity (W/mK) of the film-like graphite in the direction along the film plane α: Heat diffusion rate (mm²/s) of the film-like graphite in the direction along the film plane d: Density of the film-like graphite (g/cm³)

c: Specific heat of graphite (0.85 J/gK)

The heat diffusion rate (a) of the film-like graphite in the direction along the film plane is measured in an environment of 23° C. by a periodic heating method according to JIS R 7240 (2018).

It is preferable that the film-like graphite of the present invention further satisfies the following condition (5). Thus, the heat dissipation performance per sheet of the film-like graphite is high, and the number of sheets of the film-like graphite required for heat dissipation of electronic devices and other devices can be reduced.

Condition (5): when a film thickness is denoted by a (μm) and a thermal conductivity is denoted by b (W/mK) in a direction along a film plane, the film-like graphite satisfies Expression 1a.

$$2,140 \leq 12a + b \qquad \text{Expression 1a.}$$

A value of 12a+b is preferably 2,140 or more, more preferably 2,200 or more, still more preferably 2,250 or more, even still more preferably 2,350 or more, particularly preferably 2,550 or more, and most preferably 2,750 or more. When the value of 12a+b is the lower limit value or more, it can be said that the film-like graphite has sufficiently high thermal conductivity of the film-like graphite in the thickness direction and in the direction along the film plane and has high heat dissipation performance. The higher value of 12a+b is more favorable, and the upper limit thereof is not particularly limited, but is substantially about 5,000.

It is preferable that the film-like graphite of the present invention further satisfies the following condition (6). As a result, the film-like graphite has excellent flexibility and is less likely to break or crack during handling.

Condition (2): a minimum bending radius measured in a bend test described later is 16 mm or less.

The minimum bending radius of the film-like graphite of the present invention is preferably 16 mm or less, more preferably 13 mm or less, still more preferably 10 mm or less, particularly preferably 8 mm or less, and most preferably 6 mm or less. The smaller minimum bending radius is more favorable, and the lower limit thereof is not particularly limited, but is substantially more than 0 mm.

(Bend Test)

In an environment of 23° C., the type 2 bend test machine defined by JIS K5600-5-1 was completely expanded, a film-like graphite test piece and a mandrel were attached, and the test piece was evenly folded 180° for 1 to 2 seconds to check the result test piece, and the presence or absence of creases or crack is confirmed. Each of the mandrels having diameters of 32, 25, 20, 16, 12, 10, 8, 6, 5, 4, 3, and 2 mm is used to carry out the above-described work of folding the test piece and visually confirming the test piece in order from the mandrel having the maximum diameter. In this case, in the folding carried out by using each mandrel, the test is performed while changing the position of the test piece so that deformation and the like caused by folding the test piece once will not affect the next test. Then, half of a diameter of a mandrel that is one size larger than the mandrel with which the crease or crack was first confirmed in the test piece, that is, half of a diameter of the smallest mandrel among the mandrels with which no crease or crack was confirmed in the test piece is set as a minimum bending radius of the film-like graphite.

The folding number when a bending radius R is 2 mm and a bending angle is 1800 in Tension-Free U-shape Folding Test of the film-like graphite of the present invention is preferably 10,000 or more, more preferably 20,000 or more, and still more preferably 30,000 or more. When the folding number of the film-like graphite is within the lower limit value or more, the handleability when the film-like graphite is attached to an electronic device is improved, and the film-like graphite is hardly broken or cracked even when used in a folded part or part where folding is repeated in an electronic device and other devices. The larger folding number is more favorable, and the lower limit is not particularly limited, but the folding number is substantially 1,000,000 or less.

(Tension-Free U-Shape Folding Test)

The Tension-Free U-shape Folding Test for the film-like graphite can be carried out by using, for example, a desktop model endurance test machine DLDMLH-FS manufactured by YUASA SYSTEM Co., Ltd. and other machines. In the measurement of the folding number in the Tension-Free U-shape Folding Test, a bending angle, a bending radius, a test speed, and other conditions are selectable. In addition, an operation method of a tilt clamp during deformation of the film is selectable. After starting the test, for example, the test piece can be visually confirmed at a timing when the number of times of bending reaches 1,000, 2,500, 5,000, 10,000, 20,000, 30,000, 40,000, and 50,000. In this case, the number of times of folding until the test piece breaks is defined as the folding number.

The density of the film-like graphite of the present invention is preferably 1.7 g/cm$^3$ or more, more preferably 1.8 g/cm$^3$ or more, and still more preferably 1.9 g/cm$^3$ or more. When the density of the film-like graphite is within the lower limit value or more, the amount of voids causing hindrance to thermal conduction is reduced, and the thermal conductivity is increased. In addition, the density of the film-like graphite of the present invention is preferably 2.2 g/cm$^3$ or less, more preferably 2.1 g/cm$^3$ or less, and still more preferably 2.0 g/cm$^3$ or less. When the density of the film-like graphite is within the above-described upper limit value or less, it is easy to ensure the flexibility of the film-like graphite due to the presence of some voids.

An electrical conductivity of the film-like graphite of the present invention in the direction along the film plane is preferably 9,000 S/cm or more. The electrical conductivity is more preferably 10,000 S/cm or more, still more preferably 11,000 S/cm or more, particularly preferably 12,000 S/cm or more, and most preferably 13,5,000 S/cm or more. When the electrical conductivity is within the lower limit value or more, electrical conduction by the film-like graphite proceeds efficiently, and the performance of batteries such as a lithium-ion battery and an all-solid battery when used as a negative-electrode active material and negative-electrode current collector is remarkably improved. The higher electrical conductivity of the film-like graphite of the present invention in the direction along the film plane is more favorable, but the upper limit thereof is substantially about 30,000 S/cm.

The film-like graphite of the present invention preferably has a multilayer structure in which a plurality of layers overlap with each other, the multilayer structure preferably has a width of 40 μm or more and a thickness of 8 μm or more, and an angle between a direction of each layer constituting the multilayer structure and the direction along the film plane is preferably 20° or less.

Here, "the multilayer structure has a width of XX μm or more and a thickness of Y μm or more" means that "the multilayer structure can include a rectangular shape in which a region constituting the multilayer structure has a length of XX μm on one side and a length of Y μm on the other side, which are adjacent to each other, and a direction of the side with the length of XX μm coincides with a direction of a layer". However, the region constituting the multilayer structure and the direction of the layer are obtained by the observation of crack propagation in mode I fracture surface of the film-like graphite with a scanning electron microscope (SEM).

The film-like graphite of the present invention more preferably has a width of 50 μm or more and a thickness of 10 μm or more of the multilayer structure included therein.

The "angle between a direction of each layer constituting the multilayer structure and the direction along the film plane is 20° or less" means that an angle between the direction of the layers in the multilayer structure obtained by the observation of crack propagation in mode I fracture surface of the film-like graphite with a scanning electron microscope (SEM) and a direction in an SEM image of the film-like graphite along the film plane is 20° or less. The angle between the direction of the layers and the direction of the film plane is more preferably 100 or less.

When the width of the multilayer structure included in the film-like graphite is 40 μm or more, the thickness is 8 μm or more, and the angle between the direction of each layer constituting the multilayer structure and the direction along the film plane is 20° or less, the multilayer structure is formed to be sufficiently large, the thermal conduction is less likely to be hindered by the voids, and the thermal conductivity in the direction along the film plane becomes higher.

When each layer has small-amplitude undulations with short-period, that is, there are many unevenness, a structure in which adjacent layers are in contact with each other at a plurality of positions is included in the multilayer structure. The presence of the multilayer structure in the film-like graphite of the present invention increases the thermal conductivity in the direction along the film plane and improves the heat dissipation performance.

Each layer constituting the multilayer structure has a flat surface or a smooth curved surface, and adjacent layers are preferably in close contact with each other. Thereby, the thermal conductivity in the direction along the film plane is further increased, and the heat dissipation performance of the film-like graphite is improved. Here, the "adjacent layers are in close contact with each other" means that no void between the adjacent layers is ascertained in an image of crack propagation in mode I fracture surface of the film-like graphite, which is observed by a scanning electron microscope (SEM), even though the observation is carried out at an acceleration voltage of 10 kV and a magnification of 1,000 times.

When a pressure of 100 MPa is applied to the entire film plane of the film-like graphite to compress the entire film plane in an environment of 25° C., a ratio $(T_a/T_b)$ of a film thickness $T_a$ (μm) after compression to a film thickness $T_b$ (μm) before compression is preferably 0.7 or more, more preferably 0.8 or more, and still more preferably 0.9 or more. The film thickness $T_a$ after compression is a thickness measured 5 minutes after the compression load was removed. The film-like graphite having $T_a/T_b$ within the lower limit value or more is a sufficiently compressed film-like graphite and has a high thermal conductivity in the direction along the film plane. The higher $T_a/T_b$ of the film-like graphite of the present invention is more favorable, but the upper limit thereof is substantially about 1.0.

The film-like graphite of the present invention includes, as another example, a multilayer structure in which a plurality of layers overlap with each other, and it is preferable that the multilayer structure has a width of 40 μm or more and a thickness of 8 μm or more, an angle between a direction of each layer constituting the multilayer structure and a direction along a film plane is 20° or less, and the film-like graphite has a density of 1.7 g/cm$^3$ or more. When the width of the multilayer structure is 40 μm or more, the thickness is 8 μm or more, the angle between the direction of each layer constituting the multilayer structure and the direction along the film plane is 20° or less, and the density is 1.7 g/cm$^3$ or more, the multilayer structure is formed to be sufficiently large, and a ratio of the voids is reduced. As a result, the thermal conductivity in the direction along the film plane becomes higher.

In addition, the film-like graphite of the present invention has a thickness of preferably 58 μm or more, more preferably 64 μm or more, still more preferably 75 μm or more, particularly preferably 85 μm or more, and most preferably 100 μm or more. When the thickness is within the lower limit value or more, the heat dissipation performance per sheet of the film-like graphite is high, and the number of sheets of the film-like graphite required for heat dissipation of an electronic device and other devices can be reduced.

Furthermore, the film-like graphite of the present invention has a minimum bending radius of preferably 16 mm or less, more preferably 13 mm or less, still more preferably 10 mm or less, particularly preferably 8 mm or less, and most preferably 6 mm or less. When the minimum bending radius is within the above-described upper limit value or less, the film-like graphite has excellent flexibility and is less likely to break or crack during handling.

In the film-like graphite of the present invention, the product (a×b) of the film thickness a (μm) and the thermal conductivity b (W/mK) in the direction along the film plane is preferably 88,000 or more, more preferably 110,000 or more, still more preferably 135,000 or more, particularly preferably 140,000 or more, and most preferably 160,000 or more. When the product of a and b is within the lower limit value or more, the heat dissipation performance per sheet of the film-like graphite is high, and the reduction of the number of sheets of the film-like graphite required for heat dissipation of electronic devices and other devices and use of the thinner film can be achieved. In the present invention, the "heat dissipation performance" is the ability of a certain material to transfer an amount of heat per unit time, and according to Fourier's law, the larger the thermal conductivity of a material or the greater the cross-sectional area of the material, the higher the heat dissipation performance. The cross-sectional area described herein is a cross-sectional area orthogonal to a direction of heat transport, and the larger the thickness, the higher the heat dissipation performance. In the film-like graphite, a×b is an index of the heat dissipation performance. The higher product (a×b) of the film-like graphite of the present invention is more favorable, but the upper limit thereof is a substantially about 500,000.

The film-like graphite of the present invention preferably has a film thickness a (μm) of 50 μm or more, a thermal conductivity b of 1,350 W/mK or more in the direction along the film plane, and a product of a and b of 100,000 or more.

The thickness a of the film is more preferably 58 μm or more, still more preferably 64 m or more, even still more preferably 75 μm or more, particularly preferably 85 μm or more, and most preferably 100 μm or more.

When the thickness is 50 μm or more, the heat dissipation performance per sheet of the film-like graphite is high, and the number of sheets of the film-like graphite required for heat dissipation of an electronic device and other devices can be reduced.

The thermal conductivity b is more preferably 1,550 W/mK or more.

When the thermal conductivity b is 1,550 W/mK or more, the heat dissipation performance per sheet of the film-like graphite is high, and the number of sheets of the film-like graphite required for heat dissipation of an electronic device and other devices can be reduced.

From the viewpoint of this, the thermal conductivity b is still more preferably 1650 W/mK or more and most preferably 1750 W/mK or more.

The thermal conductivity of the film-like graphite of the present invention in the direction perpendicular to the film plane is preferably more than 0 W/mK, more preferably 0.5 W/mK, still more preferably 1 W/mK or more, and particularly preferably 3 W/mK or more. When the thermal conductivity in the direction perpendicular to the film plane is within the lower limit value or more, heat dissipation of the film-like graphite in the vertical direction proceeds efficiently. The upper limit of the thermal conductivity of the film-like graphite of the present invention in the direction perpendicular to the film plane is not particularly limited, but is substantially preferably 20 W/mK or less because the film may have inferior thermal conductivity in the film plane direction when the thermal conductivity in the vertical direction is too high.

It is preferable that the film-like graphite of the present invention is made of a single film-like graphite and does not include a layer formed of an adhesive or a pressure-sensitive adhesive in the film thickness direction. Methods of laminating a plurality of sheets of a film-like graphite with an adhesive or a pressure-sensitive adhesive, or coating a plurality of sheets of a film-like graphite with a coating material, fixing a plurality of sheets of a film-like graphite with a metal jig, and other methods are known for obtaining a thick film-like graphite. However, in such methods, there are issues that an adhesive layer or a pressure-sensitive adhesive layer having a low thermal conductivity is included between the films to cause a decrease in the thermal conductivity, or air enters to cause large contact heat resistance. Since the film-like graphite of the present invention is formed of one thick film-like graphite, it is possible to make the thermal conductivity higher than that of the same thickness.

The film-like graphite of the present invention described above has the excellent heat dissipation performance because of the thickness and high thermal conductivity, and also has flexibility. Therefore, it is not necessary to use a plurality of sheets of the thin film-like graphite in the related art in an overlapping manner. As a result, it is not necessary to include a layer having low thermal conductivity such as an adhesive, and the thickness of a heat dissipation body as a whole can be reduced without impairing the performance of the entire heat dissipation body.

[Manufacturing Method for Film-Like Graphite]

The manufacturing method for a film-like graphite of the present invention is a method of obtaining a film-like graphite by heating a raw film, and a heating step of heating the raw film may include a carbonization step and a graphitization step described below. In addition, it is preferable that the manufacturing method for a film-like graphite of the present invention further includes a press step described below.

Carbonization step: A raw film made of an organic polymer is carbonized to obtain a carbonized film.

Graphitization step: The carbonized film is graphitized to obtain a graphitized film.

Press step: The graphitized film is compressed or rolled.

It should be noted that, in the present invention, "carbonization" means that an organic polymer constituting a raw film is heated to vaporize a volatile component in the organic polymer, thereby converting the organic polymer into a carbon-rich substance. In the present invention, the "carbonized film" is a film having a structure rich in carbonaceous material by carbonization, and means a film in which elements other than carbon are removed until a mass ratio of elements other than carbon in the film is 20% or less. In the present invention, the "graphitization" means that the carbonized film is heated at a further higher temperature to remove impurities other than carbon almost completely and to proceed with graphitization to a high degree. The "graphitized film" means a film having an extremely high degree of graphitization and abundant graphite crystal structure.

(Raw Film)

The thickness of the raw film is preferably 75 μm or more, more preferably 125 μm or more, still more preferably 150 μm or more, even still more preferably 175 μm or more, particularly preferably 200 μm or more, and most preferably 250 μm or more. When the thickness of the raw film is within the lower limit value or more, it is easy to obtain a film-like graphite that is thick and has high heat dissipation performance per sheet. Therefore, the number of sheets of the film-like graphite required for heat dissipation of an electronic device and other devices can be reduced. In addition, the thickness of the raw film is preferably 550 μm or less, more preferably 500 μm or less, still more preferably 450 μm or less, even still more preferably 400 μm or less, particularly preferably 375 μm or less, and most preferably 270 μm or less. When the thickness of the raw film is within the above-described upper limit value or less, the amount of foaming during heating is reduced, and uneven performance is less likely to occur inside the film and on a surface layer. Therefore, it is easy to obtain a film-like graphite having a favorable quality. In addition, it is easy to ensure a certain degree of flexibility while making the obtained film-like graphite thick.

The raw film is a film made of an organic polymer.

As the organic polymer, a polymer having an aromatic ring and having a certain high molecular chain with properties of flatness, orientation, and rigidity properties is preferable. Examples of the polymer include polyimide, polyamide, polythiazole, polyoxadiazole, polybenzoxazole, polybenzobisoxazole, polybenzothiazole, polybenzobisthiazole, polybenzimidazole, polybenzobisimidazole, polyparaphenylenevinylene, and the like, which have an aromatic ring. Among these, polyimide is preferable from the viewpoint of availability. One or two or more kinds of the organic polymer for forming the raw film may be used.

As the raw film, a laminated film in which two or more polymer films made of an organic polymer are bonded to each other by a pressure-sensitive adhesive or an adhesive may be used.

The adhesive or the pressure-sensitive adhesive is not particularly limited and preferably contains a diamine or an acid anhydride which is a monomer of polyimide and a polyamic acid obtained by polymerizing a diamine or an acid anhydride as an adhesive component. Examples of a diamine include oxydianiline. Examples of an acid anhydride include pyromellitic anhydride. Examples of a polyamic acid include a polyamic acid obtained by polymerizing oxydianiline and pyromellitic anhydride. The pressure-sensitive adhesive or the adhesive is preferably a substance in which the above-described adhesive component is dissolved in a low-volatile organic solvent. An adhesive including a tacky fire, a phenol resin-based adhesive, an acrylic-based adhesive, a melamine-based adhesive, a silicone-based pressure-sensitive adhesive, or other adhesives may be used.

Means for applying the pressure-sensitive adhesive or the adhesive to the polymer film is not particularly limited as long as the pressure-sensitive adhesive or the adhesive can be uniformly applied. It is preferable that the polymer films are bonded to each other and pass through pressure rolls, and the remaining pressure-sensitive adhesive or adhesive is removed, thereby making the pressure-sensitive adhesive or adhesive between the polymer films as thin as possible. A thickness of the pressure-sensitive adhesive or the adhesive between the polymer films is not particularly limited, but is preferably 1 μm or less. By making the pressure-sensitive adhesive or the adhesive thinner, foaming in the carbonization step is readily prevented.

In addition, the carbonization step may also be performed after the polymer films are bonded to each other and then heated to remove the organic solvent. The heating temperature during removal of the organic solvent is preferably 350° C. or higher.

(Carbonization Step)

In the carbonization step, for example, the raw film is heated at 1,500° C. or lower in an inert gas or in a mixed gas of an organic gas and an inert gas to remove elements other than carbon until a mass ratio of elements other than carbon in the raw film is 20% or less. In the carbonization step, the temperature may be increased continuously or may be increased stepwise by providing a period of maintaining a constant temperature. In addition, the temperature may be increased and then lowered, and the temperature may be increased again. The carbonization step may be a batch heating method or may be a continuous supply heating method of continuously supplying the raw film.

The carbonization step preferably includes a heating step in a mixed gas of heating the raw film in the mixed gas of the organic gas and the inert gas. In a manufacturing method which does not include the heating step in the mixed gas, the carbonized film is likely to be peeled off inside the film or the film is likely to be broken due to the pressure of a gas generated by the decomposition of the carbonized film when the carbonized film is rapidly heated in the graphitization step. As a result, the thermal conductivity of the film-like graphite is likely to decrease. However, since the carbonization step includes the heating step in the mixed gas, the film breakage caused by the gas generated by the decomposition of the carbonized film can be prevented even though the temperature increase rate in the graphitization step is high. Thus, the film-like graphite having a high thermal conductivity can be readily obtained. By heating the raw film in the mixed gas of the organic gas and the inert gas, not only the loss of carbon due to the decomposition is readily prevented, but also the carbon in the organic gas is incorporated into the raw film. According to this, it is easier to obtain a carbonized film having a large area, resulting in obtaining a film-like graphite having a large area.

In the carbonization step including the heating step in the mixed gas, the raw film may be further heated in the inert gas after the heating step in the mixed gas, or the heating step in the mixed gas may be performed after heating the raw film in the inert gas. In addition, the entire carbonization step may be the heating step in the mixed gas.

The inert gas may be any gas that does not react with the raw film, and examples thereof include nitrogen gas, argon gas, or a mixed gas thereof. Among these, nitrogen gas is preferable from the viewpoint of excellent economic efficiency. One or two or more kinds of the inert gas may be used in the carbonization step.

The organic gas is an organic compound that becomes a gas at the heating temperature in the carbonization step. The organic gas is not particularly limited, and examples thereof include hydrocarbons such as methane, ethane, ethylene, and acetylene, which are gases at 23° C. and 1 atm. Even though the organic compound is a liquid or a solid at 23° C. and 1 atm, the organic compound which becomes a gas at the heating temperature in the carbonization step can be used as the organic gas. As the organic gas, a gaseous substance (A) consisting of at least one of acetylene or an acetylene derivative is preferable from the viewpoint that the loss of carbon due to the decomposition is readily prevented. One or two or more kinds of the organic gas may be used in the carbonization step.

A concentration of the organic gas in the mixed gas varies depending on the kind of the organic gas, and for example, in the case of acetylene gas, the concentration is preferably 2% by volume or more, more preferably 5% by volume or more, still more preferably 10% by volume or more, particularly preferably 20% by volume or more, and most preferably 25% by volume or more with respect to a total volume of the mixed gas. When the concentration of the organic gas is within the lower limit value or more, the loss of carbon due to the decomposition is readily prevented, the carbon in the organic gas is efficiently incorporated into the raw film, and finally, a film-like graphite having a large area can be readily obtained, resulting in an improvement of productivity. When the organic gas is acetylene gas, a concentration of the organic gas in the mixed gas is preferably 95% by mass or less, more preferably 50% by volume or less, still more preferably 40% by volume or less, and particularly preferably 30% by volume or less with respect to a total volume of the mixed gas. When the concentration of the organic gas is within the above-described upper limit value or less, unnecessary use of the organic gas is prevented, which leads to cost reduction, and is also industrially stable.

A period of 30 minutes or more in which an average temperature increase rate is 5° C./min or less (hereinafter, "slow temperature increase period") is preferably included in a temperature increase pattern obtained by a monotonic temperature increase in a temperature increase history in the heating step in the mixed gas. As a result, the carbon in the organic gas is efficiently and readily incorporated into the raw film, and the loss of carbon due to the thermal decomposition is readily prevented. Here, the "temperature increase pattern obtained by a monotonic temperature increase in a temperature increase history" is obtained by replacing a temperature at each point in the temperature increase history (temperature per hour) from the start of a temperature increase to the point of reaching the maximum temperature in the heating step (period of temperature increase) with the maximum temperature from the start of the temperature increase to that point. The "temperature increase pattern obtained by a monotonic temperature increase in a temperature increase history" is a monotonic increase function of the temperature with respect to time, which is composed only of a curve having a positive slope and a straight line with a slope of 0.

A measurement sample made of a raw film is heated up to 1,000° C. at a temperature increase rate of 10° C./min while nitrogen gas is flowing at a flow velocity of 200 mL/min, and the temperature and weight of the measurement sample being heated are recorded by a thermogravimetric analysis to define the following temperatures $T_p$, $T_s$, and $T_f$.

$T_p$ (° C.) is a temperature at which a weight reduction rate (weight reduction amount per unit time) observed in the thermogravimetric analysis reaches the maximum value.

$T_s$ (° C.) is the lowest temperature among temperatures of 100° C. or higher at which a weight reduction rate of the measurement sample observed in the thermogravimetric analysis is 0.8% or more of a maximum value of the weight reduction rate.

$T_f$(° C.) is the highest temperature among temperatures at which a weight reduction rate of the measurement sample observed in the thermogravimetric analysis is 10% or more of a maximum value of the weight reduction rate.

In the carbonization step, it is preferable to carry out at least a part of the heating step in the mixed gas at a temperature of $T_f$ or lower.

The temperature during the slow temperature increase period included in the heating step in the mixed gas is preferably $T_f$ or lower and more preferably $T_p$ or lower. On the other hand, the temperature during the slow temperature increase period is preferably $T_s$ or higher. When the temperature during the slow temperature increase period is within a range described above, the carbon is efficiently and readily incorporated from the organic gas into the raw film which is being heated and is proceeding with the decomposition, and the loss of carbon due to the decomposition is readily prevented.

In the heating step in the mixed gas, an average temperature increase rate during the slow temperature increase period in which the temperature is $T_s$ or higher and $T_f$ or lower is preferably 5° C./min or less, more preferably 3° C./min or less, and still more preferably 1° C./min or less. When the average temperature increase rate is within the above-described upper limit value or lower, it is possible to ensure the orientation of graphite crystals to some extent and to readily obtain a high quality film-like graphite even though the subsequent graphitization step is accelerated.

In addition, a length of the slow temperature increase period at which the temperature is $T_s$ or higher and $T_f$ or lower is preferably 30 minutes or more, more preferably 60 minutes or more, and still more preferably 90 minutes or more. Since the slow temperature increase period with a length of 30 minutes or more is included in the period in which the temperature having the temperature increase pattern obtained by a monotonic temperature increase in a temperature increase history is $T_s$ or higher and $T_f$ or lower, the organic gas can be sufficiently supplied; thereby the carbon is efficiently and readily incorporated from the organic gas into the raw film, and the loss of carbon due to the decomposition is readily prevented.

The maximum heating temperature in the heating step in the mixed gas is depending on the raw film and the organic gas used, but preferably 1,000° C. or lower, more preferably 800° C. or lower, and still more preferably 600° C. or lower. When the maximum heating temperature is the above-described upper limit value or lower, the organic gas can be stably handled. The maximum heating temperature in the heating step in the mixed gas is preferably $T_s$ or higher. When the maximum heating temperature is within the lower limit value or higher, the carbon in the organic gas is readily incorporated, and a carbonized film having a large area can be readily obtained because the reaction with the organic gas is carried out at a temperature at which the thermal decomposition of the raw film is likely to occur.

(Graphitization Step)

In the graphitization step, for example, in a graphitization furnace, the carbonized film is heated up to 2,000° C. or higher in an inert gas atmosphere, and graphite crystals are grown to obtain a graphitized film. For example, the temperature of the carbonized film in the carbonization furnace after the carbonization step may be lowered to a temperature at which the carbonized film is not affected by oxygen, and the carbonized film may be taken out from the carbonization furnace, transferred to a graphitization furnace, and heated again to carry out the graphitization step, or the carbonized film may be continuously heated without lowering the temperature after the carbonization step to carry out the graphitization step.

In the graphitization step, the temperature may be increased continuously or may be increased stepwise by providing a period of maintaining a constant temperature. In addition, the temperature may be increased and then lowered, and the temperature may be increased again. The graphitization step may be carried out in the form of a batch heating method or a continuous supply heating method in which the carbonized film is graphitized while being continuously supplied, or a carbonized film produced by the batch heating method may be graphitized in a graphitization furnace of a continuous heating method.

The maximum heating temperature $T_{max}$ in the graphitization step is preferably 3,000° C. or lower, more preferably 2,900° C. or lower, and still more preferably 2,800° C. or lower. When $T_{max}$ is within the above-described upper limit value or less, a heating element or a heat insulating material in the graphitization furnace is slowly consumed, so that the maintenance frequency can be reduced. In addition, since excessive growth of graphite crystals can be suppressed, appropriate voids are secured between the graphite crystals, and it is easy to obtain a film-like graphite having flexibility. Here, the voids between the graphite crystals are micro or macro voids observed in a carbon material. The $T_{max}$ is preferably 2,400° C. or higher, more preferably 2,700° C. or higher, and still more preferably 2,750° C. or higher. When $T_{max}$ is within the lower limit value or more, the carbon network surface of the graphite crystals in the film-like graphite is likely to be aligned in parallel with the film plane, and high thermal conduction characteristics are likely to be exhibited.

In the graphitization step, a maximum value (hereinafter, referred to as a "maximum temperature increase range for 30 minutes") in a temperature increase range during optional 30 minutes in the temperature increase pattern obtained by a monotonic temperature increase in a temperature increase history from 2,000° C. to $T_{max}$ is preferably set to 60° C. or higher. The maximum temperature increase range for 30 minutes is more preferably 90° C. or higher, and still more preferably 210° C. or higher. By setting the maximum temperature increase range for 30 minutes to 90° C. or more, it is possible to cause appropriate foaming in the carbonized film that is in the process of graphitization, and it is easy to obtain appropriate flexibility. In addition, it is possible to reduce the consumption of a heat insulating material of the graphitization furnace, the total amount of electric power in the graphitization step, and the like.

In the graphitization step, a maximum value (hereinafter, referred to as a "maximum temperature increase range for 60 minutes") in a temperature increase range during any 60 minutes in the temperature increase pattern obtained by a monotonic temperature increase in a temperature increase history from 2,000° C. to $T_{max}$ is preferably set to 120° C. or higher. The maximum temperature increase range for 60 minutes is more preferably 180° C. or higher, and still more preferably 420° C. or higher. By setting the maximum temperature increase range for 60 minutes to 120° C. or more, it is possible to cause appropriate foaming in the carbonized film that is in the process of graphitization, and it is possible to ensure appropriate flexibility.

In the graphitization step, a maximum value (hereinafter, referred to as a "maximum temperature increase range for 90 minutes") in a temperature increase range during any 90 minutes in the temperature increase pattern obtained by a monotonic temperature increase in a temperature increase history from 2,000° C. to $T_{max}$ is preferably set to 180° C. or higher.

In the graphitization step, in the temperature increase pattern obtained by a monotonic temperature increase in a temperature increase history from 2,000° C. to $T_{max}$, the time to reach $T_{max}$ is preferably 40 minutes or more, more preferably 60 minutes or more, and still more preferably 90 minutes or more.

The maximum temperature increase range for 60 minutes in the graphitization step is preferably 900° C. or lower and more preferably 720° C. or lower. When the maximum temperature increase range for 60 minutes is within the above-described upper limit value or less, the amount of gas generated per unit time from the inside of the film during the graphitization step is reduced, and thus a thick film-like graphite having excellent thermal conduction characteristics is readily obtained.

The maximum temperature increase range for 30 minutes in the graphitization step is preferably 540° C. or lower, more preferably 450° C. or lower, and most preferably 360° C. or lower. When the maximum temperature increase range for 30 minutes is within the above-described upper limit value or less, the amount of gas generated per unit time from the inside of the film during the graphitization step is further reduced, and thus a thick film-like graphite having excellent thermal conduction characteristics is further readily obtained.

In the present invention, a film-like graphite that has a thermal conductivity of 800 W/mK or more and a minimum bending radius of 16 mm or less according to the bend test is preferably manufactured by using the raw film that has a thickness of 150 μm or more at a maximum value in a temperature increase range of 60° C. or higher during optional 30 minutes in the temperature increase pattern obtained by a monotonic temperature increase in a temperature increase history of 2,000° C. or higher in the graphitization step. The bend test will be described in detail in Examples described later.

A ratio ($S_g/S_m$) of an area $S_g$ of the graphitized film obtained in the graphitization step to an area $S_m$ of the raw film is preferably 0.8 or more, more preferably 0.9 or more, and still more preferably 1 or more. As $S_g/S_m$ is larger, an area of the film-like graphite is larger. Thus, the productivity can be improved, and the cost can be reduced. The lower limit of $S_g/S_m$ is not particularly limited, but is substantially about 1.2.

(Press Step)

In the press step, the graphitized film obtained in the graphitization step is compressed or rolled. By carrying out the press step, layers of graphite crystals can be readily aligned in the direction along the film plane, voids in the graphitized film are crushed to increase the density, and furthermore, the warp or undulation generated in the graphitized film is also eliminated.

During the compression or rolling, it is preferable that the graphitized film is sandwiched between the two polyimide films. Contamination from the pressure roll can be prevented.

In the present invention, in the press step, it is preferable to obtain a film-like graphite having a density of 1.6 g/cm³ or more, more preferable to obtain a film-like graphite having a density of 1.7 g/cm³ or more, and still more preferable to obtain a film-like graphite having a density of 1.8 g/cm³ or more, from the graphitized film.

As a compression or rolling method, a method of passing a graphitized film between pressure rolls made of a hard material such as metal is preferable. In this case, the graphitized film may repeatedly pass through the same pressure rolls, or may sequentially pass through multi-stage pressure rolls. The compression or rolling method is not particularly limited to the above-described method, and for example, a method of sandwiching a graphitized film between metal plates and applying pressure thereon by a hydraulic cylinder or the like may be adopted.

In the manufacturing method for a film-like graphite of the present invention described above, by carrying out the heating step in the mixed gas, the amount of foamed gas is reduced even though the temperature increase rate is increased in the graphitization step, so that peeling off of the film surface or the film break is prevented. In addition, since the time for the graphitization step can be shortened, excessive growth of the graphite structure is suppressed, and a film-like graphite having flexibility can be obtained. Furthermore, since the shrinkage of the film during manufacturing is prevented, it is easy to obtain a film-like graphite having a large area, which is excellent in productivity and low cost.

In the present specification, the term "film-like graphite" means a flexible film-like material that is formed of aggregates of graphite crystallites and is composed of substantially only carbon.

[Film-Like Graphite]

A film-like graphite of an example according to the embodiment of the present invention has a graphite crystal orientation degree P of 96% or more in a film plane direction. A film-like graphite of another example according to the embodiment has a graphite crystal orientation degree P of 94% or more in the film plane direction, and a thickness of 42 μm or more. A film-like graphite of still another example of the embodiment has a graphite crystal orientation degree P of 92% or more in the film plane direction, a thickness of 58 μm or more, and a density of 1.6 g/cm³ or more.

The graphite crystal orientation degree P of the film-like graphite of the present invention in the film plane direction is preferably 92% or more, more preferably 93% or more, still more preferably 94% or more, and particularly preferably 95% or more, and most preferably 96% or more.

As the graphite crystal orientation degree P increases, the thermal conductivity of the film-like graphite in the film plane direction increases.

The upper limit of the graphite crystal orientation degree P is not particularly limited, but the upper limit is substantially about 99% because a film has inferior flexibility when the crystal orientation degree is too high.

The graphite crystal orientation degree P of the film-like graphite in the film plane direction can be obtained by using a wide-angle X-ray diffraction measurement method (reflection method, θ/2θ scan method) as follows.

(Evaluation Method for Graphite Crystal Orientation Degree P)

Figure 11:
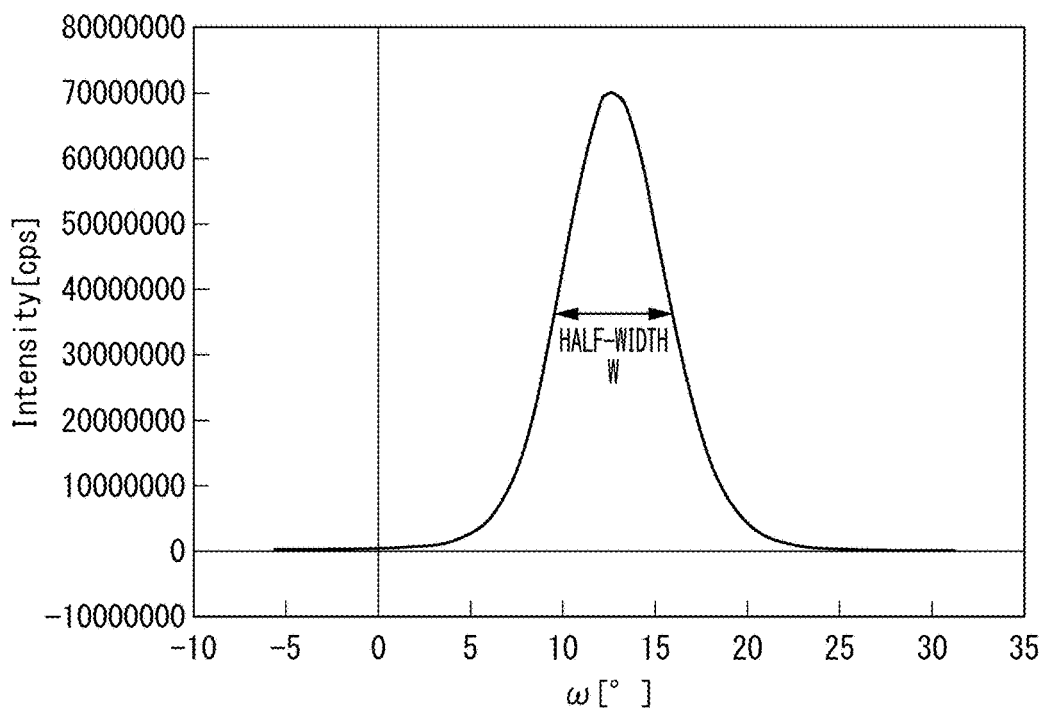
FIG. 11 is an example of a diffraction profile obtained from a w scan of a (002) plane diffraction peak derived from a graphite hexagonal crystal detected in the vicinity of $2\theta=26°$ in a wide-angle X-ray diffraction measurement method (reflection method, $\theta/2\theta$ scan method)

As a measurement device, an X-ray diffractometer having a CuKα ray as a radiation source is used. As the X-ray diffractometer, an X-ray diffractometer with sufficient performance, such as an automated multipurpose X-ray diffractometer (SmartLab) manufactured by Rigaku Corporation, can be used. The film-like graphite is fixed on a stage not to warp so that an incidence angle of incident an X-ray and a reflection angle of a reflected X-ray are equal to each other in a direction perpendicular to the film plane of the film-like graphite, and one-dimensional X-ray diffraction spectrum in a 2θ direction of the film-like graphite is measured by a θ/2θ scan method. A position of a (002) plane reflection diffraction peak position derived from a graphite hexagonal crystal, which is detected in the vicinity of 2θ=26° in the spectrum obtained by this measurement, is read, a detector is fixed at this peak position, and an X-ray diffraction spectrum of the film-like graphite is measured by an ω scan method. As a result, for example, a diffraction profile as shown in FIG. 11 is obtained. A half width W (°) of the diffraction peak is read from the diffraction profile, and the graphite crystal orientation degree P [%] is calculated by Expression 1 below.

$$P = \frac{180 - W}{180} \times 100 \qquad \text{Expression 1}$$

The thickness of the film-like graphite of the present invention is not particularly limited, but as the thickness increases, the amount of heat transport increases. Therefore, the thickness of the film-like graphite of the present invention is preferably 15 μm or more, more preferably 30 μm or more, still more preferably 42 μm or more, even still more preferably 50 μm or more, particularly preferably 58 μm or more, still particularly preferably 70 μm or more, and most preferably 80 μm or more. In addition, the thickness of the film-like graphite of the present invention is preferably 250 μm or less, more preferably 180 μm or less, still more preferably 150 μm or less, and particularly preferably 120 μm or less.

When the thickness is the upper limit value or less, it is easy to make electronic devices and other devices thinner. Furthermore, it is easy to ensure a certain degree of flexibility in the film-like graphite.

The term "thickness" described herein is a thickness measured using a standard external micrometer for any of a polymer film, a raw film, a carbonized film, a graphitized film, and a film-like graphite, and is an average value of thicknesses measured at five randomly selected positions.

A ratio of a surface area (surface area/film area) to a film area of the film-like graphite of the present invention is preferably 1.05 or more, more preferably 1.06 or more, and still more preferably 1.07 or more. As the surface area/film area is higher, the degree of foaming of the film-like graphite generated in the graphitization step is larger, and the voids are appropriately inserted into the film, thereby obtaining the film-like graphite having excellent flexibility. The upper limit of the surface area/film area is not particularly limited; however, as the surface area/film area is lower, the heat resistance at an interface due to the unevenness of the film plane is reduced. Therefore, the ratio of the surface area to the film area is preferably 1.5 or less and more preferably 1.3 or less.

(Evaluation Method for Surface Area/Film Area)

Here, the "surface area/film area" is defined as a ratio of the surface area calculated from a surface shape observed with a laser microscope to a film area in an observation range.

The laser microscope is used as a measurement device. A microscope having sufficient performance, such as a shape measurement laser microscope VK-X100 manufactured by KEYENCE CORPORATION, can be used. A 5×5 cm piece of a film-like graphite is placed on a stage such that the film does not warp and the film plane faces upward, and a 50× objective lens with 2048×1536 pixels is used to obtain surface topography data of a sample by moving the objective lens by 0.12 μm in the Z-axial direction (height direction).

The surface area is calculated from the obtained surface topography data of the sample, and the ratio (surface area/film area) with respect to the film area is calculated.

The film-like graphite of the present invention described above has a high thermal conductivity in the film plane direction and has the excellent heat dissipation performance. Moreover, this is a feature that is similarly satisfied with respect to a thick film-like graphite regardless of the film thickness.

In addition, when the ratio (surface area/film area) is 1.05 or more, the excellent flexibility can be obtained.

(Expression Mechanism of Flexibility)

A mechanism of obtaining film-like graphite having flexibility and excellent bending resistance is considered as follows. A thermal decomposition gas is generated inside the film in the graphitization step during the manufacturing, which causes voids to be generated between graphite crystallites. The graphite crystallites become slippery against each other because of the voids, and the entire film can be folded with no graphite crystallites broken, which is due to the stress generated during folding.

When the thermal decomposition gas is generated inside the film, cracks occur on the film surface when the gas is discharged to the outside of the film. Alternatively, the alignment of the graphite crystals is disordered due to the formation of voids inside the film, which is confirmed as unevenness on the film surface. The present inventors used the ratio (surface area/film area) as an index of such a film surface shape, and found that the film-like graphite also has excellent flexibility when a value of the ratio is 1.05 or more.

It is preferable that the raw film appropriately contains inorganic fine particles or organic fine particles so that foaming occurs in the graphitization step. For example, an inorganic acid salt, an oxide, a polyester, a stearic acid, a trimellitic acid, an organic tin, a lead, an azo compound, and a nitron compound can be exemplary examples. In particular, inorganic acid salts such as phosphoric acid ester and calcium phosphate that can appropriately generate voids in the film-like graphite by a gas generated in the graphitization step are preferable. One or two or more kinds of the fine particles may be used.

In the present invention, a film-like graphite that has a thermal conductivity of 800 W/mK or more and a minimum bending radius of 16 mm or less according to the bend test is preferably obtained by using the raw film that has a thickness of 150 μm or more at a maximum value in a temperature increase range of 60° C. or higher during optional 30 minutes in the temperature increase pattern obtained by a monotonic temperature increase in a temperature increase history of 2,000° C. or higher in the graphitization step. The bend test will be described in detail in Examples described later.

In the present invention, it is preferable to manufacture the film-like graphite in which a product of a film thickness a (μm) and a thermal conductivity b (W/mK) in a direction along a film plane is 40,000 or more. Such a film-like graphite has a large amount of heat transport. In addition, from the viewpoint of facilitating thickness reduction of electronic devices and other devices, it is more preferable to manufacture a film-like graphite having a film thickness a of 23 μm or less.

In the present invention, it is preferable that the film-like graphite does not include a layer formed of an adhesive or a pressure-sensitive adhesive in the thickness direction of the film-like graphite and consists of one sheet of the film-like graphite. In order to improve the amount of heat transport, a method of bonding sheets of the film-like graphite to each other with an adhesive or a pressure-sensitive adhesive to obtain a film-like graphite multilayer is known. In this method, an adhesive layer having low thermal conductivity is included in the film-like graphite, resulting in an insufficient amount of heat transport. In the present invention, since such an adhesive layer is not included, the amount of heat transport is larger than that of the same thickness.

[Film-Like Graphite]

In the film-like graphite of an example according to the embodiment of the present invention, a number N of a plurality of bright regions obtained from an image in a vertical cross-section of the film-like graphite with respect to a film plane, in which bright parts and dark parts observed in a polarization microscope image are binarized/a film thickness H (μm)/a film width W (μm) (hereinafter, referred to as CN) is 0.015 or less. In addition, the film-like graphite of another example of the embodiment has a CN of 0.04 or less and a thickness of 42 μm or more. Furthermore, in the film-like graphite of another example of another embodiment, an average area (hereinafter, AS) of the plurality of bright regions is 22 μm² or more. Furthermore, in the film-like graphite of yet another example of yet another embodiment, an average area (hereinafter, AS) of the plurality of bright regions is 9 μm² or more, and a thickness thereof is 42 μm or more.

CN of the film-like graphite of the present invention is preferably $^{0.04}$ or less, more preferably 0.02 or less, and still more preferably 0.015 or less.

As CN decreases, the thermal conductivity of the film-like graphite in the film plane direction increases. The lower limit of CN is not particularly limited, but when CF is too low, the film has inferior flexibility, or the film has a low thermal conductivity without having a crystal structure right from the start. Therefore, the lower limit is substantially about 0.001.

In addition, AS of the film-like graphite of the present invention is preferably 9 μm² or more, more preferably 10 μm² or more, still more preferably 12 μm² or more, particularly preferably 16 μm² or more, and most preferably 22 μm² or more.

As AS increases, the thermal conductivity of the film-like graphite in the film plane direction increases. The lower limit of AS is not particularly limited, but the lower limit is substantially about 100 $\mu m^2$ because the film has inferior flexibility when AS is too low.

CN and AS of film-like graphite can be obtained by using a polarization microscope as follows.

(Number N of Plurality of Bright Regions/Film Thickness H ($\mu$m)/Film Width W ($\mu$m) and Evaluation Method for Average Area of Plurality of Bright Regions)

The film-like graphite is cut into strips using a cutter (or an ultrasonic cutter) or the like, and embedded in a resin to obtain a sample. Next, an epoxy resin covering a surface (cross-section) of the sample to be observed is completely removed by polishing with a handy wrap or the like, and a flat sample cross-section is produced by a cross section polisher and the like using an argon ion beam. A bright field image (BF image) and a simple polarization image (PO image) are obtained using a digital microscope or the like. The simple polarization image (PO image) is observed at a position of cross Nicol (orthogonal Nicol), and an angle of a sample stage on which the sample is placed is adjusted so that the luminance in the bright region in the sample is maximized.

An image is obtained using image analysis software or the like from the obtained PO image by binarization of bright parts and dark parts observed in the cross-section of the film-like graphite in a direction perpendicular to the film plane. The number of a plurality of bright regions obtained by binarization is measured and used as the number N of the bright regions.

Regarding the film thickness H, by using image analysis software and the like, the voids observed inside the film-like graphite are removed from the BF image obtained in the same manner described above to measure a total length of a solid part of the film-like graphite observed in the direction perpendicular to the film plane, and the result value is used as a film thickness.

Regarding the film width W, a width of the film-like graphite for which the count number is measured when measuring the count number from the PO image in the film plane direction is used as a film width.

CN is calculated from the number of counts, the film thickness, and the film width obtained by the above-described method.

The average area of the plurality of bright regions is obtained using image analysis software or the like by calculation of the average area of the plurality of bright regions obtained by the above-described method.

[Mechanism of Expression of Thermal Conductivity]

A mechanism of obtaining a film-like graphite having excellent thermal conductivity in the film plane direction is as follows. The thermal conduction of graphite is mainly caused by lattice vibration, that is, the phonon conduction. The thermal conduction by the phonon depends on the completeness of crystals of a solid, and the larger the crystallite size of graphite, the higher the thermal conductivity by the phonon. The propagation of phonon in graphite occurs on the basal surface (a-b axis) of the graphite. Therefore, in the film-like graphite, as the basal surface of a graphite crystal having a large crystallite size is aligned in the film plane direction, the thermal conductivity of the film-like graphite increases in the film plane direction.

Figure 16:
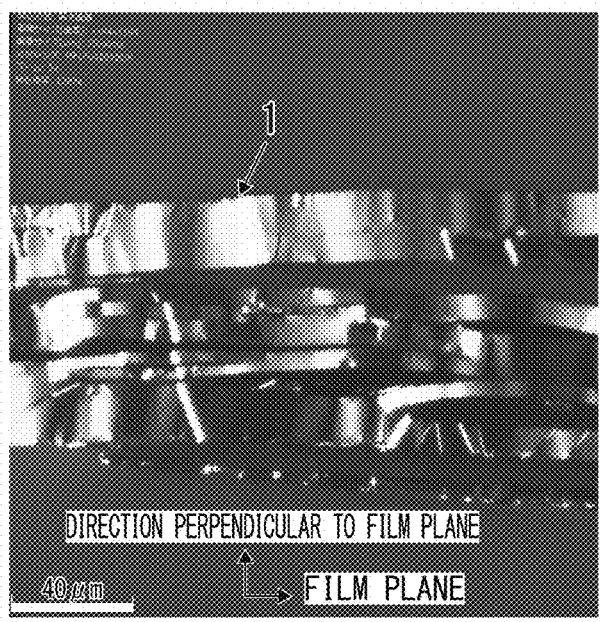
FIG. 16 is an example of a simple polarization image (PO image) observed by a polarization microscope in a vertical cross-section of a film-like graphite of Example 10C with respect to a film plane.
Figure 17:
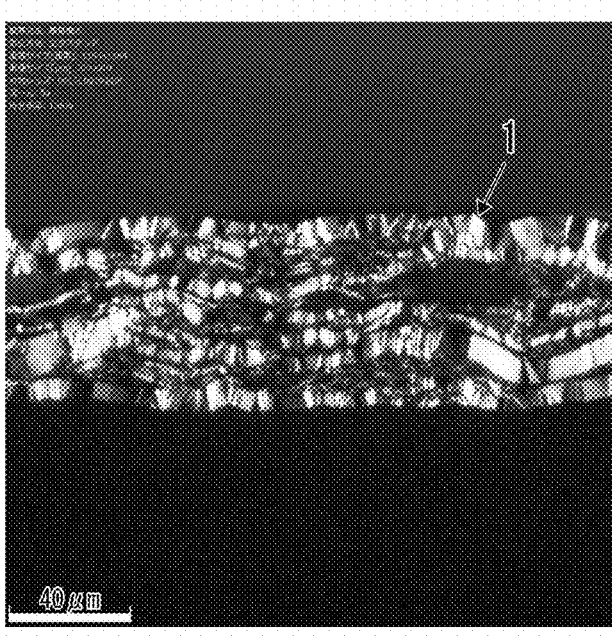
FIG. 17 is an example of a simple polarization image (PO image) observed by a polarization microscope in a vertical cross-section of a film-like graphite of Comparative Example 2C with respect to the film plane.
Figure 18:
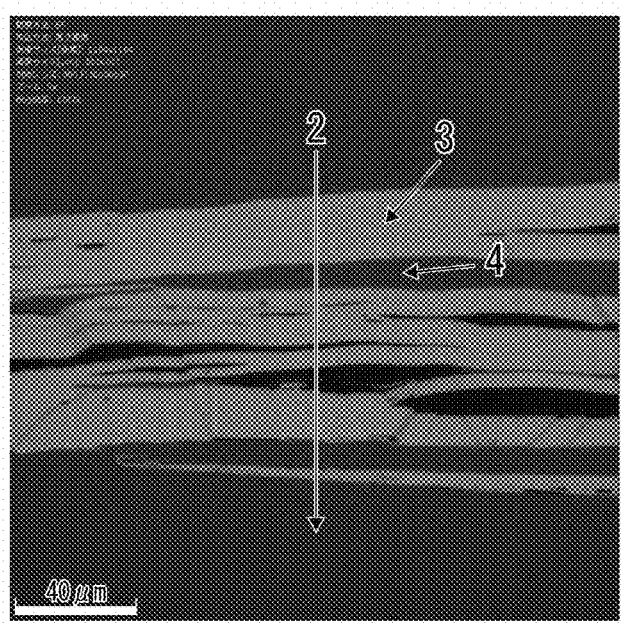
FIG. 18 is an example of a bright field image (BF image) observed by a microscope in a vertical cross-section of a film-like graphite of Example 10C with respect to the film plane.

The polarization microscope is one of evaluation methods capable of evaluating the crystallinity and crystal orientation of graphite and a polymer material. Since graphite is optically uniaxial crystal, the graphite exhibits optical anisotropy. When observation is performed under cross Nicol with a polarization microscope, it appears bright where graphite crystals oriented in a certain direction (two vibration directions of the graphite crystals do not match the vibration directions of both Nicols, that is, the orientation is in a direction that does not match the extinction position) are present. FIG. 16 and FIG. 17 are examples of an image of the cross-section of the film-like graphite in the direction perpendicular to the film plane, which is observed with the polarization microscope, and it is considered that a continuous bright region (bright regions) reflects the orientation of the graphite crystals in a certain direction. Therefore, the crystallinity and orientation of the film-like graphite can be evaluated by an analysis of this region that appears bright in the image observed.

As a result of diligent examination by the present inventors, it has been found that the number of counts/film thickness ($\mu$m)/film width ($\mu$m) (CN) when the number of the plurality of bright regions in the observed image is counted are favorably related with the thermal conductivity of the film-like graphite. That is, it was found that as the CN decreases, the thermal conductivity of the film-like graphite in the film plane direction increases. This is because when each of the graphite crystallites is small and a large number of crystallites are dispersed in the film, a large number of bright regions are separated and observed, thereby CN increasing, while as the graphite crystallites coalesce to increase the crystallite size, CN decreases. That is, it is considered that as the CN decreases, the interface between the graphite crystallites decreases, and it is difficult for the phonon to disperse, thereby increasing the thermal conductivity.

In addition, it was found that in another example of the embodiment, the average area of the plurality of bright regions is also related with the thermal conductivity. That is, it was found that as the average area increases, the thermal conductivity of the film-like graphite in the film plane direction increases. It is considered that this is because the size of the graphite crystallites increases as the average area of the bright regions increases, and the thermal conductivity is increased by the phonon, The film-like graphite of the present invention described above has a high thermal conductivity in the film plane direction and has the excellent heat dissipation performance. Moreover, this is a feature that is similarly satisfied with respect to a thick film-like graphite regardless of the film thickness.

In addition, when the ratio (surface area/film area) is 1.05 or more, the excellent flexibility can be obtained.

In the present invention, it is preferable to manufacture the film-like graphite in which a product of a film thickness a ($\mu$m) and a thermal conductivity b (W/mK) in a direction along a film plane is 40,000 or more. Such a film-like graphite has a large amount of heat transport. In addition, from the viewpoint of facilitating thickness reduction of electronic devices and other devices, it is more preferable to manufacture a film-like graphite having a film thickness a of 23 $\mu$m or less.

EXAMPLES

The present invention will be specifically described below with reference to Examples, but the present invention is not limited by the following description.

[Raw Film]

In all of the following examples, a polyimide film (manufactured by DU PONT-TORAY CO., LTD., Kapton (registered trademark) H type (hereinafter, referred to as "polyimide film KH")) was used as a raw film.

Figure 2:
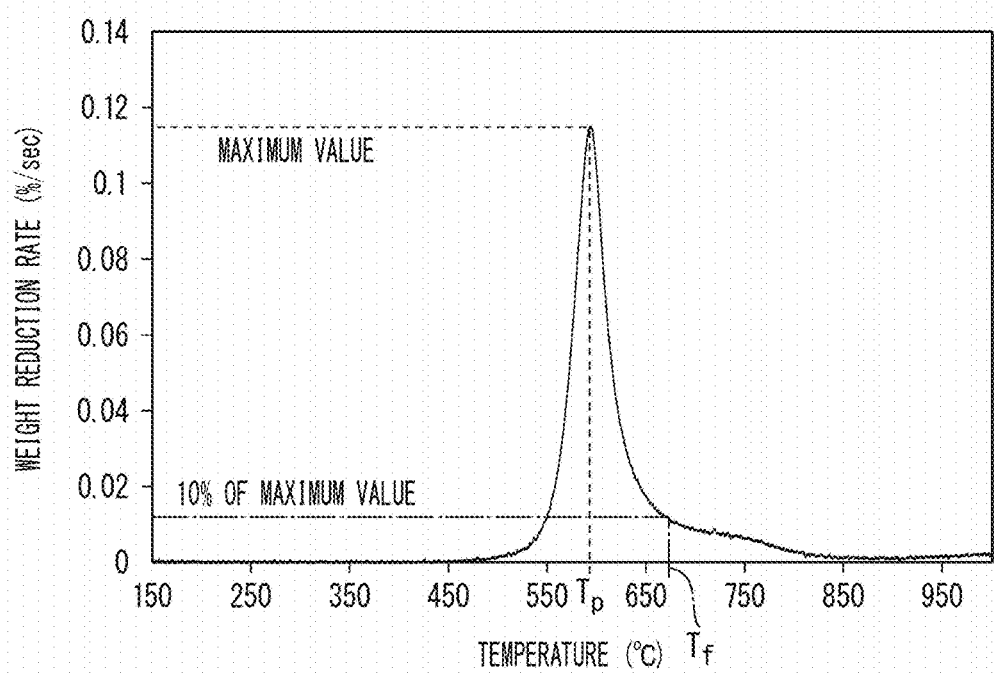
FIG. 2 is a plot diagram with respect to a temperature of a weight reduction rate (weight reduction amount per unit time) regarding a raw film used in Examples.

A thermogravimetric analysis was carried out on this polyimide film (KH (raw film)). Plotting with respect to a temperature of a weight reduction rate (weight reduction weight reduction per unit time) when the raw film is heated at 10° C./min in a nitrogen atmosphere was shown in FIG. 2, and $T_p$, $T_s$, and $T_f$ of the polyimide film KH were 595° C., 475° C., and 675° C., respectively.

[Thermogravimetric Analysis]

The thermogravimetric analysis (TG) was performed by using a simultaneous thermogravimetry-differential thermal analyzer (STA7300, manufactured by Hitachi High-Tech Corporation) in the following procedure.

A plurality of the raw films were cut into a size of about 3 mm square and stacked in a white container so that a weight was about 3 mg to be used as a measurement sample. The measurement sample was heated up to 1,000° C. at a temperature increase rate of 10° C./min while allowing nitrogen gas to flow at a flow velocity of 200 mL/min, and the temperature and weight of the measurement sample were recorded every second.

[Heat Diffusion Rate in Film Plane Direction]

A heat diffusion rate (α) of the film-like graphite in the direction along the film plane was measured in an environment of 23° C., using Thermowave Analyzer TA33 manufactured by BETHEL Co., Ltd., by a periodic heating method (distance-change method) according to JIS R 7240 (2018). Five measurement frequencies of 60 Hz, 70 Hz, 75 Hz, 80 Hz, and 90 Hz were used, and an average value of the heat diffusion rates individually measured at the five frequencies was used as the heat diffusion rate (a) of the film-like graphite in the direction along the film plane. During the measurement, the sample was cut out in the size of a length of 4 cm or more and 10 cm or less in a measurement direction and a length of 1.5 cm or more and 10 cm or less in a direction orthogonal to the film plane in the measurement direction, and a thickness of the cut sample was measured.

[Heat Diffusion Rate in Direction Perpendicular to Film]

A heat diffusion rate α' of the film-like graphite in the direction perpendicular to the film plane was measured in an environment of 23° C., using Thermowave Analyzer TA33 manufactured by BETHEL Co., Ltd., by a periodic heating method (frequency-change method). For the measurement frequency, 10 points were selected so that a phase was within a range of −3 rad or more and −1 rad or less, and the phase was measured. In this case, 10 points were selected so that frequency intervals were equal. The heat diffusion rate α' was calculated from the slope of the square root of the obtained phase and frequency. In the measurement, a size of the sample was 5 cm square, and the thickness was measured with a cut sample.

[Thermal Conductivity in Film Plane Direction]

The thermal conductivity of the film-like graphite in the direction along the film plane was calculated according to Expression 2 below.

$$b = \alpha \times d \times c \qquad \text{Expression 2}$$

Here, each symbol in Expression 2 has the following meanings.

b: Thermal conductivity (W/mK) of the film-like graphite in the direction along the film plane α: Heat diffusion rate (mm²/s) of the film-like graphite in the direction along the film plane d: Density of the film-like graphite (g/cm³)

c: Specific heat of graphite (0.85 J/gK)

[Thermal Conductivity in Direction Perpendicular to Film]

The thermal conductivity of the film-like graphite in the direction perpendicular to the film plane was calculated according to Expression 2-b.

$$b' = \alpha' \times d \times d \times c \qquad \text{Expression (2-b)}$$

Here, each symbol in Expression 2-b has the following meaning.

b': Thermal conductivity (W/mK) of the film-like graphite in the direction perpendicular to the film plane α': Heat diffusion rate (mm²/s) of the film-like graphite in the direction perpendicular to the film plane d: Density of the film-like graphite (g/cm³)

c: Specific heat of graphite (0.85 J/gK)

[Density]

The density d of the film-like graphite was obtained by measurement of weights of the film-like graphite in air and in ethanol to obtain a value from Expression 3.

$$d = \rho s \times Wa/(Wa - Ws) \qquad \text{Expression 3}$$

Here, each symbol in Expression 3 has the following meanings.

d: Density of the film-like graphite (g/cm³)

ρs: Density of ethanol (g/cm³)

Wa: Weight of the film-like graphite in air (g)

Ws: Weight of the film-like graphite in ethanol (g)

[Observation of Fracture Surface]

Information on an internal structure of the film-like graphite was obtained by observation on crack propagation in mode I fracture surface of the film-like graphite with a scanning electron microscope (SEM). Specifically, a rectangular sample having a short side of 10 mm or more is cut out from the film-like graphite, a depth of cut of 3 mm is made on each long side with a razor based on a straight line connecting the centers of a pair of long sides of the sample, tension was applied in the long side direction, and the crack was propagated to split the sample. The SEM observation was carried out on a fracture surface of the split sample at an acceleration voltage of 10 kV with a contrast at which the sample cross-section and the background part could be distinguished. In addition, the fracture surface was observed a plurality of times while changing the observation place so that the fracture surface could be continuously observed by 1 mm or more in the film plane direction.

[Compression Test]

In an environment of 25° C., a pressure of 100 MPa was applied to the entire film plane of the film-like graphite to compress the film-like graphite. Each of a film thickness $T_b$ (μm) of the film-like graphite before compression and a film thickness $T_a$ (μm) after compression were measured, and $T_a/T_b$ was calculated.

[Tension-Free U-Shape Folding Test]

The Tension-Free U-shape Folding Test for the film-like graphite was carried out by using a desktop model endurance test machine DLDMLH-FS manufactured by YUASA SYSTEM Co., Ltd. in accordance with the following procedures. A test piece was cut out to have a width of 50 mm and a length of 150 mm, and the test piece was fixed to a tester using a double-sided tape. The test was performed under a bending angle of 180°, a bending radius of 2 mm, and a test speed of 60 Hz. The tilt clamp was performed in a bend test mode in which a straight state and a bent state are repeated in accordance with a bending state of the test piece. After starting the test, the test piece was visually confirmed at a timing when the number of times of bending reaches 1,000, 2,500, 5,000, 10,000, 20,000, 30,000, 40,000, and 50,000, and the number of times of folding until the test piece was broken was defined as the folding number.

The press step in each of the following examples was carried out by using a hydraulic calendar embossing machine manufactured by Yuri Roll Co., Ltd. in accordance with the following procedures. A graphitized film was sandwiched between commercially available polyimide films and compressed under conditions of a linear pressure of 900 kg/cm to 2,700 kg/cm and a roll rotation speed of 0.5 m/min. Compression was repeated until a difference in film thickness before and after compression was within 1 μm. The linear pressure was defined as a value obtained by dividing a load of rolls by a length in a roll width direction of the graphitized film inserted into the rolls.

[Measurement Method for Electrical Conductivity]

The electrical conductivity of the film-like graphite in the direction along the film plane was measured by a four-probe method according to JIS K 7194 (1994) using a resistance meter RM3545 manufactured by HIOKI E.E. CORPORATION in an environment of 23° C. The four-point probe was pressed against the film-like graphite, and an electrical resistance value was measured. An electrical resistivity (R×RCF×t) was calculated from the product of three of an electrical resistance value R obtained by the measurement, a resistivity correction factor RCF calculated from sample shape, size, measurement position, and the like based on Poisson's equation, described in JIS K 7194 (1994), and a thickness t of the film-like graphite, to obtain an electrical conductivity from the reciprocal of electrical resistivity. In the measurement, a size of the sample was 5 cm square, and the thickness was measured with a cut sample.

Example 1A

A polyimide film of PIKH having a thickness of 125 μm was used as a raw film. A carbonization step of carbonizing a raw film was carried out in a carbonization furnace. In the carbonization furnace, under a nitrogen gas (acetylene gas concentration: 25% by volume) atmosphere including acetylene gas, the temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A film obtained after the carbonization step was temporarily allowed to cool, and then transferred to a graphitization furnace to carry out a graphitization step. In the graphitization furnace, under an argon atmosphere, the temperature was increased up to 2,800° C. while maintaining a temperature increase rate of about 10° C./min, held at 2,800° C. for 1 hour, and cooling was carried out to obtain a graphitized film. In the obtained graphitized film, no surface peeling off or breakage due to foaming was confirmed.

The obtained graphitized film was sandwiched between two polyimide films and compressed 7 times under conditions of a linear pressure of 900 kgf/cm and a roll rotation speed of 0.5 m/min to obtain a film-like graphite.

Example 2A

A film-like graphite was obtained in the same manner as in Example 1A, except that in the heating step in the mixed gas, the temperature increase rate was changed to be maintained at about 0.6° C./min.

Example 3A

A film-like graphite was obtained in the same manner as in Example 1A, except that in the graphitization step, the temperature increase rate was changed to be maintained at about 5° C./min.

Example 4A

A film-like graphite was obtained in the same manner as in Example 1A, except that in the graphitization step, the temperature increase rate was changed to be maintained at about 2° C./min.

Example 5A

Figure 3:
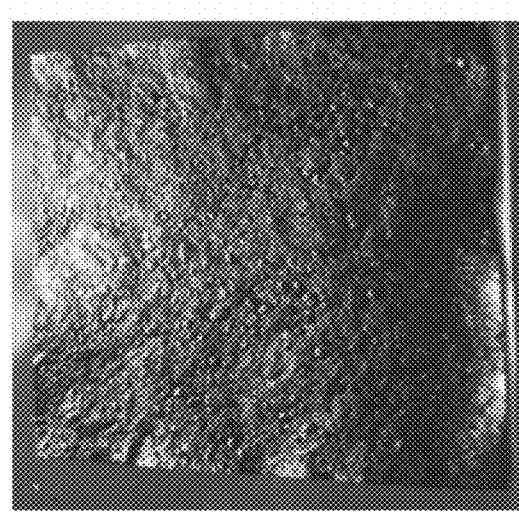
FIG. 3 is an external photograph of a graphitized film of Example 5A.
Figure 9:
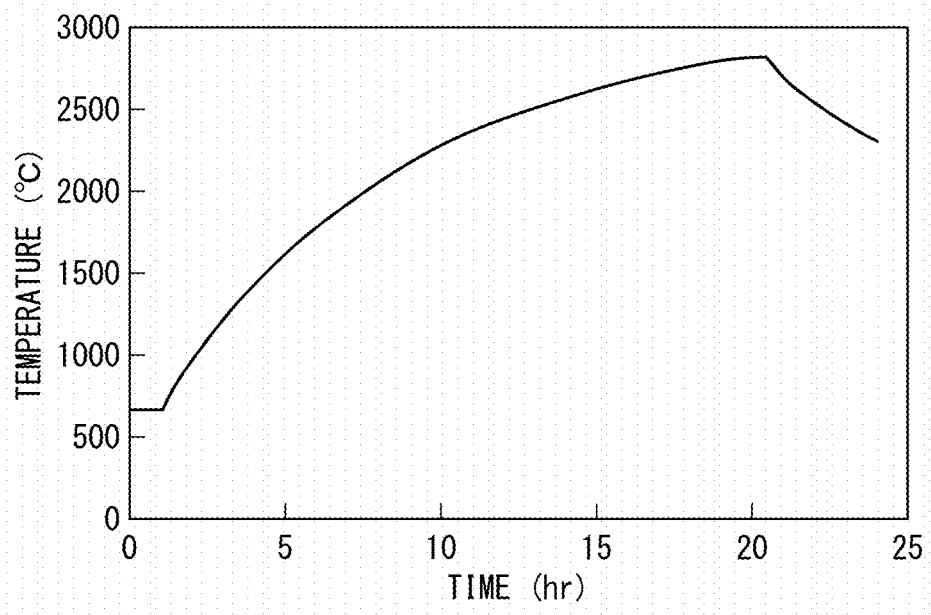
FIG. 9 is a temperature record of a graphitization step of Example 5A.

A film-like graphite was obtained in the same manner as in Example 1A except that in the graphitization step, a power output value of the graphitization furnace was set to a constant value, and the temperature was increased to indicate the temperature record shown in FIG. 9. According to the temperature record shown in FIG. 9, a temperature 30 minutes after the time when the temperature reached 2,000° C. was 2,062° C., the temperature 60 minutes after was 2,120° C., and the temperature 90 minutes after was 2,176° C. An SEM image of a fracture surface of the obtained film-like graphite is shown in FIG. 1. In addition, an external photograph of the graphitized film before compression is shown in FIG. 3.

A part represented by "B" in FIG. 1 is a multilayer structure, and parts represented by "C" are voids.

Example 6A

A 20% by mass N-methyl-2-pyrrolidone solution containing 20% by mass of a polyamic acid obtained by polymerization of oxydianiline and pyromellitic anhydride was applied to one surface of a polyimide film of PIKH having a thickness of 75 μm. Another polyimide film of PIKH having a thickness of 75 μm was bonded to the solution-applied surface of the polyimide film, and the pressure rolls used in Example 1A were then used as a mangle to remove an excess solution. The bonded films were placed under a nitrogen atmosphere at normal pressure, the temperature was increased at an average temperature increase rate of 2° C./min up to 350° C. and held for 1 hour, and the films were then allowed to cool, thereby obtaining a laminated film having a thickness of 150 μm, which was formed of two polyimide films having a thickness of 75 μm with the polyimide films firmly adhered. A film-like graphite was obtained in the same manner as in Example 5A except that this laminated film was used as a raw film.

Example 7A

A film-like graphite was obtained in the same manner as in Example 5A except that a laminated film having a thickness of 175 μm in which a polyimide film of PIKH having a thickness of 50 μm was bonded to a polyimide film of PIKH having a thickness of 125 μm in the same manner as in Example 6A was used as a raw film.

Example 8A

A film-like graphite was obtained in the same manner as in Example 5A except that a laminated film having a thickness of 200 μm in which a polyimide film of PIKH having a thickness of 75 μm was bonded to a polyimide film of PIKH having a thickness of 125 μm in the same manner as in Example 6A was used as a raw film.

Example 9A

A film-like graphite was obtained in the same manner as in Example 5A except that a laminated film having a thickness of 250 μm in which a polyimide film of PIKH having a thickness of 125 μm was bonded to a polyimide film of PIKH having a thickness of 125 μm in the same manner as in Example 6A was used as a raw film.

Example 10A

A Film-like graphite was obtained in the same manner as in Example 9A, except that the temperature increase rate in the graphitization step was set to be maintained at about 15° C./min.

Example 11A

A film-like graphite was obtained in the same manner as in Example 9A, except that $T_{max}$ in the graphitization step was set to 2,700° C., and the temperature was increased while maintaining a temperature increase rate of 2° C./min.

Example 12A

A film-like graphite was obtained in the same manner as in Example 11A except that a laminated film having a thickness of 200 μm in which a polyimide film of PIKH having a thickness of 75 μm was bonded to a polyimide film of PIKH having a thickness of 125 μm in the same manner as in Example 6A was used as a raw film.

Example 13A

A film-like graphite was obtained in the same manner as in Example 11A except that a laminated film having a thickness of 175 μm in which a polyimide film of PIKH having a thickness of 50 μm was bonded to a polyimide film of PIKH having a thickness of 125 μm in the same manner as in Example 6A was used as a raw film.

Example 14A

A film-like graphite was obtained in the same manner as in Example 1A except that a polyimide film of PIKH having a thickness of 75 μm was used as a raw film.

Example 15A

A film-like graphite was obtained in the same manner as in Example 1A, except that the temperature was increased while maintaining a temperature increase rate of about 1° C./min in the graphitization step, and $T_{max}$ was set to 2,900° C.

Example 16A

A Film-like graphite was obtained in the same manner as in Example 1A, except that the temperature increase rate in the graphitization step was set to be maintained at about 20° C./min.

Example 17A

A film-like graphite was obtained in the same manner as in Example 1A except that a laminated film having a thickness of 150 μm in which a polyimide film of PIKH having a thickness of 75 μm was bonded to a polyimide film of PIKH having a thickness of 75 μm in the same manner as in Example 6A was used as a raw film.

Example 18A

A film-like graphite was obtained in the same manner as in Example 1A except that a laminated film having a thickness of 175 μm in which a polyimide film of PIKH having a thickness of 50 μm was bonded to a polyimide film of PIKH having a thickness of 125 μm in the same manner as in Example 6A was used as a raw film.

Example 19A

A laminated film having a thickness of 200 μm in which a polyimide film of PIKH having a thickness of 75 μm was bonded to a polyimide film of PIKH having a thickness of 125 μm in the same manner as in Example 6A was used as a raw film. A carbonization step of carbonizing a raw film was carried out in a carbonization furnace. In the carbonization furnace, under a nitrogen gas (acetylene gas concentration: 25% by volume) atmosphere including acetylene gas, the temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 800° C. while maintaining the temperature increase rate at about 10° C./min. A film obtained after the carbonization step was temporarily allowed to cool, and then transferred to a graphitization furnace to carry out a graphitization step. A film-like graphite was obtained in the same manner as in Example 1A except that in the graphitization step, a power output value of the graphitization furnace was set to a constant value, and the temperature was increased to indicate the temperature record shown in FIG. 10. According to the temperature record shown in FIG. 10, a temperature 30 minutes after the time when the temperature reached 2,000° C. was 2,096° C., the temperature 60 minutes after was 2,185° C., and the temperature 90 minutes after was 2,270° C.

Example 20A

A film-like graphite was obtained in the same manner as in Example 19A except that a laminated film having a thickness of 250 μm in which a polyimide film of PIKH having a thickness of 125 μm was bonded to a polyimide film of PIKH having a thickness of 125 μm in the same manner as in Example 6A was used as a raw film.

Example 21A

A laminated film having a thickness of 200 μm in which a polyimide film of PIKH having a thickness of 75 μm was bonded to a polyimide film of PIKH having a thickness of 125 μm in the same manner as in Example 6A was used as a raw film. A carbonization step of carbonizing a raw film was carried out in a carbonization furnace. In the carbonization furnace, under a nitrogen gas (acetylene gas concentration: 25% by volume) atmosphere including acetylene gas, the temperature was increased from room temperature to 500° C. at an average temperature increase rate of 10°

C./min, and held for 3 hours. Thereafter, a film-like graphite was obtained in the same manner as in Example 19A, except that the atmosphere was switched into a nitrogen gas atmosphere, and the temperature was increased up to about 800° C. while maintaining a temperature increase rate of 10° C./min.

Example 22A

A film-like graphite was obtained in the same manner as in Example 21A except that a laminated film having a thickness of 250 μm in which a polyimide film of PIKH having a thickness of 125 μm was bonded to a polyimide film of PIKH having a thickness of 125 μm in the same manner as in Example 6A was used as a raw film.

Comparative Example 1A

A film-like graphite was obtained in the same manner as in Example 5A, except that without carrying out the heating step in the mixed gas, in the carbonization step, the temperature was increased up to 1,000° C. while maintaining a temperature increase rate of about 10° C./min under a nitrogen gas atmosphere, and held for 1 hour. An SEM observation image of a fracture surface of the obtained film-like graphite is shown in FIG. 4.

Figure 4:
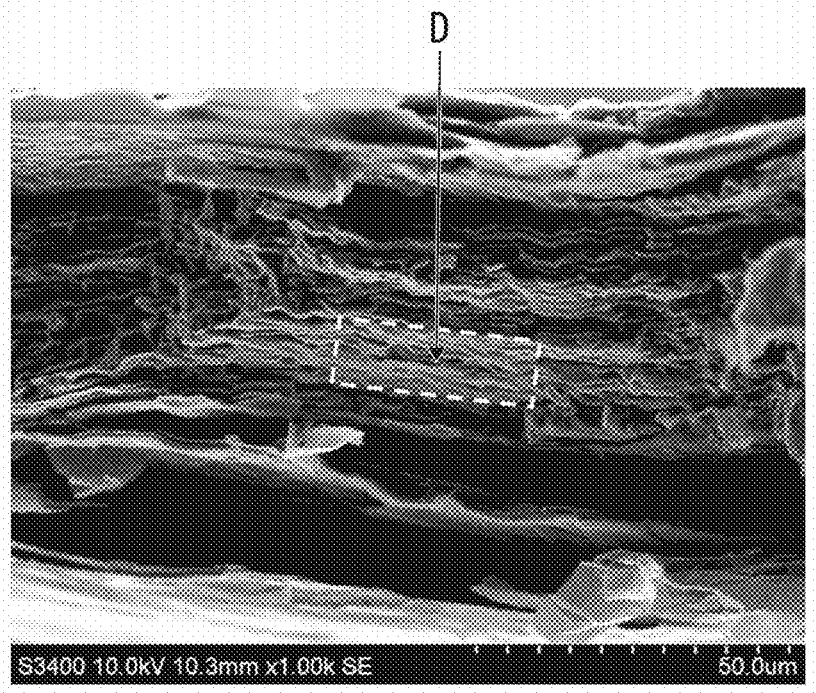
FIG. 4 is a fracture surface image of a film-like graphite of Comparative Example 1A observed by an SEM.

A part represented by "D" in FIG. 4 has a multilayer structure.

Comparative Example 2A

Figure 5:
FIG. 5 is an external photograph of a graphitized film of Comparative Example 2A.

A graphitized film was obtained in the same manner as in Example 7A, except that without carrying out the heating step in the mixed gas, in the carbonization step, the temperature was increased up to 1,000° C. while maintaining a temperature increase rate of about 10° C./min under a nitrogen gas atmosphere, and held for 1 hour. The obtained graphitized film was extremely hard and was broken in a subsequent press step. An external photograph of the graphitized film before compression is shown in FIG. 5.

Comparative Example 3A

Figure 6:
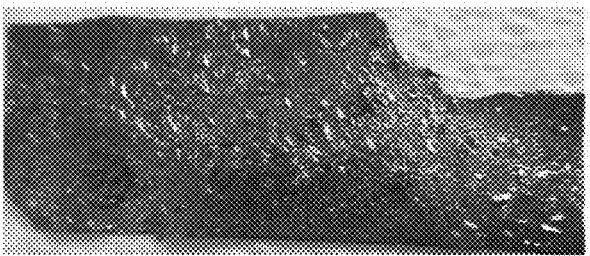
FIG. 6 is an external photograph of a graphitized film of Comparative Example 3A.

A graphitized film was obtained in the same manner as in Example 10A, except that a polyimide film of PIKH having a thickness of 125 μm was used as a raw film, without carrying out the heating step in the mixed gas, in the carbonization step, the temperature was increased up to 1,000° C. while maintaining a temperature increase rate of about 10° C./min under a nitrogen gas atmosphere, and held for 1 hour. Foaming occurred in the process of graphitization, and the graphitized film was partially broken. The graphitized film was hard and broken in a subsequent press step. An external photograph of the graphitized film before compression is shown in FIG. 6.

Comparative Example 4A

Figure 7:
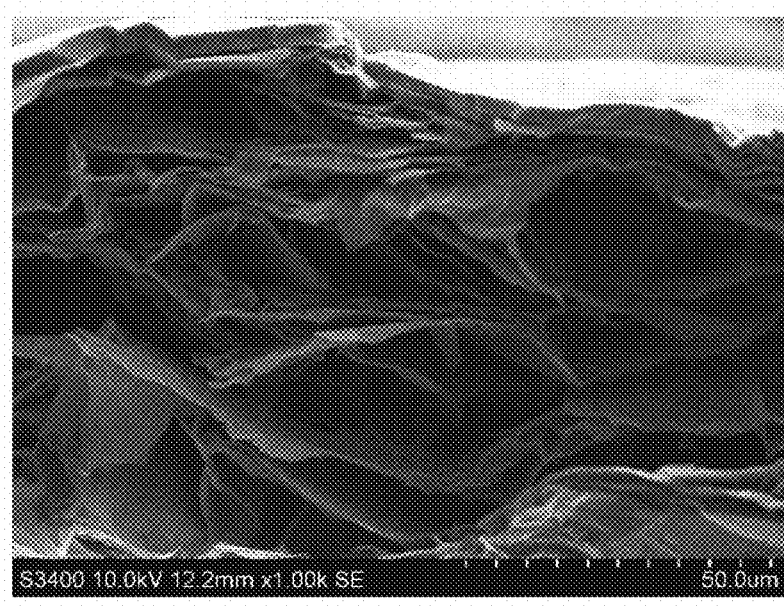
FIG. 7 is a fracture surface image of a film-like graphite (film-like graphite (EYGS121810) manufactured by Panasonic Corporation) of Comparative Example 4A observed by an SEM.

A film-like graphite (EYGS121810, thickness of 100 μm) manufactured by Panasonic Corporation was used as a comparison object. An SEM observation image of a fracture surface of the film-like graphite before compression is shown in FIG. 7.

Comparative Example 5A

A laminated film-like graphite in which one sheet of film-like graphite (EYGS121803, thickness of 25 μm) manufactured by Panasonic Corporation and three sheets of film-like graphite (EYGA121802F, PGS thickness of 17 μm, double-sided tape thickness of 6 μm) manufactured by Panasonic Corporation are bonded was used as a comparison object.

Manufacturing conditions of each example are shown in Table 1, and test results are shown in Table 2. In Table 2, among rectangles capable of being included in a region constituting a multilayer structure, which have a length of XX μm on one side and a length of Y μm on the other side, both sides being adjacent to each other, and have a direction of the length of XX μm on the side coinciding with a direction of the layer, XX μm and Y μm of the largest rectangle were indicated as a width and a thickness of a multilayer structure, respectively.

Figure 8:
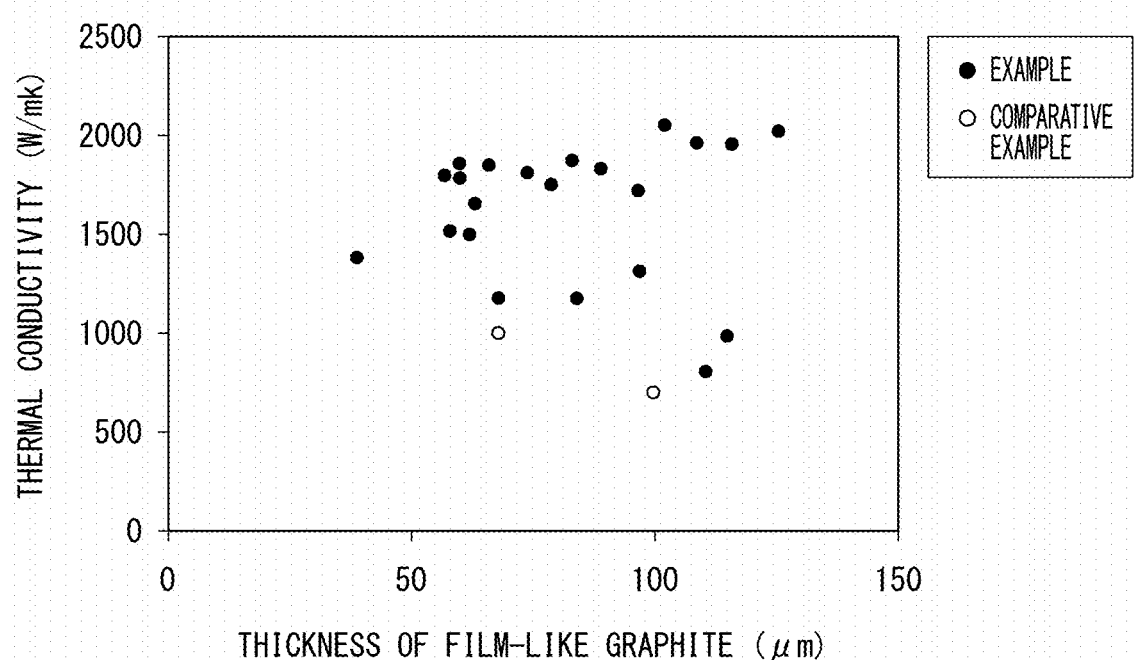
FIG. 8 is a plot diagram with respect to thermal conductivities and thicknesses of a film-like graphite in Examples 1A to 22A, Comparative Examples 1A and 4A.

In addition, plots of the thermal conductivity of the film-like graphite in each of Examples and Comparative Examples with respect to the thickness are shown in FIG. 8. For a plot of Comparative Example 4A in FIG. 8, a catalog value of a commercially available product was adopted.

TABLE 1

| | Thickness of raw film [μm] | Heating step in organic gas | | Graphitization step | | | |
| | | Presence/absence | Temperature increase rate [° C./min] | Temperature increase rate [° C./min] | $T_{max}$ [° C.] | Manufacturability | $S_g/S_m$ |
| --- | --- | --- | --- | --- | --- | --- | --- |
| Example 1A | 125 | Presence | 0.2 | 10 | 2800 | Manufacturable | 0.94 |
| Example 2A | 125 | Presence | 0.6 | 10 | 2800 | Manufacturable | 0.87 |
| Example 3A | 125 | Presence | 0.2 | 5 | 2800 | Manufacturable | 0.96 |
| Example 4A | 125 | Presence | 0.2 | 2 | 2800 | Manufacturable | 0.96 |
| Example 5A | 125 | Presence | 0.2 | With reference to FIG. 9 | 2800 | Manufacturable | 0.85 |
| Example 6A | 150 | Presence | 0.2 | With reference to FIG. 9 | 2800 | Manufacturable | 0.88 |
| Example 7A | 175 | Presence | 0.2 | With reference to FIG. 9 | 2800 | Manufacturable | 0.87 |
| Example 8A | 200 | Presence | 0.2 | With reference to FIG. 9 | 2800 | Manufacturable | 0.87 |
| Example 9A | 250 | Presence | 0.2 | With reference to FIG. 9 | 2800 | Manufacturable | 0.87 |
| Example 10A | 250 | Presence | 0.2 | 15 | 2800 | Manufacturable | 0.92 |
| Example 11A | 250 | Presence | 0.2 | 2 | 2700 | Manufacturable | 0.92 |
| Example 12A | 200 | Presence | 0.2 | 2 | 2700 | Manufacturable | 0.93 |
| Example 13A | 175 | Presence | 0.2 | 2 | 2700 | Manufacturable | 0.92 |
| Example 14A | 75 | Presence | 0.2 | 10 | 2800 | Manufacturable | 0.96 |

TABLE 1-continued

Figure 10:
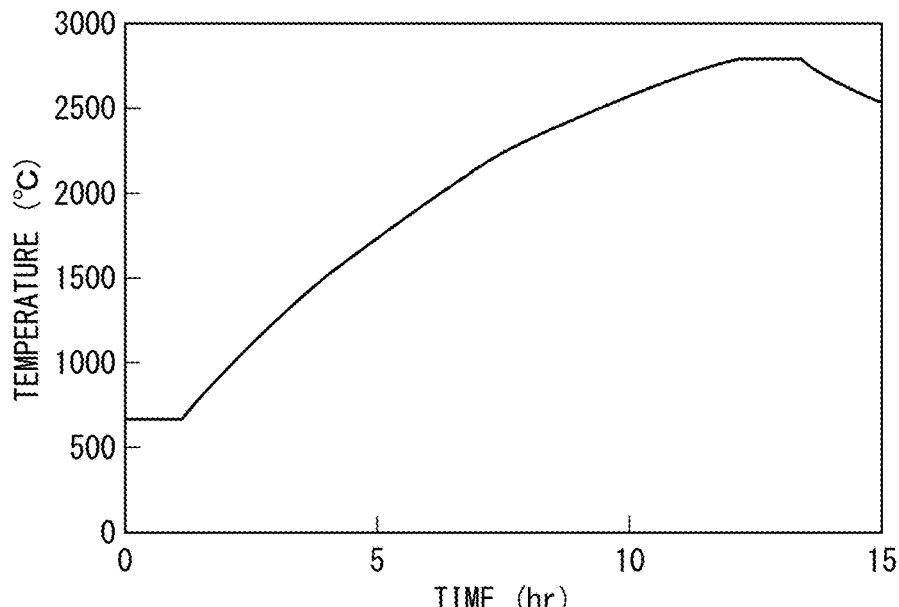
FIG. 10 is a temperature record of a graphitization step of Example 19A.

| | Thickness of raw film [μm] | Heating step in organic gas | | Graphitization step | | | |
| | | Presence/absence | Temperature increase rate [° C./min] | Temperature increase rate [° C./min] | $T_{max}$ [° C.] | Manufacturability | $S_g/S_m$ |
|---|---|---|---|---|---|---|---|
| Example 15A | 125 | Presence | 0.2 | 1 | 2900 | Manufacturable | 0.95 |
| Example 16A | 125 | Presence | 0.6 | 20 | 2800 | Manufacturable | 0.88 |
| Example 17A | 150 | Presence | 0.2 | 10 | 2800 | Manufacturable | — |
| Example 18A | 175 | Presence | 0.2 | 10 | 2800 | Manufacturable | — |
| Example 19A | 200 | Presence | 0.2 | With reference to FIG. 10 | 2800 | Manufacturable | 0.92 |
| Example 20A | 250 | Presence | 0.2 | With reference to FIG. 10 | 2800 | Manufacturable | 0.89 |
| Example 21A | 200 | Presence | 0 | With reference to FIG. 10 | 2800 | Manufacturable | 0.89 |
| Example 22A | 250 | Presence | 0 | With reference to FIG. 10 | 2800 | Manufacturable | 0.93 |
| Comparative Example 1A | 125 | Absence | — | With reference to FIG. 9 | 2800 | Manufacturable | 0.71 |
| Comparative Example 2A | 175 | Absence | — | With reference to FIG. 9 | 2800 | Unmanufacturable | — |
| Comparative Example 3A | 125 | Absence | — | 15 | 2800 | Unmanufacturable | — |
| Comparative Example 4A | Unclear | Absence | — | Unclear | Unclear | Manufacturable | Unclear |
| Comparative Example 5A | Unclear | Absence | — | Unclear | Unclear | Manufacturable | Unclear |

TABLE 2

| | Film-like graphite | | | | | | |
| | Thickness a [μm] | Thermal conductivity b in film plane direction [W/mK] | Thermal conductivity in direction perpendicular to film plane [W/mK] | Electrical conductivity [S/cm] | 12a + b | a × b [$10^4$ μm × W/mK] | Minimum bending radius [mm] |
|---|---|---|---|---|---|---|---|
| Example 1A | 60 | 1780 | | 10159 | 2500 | 10.7 | 1.5 |
| Example 2A | 58 | 1516 | | 9832 | 2212 | 8.8 | 2.0 |
| Example 3A | 63 | 1651 | | 11507 | 2407 | 10.4 | 2.5 |
| Example 4A | 62 | 1497 | | 13755 | 2241 | 9.3 | 4.0 |
| Example 5A | 62 | 1859 | 7.6 | 12205 | 2579 | 11.2 | 1.0 |
| Example 6A | 66 | 1850 | 3.8 | 14864 | 2642 | 12.2 | 5.0 |
| Example 7A | 79 | 1750 | 5.8 | 11912 | 2698 | 13.8 | 5.0 |
| Example 8A | 89 | 1832 | | 16313 | 2900 | 16.3 | 8.0 |
| Example 9A | 109 | 1964 | 3.2 | | 3272 | 21.4 | 10 |
| Example 10A | 111 | 809 | | | 2141 | 9.0 | 8.0 |
| Example 11A | 115 | 988 | 4.7 | | 2368 | 11.4 | 8.0 |
| Example 12A | 97 | 1315 | 2.2 | | 2479 | 12.8 | 4.0 |
| Example 13A | 84 | 1174 | 1.8 | | 2182 | 9.9 | 4.0 |
| Example 14A | 39 | 1380 | | | 1848 | 5.4 | 2.0 |
| Example 15A | 57 | 1797 | | | 2481 | 10.2 | >16 |
| Example 16A | 68 | 1180 | | | 1996 | 8.0 | 1.5 |
| Example 17A | 70 | 1817 | 5.3 | 12328 | 2658 | 12.7 | 1.0 |
| Example 18A | 80 | 1869 | 4.6 | 12423 | 2823 | 14.9 | |
| Example 19A | 102 | 2048 | 5.2 | 9311 | 3274 | 20.9 | 1.0 |
| Example 20A | 126 | 2014 | 4.4 | 10021 | 3524 | 25.3 | 1.0 |
| Example 21A | 97 | 1718 | 4.7 | 11931 | 2877 | 16.6 | 1.0 |
| Example 22A | 116 | 1955 | 4.1 | 10453 | 3347 | 22.7 | 3.0 |
| Comparative Example 1A | 68 | 1000 | | 4774 | 1816 | 6.8 | 2.5 |
| Comparative Example 2A | | — | | | — | | — |
| Comparative Example 3A | | — | | | — | | — |
| Comparative Example 4A | 100 | 700 | 15.1 | 10000 | 1900 | 7.0 | <1.0 |
| Comparative Example 5A | 90 | 1205 | 0.7 | | 2285 | 10.8 | <1.0 |

TABLE 2-continued

| | | | Film-like graphite | | | |
|---|---|---|---|---|---|---|
| | Folding number [times] | Density [g/cm³] | Width of multilayer structure [μm] | Thickness of multilayer structure [μm] | Angle with film plane [degree] | $T_a/T_b$ |
| Example 1A | — | 1.89 | 50 | 10 | 10 degrees or less | 0.95 |
| Example 2A | — | 1.95 | 50 | 10 | 20 degrees or less | 0.95 |
| Example 3A | — | 1.88 | 60 | 10 | 10 degrees or less | 0.98 |
| Example 4A | — | 1.90 | 50 | 10 | 10 degrees or less | 0.97 |
| Example 5A | 50,000 or more | 1.91 | 50 | 15 | 10 degrees or less | 0.95 |
| Example 6A | — | 1.89 | 50 | 10 | 10 degrees or less | 1.00 |
| Example 7A | — | 1.93 | 50 | 10 | 10 degrees or less | 0.95 |
| Example 8A | — | 1.97 | 50 | 10 | 10 degrees or less | 0.92 |
| Example 9A | — | 2.01 | 50 | 10 | 10 degrees or less | 1.00 |
| Example 10A | — | 2.11 | 50 | 10 | 10 degrees or less | 0.99 |
| Example 11A | — | 2.06 | 55 | 10 | 10 degrees or less | 1.00 |
| Example 12A | — | 2.02 | 50 | 10 | 10 degrees or less | 0.99 |
| Example 13A | — | 2.01 | 50 | 10 | 10 degrees or less | 0.99 |
| Example 14A | — | 1.95 | 50 | 10 | 10 degrees or less | 1.00 |
| Example 15A | — | 2.03 | 80 | 10 | 10 degrees or less | 0.99 |
| Example 16A | — | 1.93 | 50 | 10 | 10 degrees or less | 0.97 |
| Example 17A | — | 2.01 | — | — | — | — |
| Example 18A | — | 2.07 | — | — | — | — |
| Example 19A | 50,000 or more | 1.88 | — | — | — | — |
| Example 20A | 50,000 or more | 1.82 | — | — | — | — |
| Example 21A | 50,000 or more | 1.87 | — | — | — | — |
| Example 22A | 20,000 to 30,000 | 1.81 | — | — | — | — |
| Comparative Example 1A | — | 2.04 | 35 | 10 | 10 degrees or less | 0.95 |
| Comparative Example 2A | — | — | — | — | — | — |
| Comparative Example 3A | — | — | — | — | — | — |
| Comparative Example 4A | — | 0.85 | None | None | None | 0.64 |
| Comparative Example 5A | — | 1.88 | None | None | None | 0.64 |

As shown in Table 1 and Table 2, in Example 14A in which a raw film having a thickness of 75 μm was used, only thin film-like graphite having a thickness of 39 μm was obtained, but in Example 1A in which a raw film having a thickness of 125 μm was used, a thick film-like graphite having a thickness of 58 μm was obtained. This result indicates that it is more favorable to use a thick raw film in terms of obtaining a film-like graphite having a high heat dissipation performance with a thickness of 58 μm or more.

In a case of comparing Examples 1A, 3A, 3A, 4A, 5A, and 15A in which a thickness of each raw film was 125 μm, as the temperature increase rate in the graphitization step was higher, the obtained minimum bending radius of the film-like graphite was smaller, and the flexibility was excellent. In Example 15A, the minimum bending radius is more than 16 mm, and the flexibility is insufficient. These results are considered to be because the excessive growth of the graphite structure could be suppressed by increasing the temperature increase rate in the graphitization step. In addition, the film-like graphite of each of Examples 1A, 3A, 4A, 4A, and 5A had the thermal conductivity b as compared with Example 16A in which the same raw film was used, and the temperature increase rate in the graphitization step was particularly large. According to this result, in terms of the flexibility of the film-like graphite, it is preferable that the temperature increase rate in the graphitization step is higher, and in terms of the heat dissipation performance (thermal conductivity), it is more favorable that the temperature increase rate in the graphitization step is lower.

In a case of comparing Examples 5A to 9A in which the heating conditions of the carbonization step and the graphitization step were the same, as the thickness of the raw film increased, thick and a flexible film-like graphite was obtained. Furthermore, in the comparison of Examples 5A to 9A, as the film-like graphite was thinner, the minimum bending radius was smaller, and the flexibility was improved. This is considered to be because the thinner the film-like graphite is, the smaller the compression stress applied to the inner surface and the tensile stress applied to the outer surface when the film is bent. Furthermore, in the comparison of Examples 5A to 9A, the thermal conductivity and $S_g$/Sm of the film-like graphite did not change significantly. This result indicates that the effect of the heating step in the mixed gas is sufficiently exhibited even though the raw film is thick.

In a case of comparing Example 10A with Example 9A, the minimum bending radius of the film-like graphite was reduced by increasing the rate of the temperature increase in the graphitization step, and the flexibility was improved. On the other hand, in the comparison between Example 10A and Example 9A, the lower the temperature increase rate in the graphitization step, the higher the thermal conductivity of the film-like graphite.

In the comparison of Examples 11A to 13A in which a $T_{max}$ in the graphitization step is 2,700° C., as in the case of Examples 5A to 9A, the thinner the film-like graphite was, the smaller the minimum bending radius was, and thus the flexibility was excellent. Furthermore, as a comparison when the $T_{max}$ in the graphitization step is 2,800° C. and 2,700° C., Examples 7A and 13A, Examples 8A and 12A, and Examples 9A and 11A were compared with each other. As a result, the minimum bending radius of the film-like graphite was reduced by adjusting $T_{max}$ to 2,700° C., and the flexibility was improved.

According to this result, in terms of the flexibility of the film-like graphite, it was found that the high temperature increase rate in the graphitization step was favorable, and the low $T_{max}$ was favorable. By optimizing the heating conditions in the graphitization step, the film-like graphite having both heat dissipation performance (thermal conductivity) and flexibility can be obtained.

In a case of comparing Examples 1A, 17A, and 18A in which the heating conditions of the carbonization step and the graphitization step were the same, as the thickness of the raw film increased, a thick film-like graphite having a high heat dissipation performance (thermal conductivity) was obtained.

In Comparative Example 1 in which the heating step in the mixed gas was not carried out in the carbonization step, the thermal conductivity of the film-like graphite was lower than that in Example 5A in which the raw film having the same thickness was used. In a case of comparing the SEM photograph of the fracture surface in Example 5A shown in FIG. 1 with the SEM photograph of the fracture surface in Comparative Example 1 shown in FIG. 4, a difference in the cross-sectional structure was seen, and in Comparative Example 1, foaming was not able to be prevented in the manufacturing process, the layered structure of graphite was not smooth, a wrinkled shape occurred, and a number of voids were observed. It is considered that this factor caused the lower thermal conductivity of the film-like graphite of Comparative Example 1 in the direction along the film plane.

In Comparative Example 2 in which the heating step in the mixed gas was not carried out in the carbonization step, the obtained graphitized film was extremely hard as compared with Example 7A in which the raw film having the same thickness was used, and was broken in the press step.

According to this result, it was confirmed that, by carrying out the heating step in the mixed gas, a flexible graphitized film can be obtained even by using the raw film thicker than that of the related art, and it is possible to manufacture the thick film-like graphite.

As shown in FIG. 6, in Comparative Example 3 in which the heating step in the mixed gas was not carried out, although the thickness of the raw film was 125 μm and was thinner than the raw film of Example 10A, a part of the graphitized film was broken due to foaming during the decomposition, and was broken during the press step. Even though the raw film is thick as in Example 10A, the decomposition of the film is prevented by carrying out the heating step in the mixed gas, and the amount of the decomposition gas is reduced. the film breakage due to excessive foaming is prevented, and a good-quality film-like graphite is obtained even though the temperature increase rate in the graphitization step is increased.

The commercially available film-like graphite in Comparative Example 4 has a low thermal conductivity of 700 W/mK and a low density of 0.85 g/cm³ and also has a $T_d/T_b$ of 0.64%. In addition, as shown in FIG. 7, a large number of voids were observed in the SEM observation image, a state in which the orientation of the layers composed of the graphite crystals was low was observed, and a multilayer structure having a thickness of 8 μm or more was not observed. According to this result, it was considered that the film-like graphite of Comparative Example 4 ensures a thickness by being held in a state in which compression or rolling is insufficient during the manufacturing process, and as a result, the density thereof is low and voids increase, so that the thermal conductivity is inferior.

In Examples 1A to 16A, and 19A to 22A in which the heating step in the mixed gas was carried out, $S_g$/Sm was also more than 0.8, and was higher than Comparative Example 1 in which the heating step in the mixed gas was not carried out. Furthermore, when comparing Example 1A and Example 2A, $S_g/S_m$ increased because the temperature increase rate in the heating step in the mixed gas was decreased, and the time when the organic gas acts became longer. As described above, it was confirmed that the effect of increasing the area $S_g$ of the graphitized film is obtained by carrying out the heating step in the mixed gas, and furthermore, it was confirmed that the longer the time for which the organic gas acts, the greater the effect.

[Evaluation Method for Graphite Crystal Orientation Degree P]

As a measurement device, an automated multipurpose X-ray diffractometer (SmartLab) that is an X-ray diffractometer having CuKα rays as a radiation source, manufactured by Rigaku Corporation, was used. The film-like graphite was fixed on a stage not to warp so that an incidence angle of an incident X-ray and a reflection angle of a reflected X-ray were equal to each other in a direction perpendicular to the film plane of the film-like graphite, and one-dimensional X-ray diffraction spectrum in a 2θ direction of the film-like graphite was measured by a θ/2θ scan method. The measurement conditions were set to a tube voltage of 45 kV, a tube current of 200 mA, a scanning range (2θ) of 25° to 28°, a scanning step of 0.01°, a scanning speed of 4.0°/min, and a scanning mode of CONTINUOUS. A position of a (002) plane reflection diffraction peak derived from a graphite hexagonal crystal, which was detected in the vicinity of 2θ=26° obtained by this measurement, was read, a detector was fixed at this peak position, and an X-ray diffraction spectrum of the film-like graphite was measured by an ω scan method. The measurement conditions were set to a tube voltage of 45 kV, a tube current of 200 mA, a scanning range ($\omega$) of $-5.8°$ to $31.4°$, a scanning step of $0.02°$, a scanning speed of $20.0°$/min, and a scanning mode of CONTINUOUS. A half width W ($°$) of the diffraction peak obtained from this spectrum was read, and the graphite crystal orientation degree P [%] was calculated by Expression 1 below.

$$P = \frac{180 - W}{180} \times 100 \qquad \text{Expression 1}$$

[Evaluation Method of Surface Area/Film Area]

As a measurement device, a shape measurement laser microscope VK-X100 manufactured by KEYENCE CORPORATION was used. A sample formed of a 5×5 cm piece cut out from the film-like graphite was placed on a stage so that the film did not warp and the film plane faced upward. A measurement mode was set to a surface shape mode, the objective lens was set to 2048×1536 pixels at a magnification of 50 times, and the objective lens was moved by 0.12 μm in the Z-axial direction (height direction) to obtain surface topography data of the sample. The upper limit and lower limit when the objective lens moved in the Z-axial direction were set to a position where each of laser images of the sample (film-like graphite) was completely blackened. The brightness of the laser was adjusted so that the amount of reflected laser light did not saturate at the height between the upper limit and lower limit in the Z-axial direction. Specifically, the brightness of the laser and the illumination filter were adjusted so that the amount of light did not exceed the saturated line (65535 counts).

Each of the film area of the obtained image within the film observation range and the surface area from the surface topography data of the sample was calculated, and a ratio (surface area/film area) was calculated.

[Thermal Conductivity]

The thermal conductivity of the film-like graphite in the direction along the film plane was calculated according to Expression 2 below.

$$b = \alpha \times d \times c \qquad \text{Expression 2}$$

Here, each symbol in Expression 2 has the following meanings.

b: Thermal conductivity (W/mK) of the film-like graphite in the direction along the film plane
    $\alpha$: Heat diffusion rate (mm$^2$/s) of the film-like graphite in the direction along the film plane
    d: Density of the film-like graphite (g/cm$^3$)
    c: Specific heat of graphite (0.85 J/gK)

[Flexibility (Bend Test)]

A method of evaluating the minimum bending radius was used as an index of flexibility of the film-like graphite. In an environment of 23° C., the type 2 bend test machine defined by JIS K5600-5-1 was completely expanded, a film-like graphite test piece and a mandrel were attached, and the test piece was evenly folded 1800 for 1 to 2 seconds to check the result test piece, and the presence or absence of creases or crack was confirmed. Each of the mandrels having diameters of 32, 25, 20, 16, 12, 10, 8, 6, 5, 4, 3, and 2 mm was used to carry out the above-described work of folding the test piece and visually confirming the test piece in order from the mandrel having the maximum diameter. In this case, in the folding carried out by using each mandrel, the test was performed while changing the position of the test piece so that deformation and the like caused by folding the test piece once will not affect the next test. Then, half of a diameter of a mandrel that is one size larger than the mandrel with which the crease or crack was first confirmed in the test piece, that is, half of a diameter of the smallest mandrel among the mandrels with which no crease or crack was confirmed in the test piece was set as a minimum bending radius of the film-like graphite.

The press step in each of the following examples was carried out by using a hydraulic calendar embossing machine (manufactured by Yuri Roll Co., Ltd.) in accordance with the following procedures.

A graphitized film was sandwiched between commercially available polyimide films and compressed under conditions of a linear pressure of 900 kg/cm to 2,700 kg/cm and a roll rotation speed of 0.5 m/min. Compression was repeated until a difference in film thickness before and after compression was within 1 μm. The linear pressure was defined as a value obtained by dividing a load of rolls by a length in a roll width direction of the graphitized film inserted into the rolls.

Example 1B

A polyimide film KH having a thickness of 50 μm was used as a raw film. A carbonization step of carbonizing the raw film was carried out in a carbonization furnace. In the carbonization furnace, under a nitrogen gas (acetylene gas concentration: 25% by volume) atmosphere including acetylene gas, the temperature was increased from room temperature to 500° C. at an average temperature increase rate of 10° C./min, and isothermal-holding was carried out at 500° C. for 3 hours (heating step in a mixed gas). After isothermal-holding was carried out at 500° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2,800° C. while maintaining a temperature increase rate of about 20° C./min, held at 2,800° C. for 1 hour, and cooling was carried out to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Example 2B

A 20% by mass N-methyl-2-pyrrolidone solution containing 20% by mass of a polyamic acid obtained by polymerization of oxydianiline and pyromellitic anhydride was applied to one surface of a polyimide film KH having a thickness of 75 μm. Another polyimide film KH having a thickness of 75 μm was bonded to the solution-applied surface of the polyimide film KH, and the pressure rolls used in Comparative Example 1 were then used as a mangle to remove an excess solution. The bonded films were placed under a nitrogen atmosphere at normal pressure, the temperature was increased at an average temperature increase rate of 2° C./min up to 350° C. and held for 1 hour, and the films were then allowed to cool, thereby obtaining a laminated film having a thickness of 150 μm, which was formed of two polyimide films having a thickness of 75 μm with the polyimide films firmly adhered.

The carbonization step was carried out in the carbonization furnace by using the laminated film as the raw film. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.6° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2,800° C. while maintaining a temperature increase rate of about 5° C./min, held at 2,800° C. for 1 hour, and cooling was carried out to obtain a graphitized film.

The obtained graphitized film was sandwiched between two polyimide films and compressed under conditions of a linear pressure of 900 kgf/cm and a roll rotation speed of 0.5 m/min, and the sandwiched two polyimide films were removed to obtain a film-like graphite.

Example 3B

Figure 13:
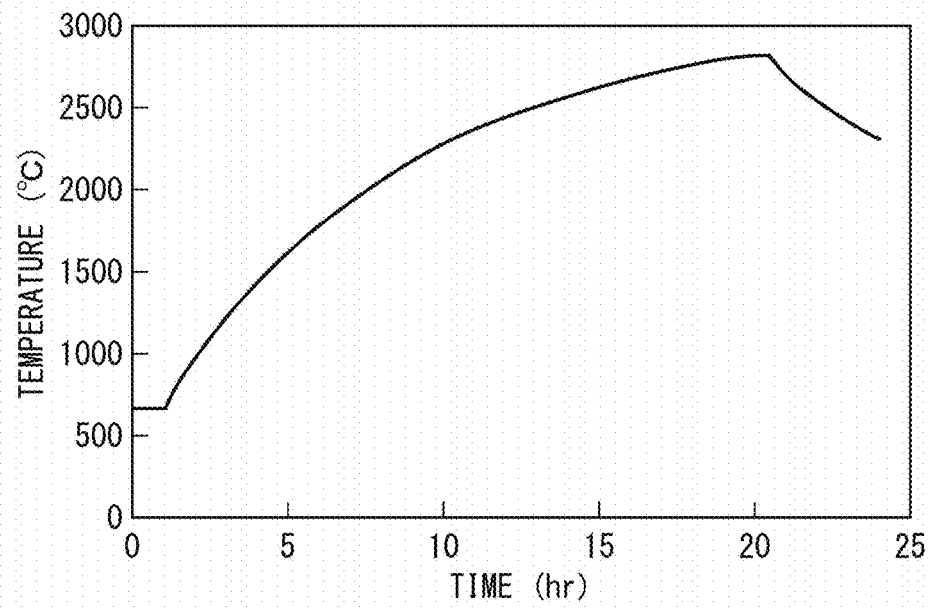
FIG. 13 is a temperature record of a graphitization step of Example 3B.

A polyimide film KH having a thickness of 125 μm was used as a raw film. A carbonization step of carbonizing the raw film was carried out in a carbonization furnace. In the carbonization furnace, under a nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization step, under an argon atmosphere, a power output value of the graphitization furnace was set to a constant value, and the temperature was increased according to the temperature profile shown in FIG. 13. In the temperature profile shown in FIG. 13, a temperature 30 minutes after the time when the temperature reached 2,000° C. was 2062° C., the temperature 60 minutes after was 2120° C., and the temperature 90 minutes after was 2176° C. In the graphitization furnace, the temperature was maintained at 2,800° C. for 1 hour and then cooling was carried out to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Figure 12:
FIG. 12 is an example of an image obtained by the observation on a surface of a film-like graphite of Example 3B with a laser microscope.

A part of an image obtained by the observation on a surface of the obtained film-like graphite with a laser microscope is shown in FIG. 12.

Example 4B

A laminated film having a thickness of 175 μm was obtained in a same manner as in Example 2B, except that the polyimide film KH having a thickness of 125 μm and the polyimide film KH having a thickness of 50 μm were used.

A carbonization step of a raw film was carried out in a carbonization furnace by using a laminated film as the raw film. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2,800° C. while maintaining a temperature increase rate of about 2° C./min, held at 2,800° C. for 1 hour, and cooling was carried out to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Example 5B

A film-like graphite was obtained in the same manner as in Example 4B, except that a laminated film having a thickness of 200 μm, which was obtained in a same manner as in Example 2B except to use the polyimide film KH having a thickness of 125 μm and the polyimide film KH having a thickness of 75 μm, was used as a raw film.

Example 6B

A film-like graphite was obtained in the same manner as in Example 3B except that the same laminated film having a thickness of 200 μm as in Example 5B was used as a raw film.

Example 7B

A film-like graphite was obtained in the same manner as in Example 3B, except that a laminated film having a thickness of 250 μm, which was obtained in a same manner as in Example 2B except to use two polyimide films KH each of which has a thickness of 125 μm, was used as a raw film.

Example 8B

A film-like graphite was obtained in the same manner as in Example 3B, except that a polyimide film KH having a thickness of 50 μm was used as a raw film to carry out the carbonization step on the raw film in the carbonization furnace, and in the carbonization furnace, the temperature was increased up to 1,000° C. while maintaining a temperature increase rate of about 10° C./min under a nitrogen gas atmosphere, and held for 1 hour.

Example 9B

A film-like graphite was obtained in the same manner as in Example 8B except that a polyimide film KH having a thickness of 75 μm was used as a raw film.

Example 10B

A polyimide film KH having a thickness of 50 μm was used as a raw film. A carbonization step of carbonizing the raw film was carried out in a carbonization furnace. In the carbonization furnace, a temperature was increased from room temperature to 1,000° C. at an average temperature increase rate of 5° C./min under a nitrogen gas atmosphere, and isothermal-holding was then carried out at 1,000° C. for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2600° C. while maintaining a temperature increase rate of about 1° C./min, and after increasing the temperature up to 2600° C., the temperature was increased up to 2,900° C. while maintaining a temperature increase rate of about 0.8° C./min, and held at 2,900° C. for 1 hour, and cooling was carried out to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Example 11B

A film-like graphite was obtained in the same manner as in Example 10B except that a polyimide film KH having a thickness of 125 μm was used as a raw film.

Example 12B

Figure 14:
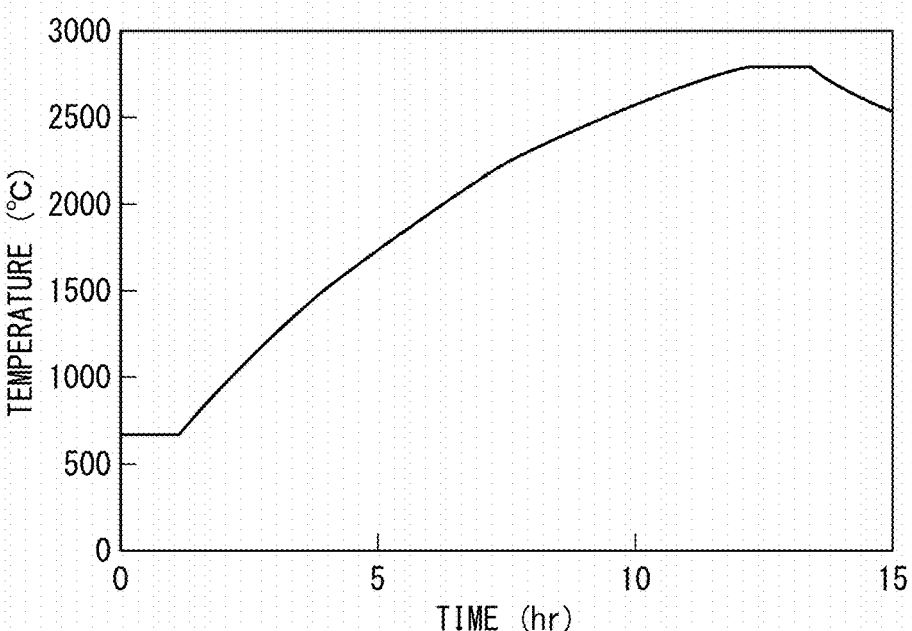
FIG. 14 is a temperature record of a graphitization step of Example 12B.

A polyimide film KH having a thickness of 125 μm was used as a raw film. A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 800° C. while maintaining the temperature increase rate at about 10° C./min. A carbonized film obtained after the carbonization step was temporarily allowed to cool, and then transferred to a graphitization furnace to carry out a graphitization step. A film-like graphite was obtained in the same manner as in Example 1B except that in the graphitization step, under an argon atmosphere, a power output value of the graphitization furnace was set to a constant value, and the temperature was increased to indicate the temperature record shown in FIG. 14. According to the temperature record shown in FIG. 14, a temperature 30 minutes after the time when the temperature reached 2,000° C. was 2,096° C., the temperature 60 minutes after was 2,185° C., and the temperature 90 minutes after was 2,270° C.

Example 13B

A laminated film having a thickness of 175 μm was obtained in a same manner as in Example 2B, except that the polyimide film KH having a thickness of 125 μm and the polyimide film KH having a thickness of 50 μm were used.

A film-like graphite was obtained in the same manner as in Example 12B except that this laminated film having a thickness of 175 μm was used as a raw film.

Example 14B

A laminated film having a thickness of 200 μm was obtained in a same manner as in Example 2B, except that the polyimide film KH having a thickness of 125 μm and the polyimide film KH having a thickness of 75 μm were used. A film-like graphite was obtained in the same manner as in Example 12B except that this laminated film having a thickness of 200 μm was used as a raw film.

Example 15B

A laminated film having a thickness of 250 μm was obtained in a same manner as in Example 2B, except that the polyimide film KH having a thickness of 125 μm and the polyimide film KH having a thickness of 125 μm were used. Film-like graphite was obtained in the same manner as in Example 12B, except that this laminated film having a thickness of 250 m was used as a raw film.

Example 16B

A polyimide film KH having a thickness of 125 μm was used as a raw film. A carbonization step of carbonizing the raw film was carried out in a carbonization furnace. In the carbonization furnace, under a nitrogen gas (acetylene gas concentration: 25% by volume) atmosphere including acetylene gas, the temperature was increased from room temperature to 500° C. at an average temperature increase rate of 10° C./min, and isothermal-holding was carried out at 500° C. for 3 hours (heating step in a mixed gas). The atmosphere was changed to the nitrogen gas atmosphere, the temperature was increased to 800° C. while maintaining the temperature increase rate at about 10° C./min. A film-like graphite was obtained in the same manner as in Example 12B except for the above.

Example 17B

A laminated film having a thickness of 175 μm was obtained in a same manner as in Example 2B, except that the polyimide film KH having a thickness of 125 μm and the polyimide film KH having a thickness of 50 μm were used. Film-like graphite was obtained in the same manner as in Example 16B, except that this laminated film having a thickness of 175 μm was used as a raw film.

Example 18B

A laminated film having a thickness of 200 μm was obtained in a same manner as in Example 2B, except that the polyimide film KH having a thickness of 125 μm and the polyimide film KH having a thickness of 75 μm were used. Film-like graphite was obtained in the same manner as in Example 16B, except that this laminated film having a thickness of 200 μm was used as a raw film.

Example 19B

A laminated film having a thickness of 250 μm was obtained in a same manner as in Example 2B, except that the polyimide film KH having a thickness of 125 μm and the polyimide film KH having a thickness of 125 μm were used.

Film-like graphite was obtained in the same manner as in Example 16B, except that this laminated film having a thickness of 250 μm was used as a raw film.

Example 20B

A polyimide film KH having a thickness of 75 μm was used as a raw film. A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 800° C. while maintaining the temperature increase rate at about 10° C./min. A carbonized film obtained after the carbonization step was temporarily allowed to cool, and then transferred to a graphitization furnace to carry out a graphitization step. In the graphitization furnace, a film-like graphite was obtained in the same manner as in Example 1B, except that under an argon atmosphere, the temperature was increased up to 2,800° C. while maintaining a temperature increase rate of about 10° C./min, held at 2,800° C. for 1 hour, and cooling was carried out to obtain a graphitized film.

Comparative Example 1B

A film-like graphite (EYGS121803, thickness of 25 μm) manufactured by Panasonic Corporation was used as a comparison object.

Comparative Example 2B

A film-like graphite (EYGS121805, thickness of 50 μm) manufactured by Panasonic Corporation was used as a comparison object.

Comparative Example 3B

A film-like graphite (EYGS121810, thickness of 100 μm) manufactured by Panasonic Corporation was used as a comparison object.

Comparative Example 4B

A film-like graphite (Grafinity, thickness of 40 μm) manufactured by KANEKA CORPORATION was used as a comparison object.

Comparative Example 5B

A film-like graphite (SDK, 40 μm) manufactured by Jiangsu Sidike New Materials Science and Technology Co., Ltd. was used as a comparison object.

Comparative Example 6B

A film-like graphite (SDK, 70 μm) manufactured by Jiangsu Sidike New Materials Science and Technology Co., Ltd. was used as a comparison object.

Figure 15:
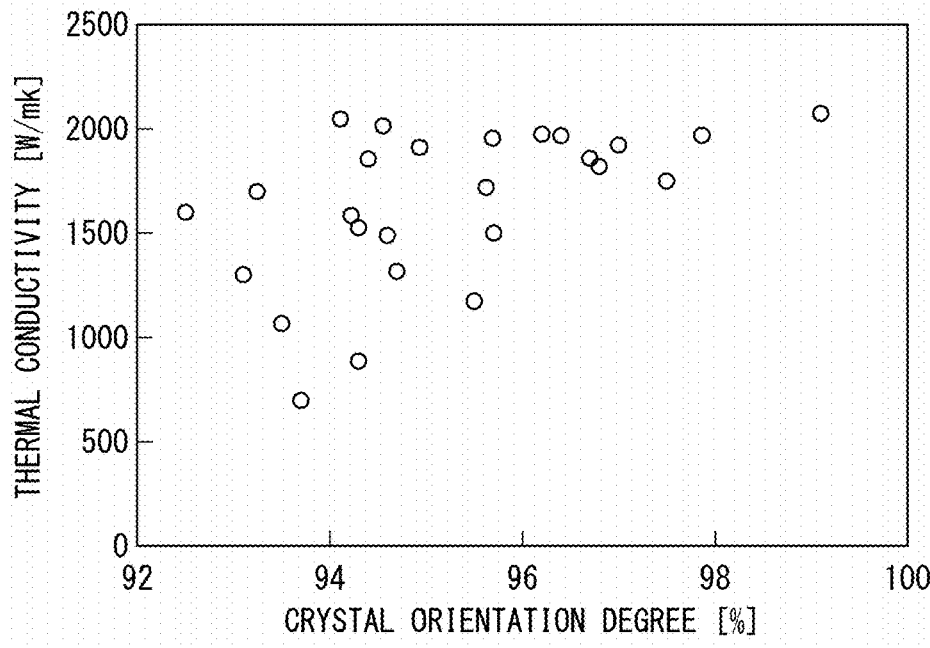
FIG. 15 is a plot diagram in which a thermal conductivity of the film-like graphite in each of Examples and Comparative Examples is plotted with respect to a graphite crystal orientation degree P.

The test results of the film-like graphite obtained in each of Examples and Comparative Examples were shown in Table 3. In addition, plots of the thermal conductivity of the film-like graphite in each of Examples and Comparative Examples with respect to the graphite crystal orientation degree P are shown in FIG. 15.

TABLE 3

| | Thickness of film-like graphite [μm] | Density of film-like graphite [g/cm³] | Half-width of (002) plane diffraction peak [°] | Crystal orientation degree P [%] | Surface area/film area [—] | Thermal conductivity [W/m · K] | Minimum bending radius [mm] | Folding number [times] | $S_g/S_m$ |
|---|---|---|---|---|---|---|---|---|---|
| Example 1B | 43 | 1.6 | 10.2 | 94.3 | 1.16 | 887 | 1.5 | | 0.80 |
| Example 2B | 68 | 1.9 | 9.8 | 94.6 | 1.06 | 1488 | 5.0 | | 0.87 |
| Example 3B | 62 | 1.9 | 6.0 | 96.7 | 1.07 | 1859 | 4.0 | 50,000 or more | 0.85 |
| Example 4B | 84 | 2.0 | 8.1 | 95.5 | 1.13 | 1174 | 4.0 | | 0.92 |
| Example 5B | 97 | 2.0 | 9.5 | 94.7 | 1.06 | 1315 | 4.0 | | 0.93 |
| Example 6B | 87 | 2.0 | 5.8 | 96.8 | 1.06 | 1819 | 8.0 | | 0.87 |
| Example 7B | 106 | 2.1 | 6.5 | 96.4 | 1.05 | 1968 | 10.0 | | 0.87 |
| Example 8B | 22 | 2.2 | 5.4 | 97.0 | 1.08 | 1923 | 1.0 | | 0.71 |
| Example 9B | 39 | 2.1 | 4.4 | 97.5 | 1.07 | 1750 | 1.0 | | 0.67 |
| Example 10B | 22 | 2.3 | 1.6 | 99.1 | 1.04 | 2074 | More than 16 | | 0.78 |
| Example 11B | 60 | 2.1 | 6.8 | 96.2 | 1.04 | 1975 | More than 16 | | 0.80 |
| Example 12B | 67 | 1.6 | 10.4 | 94.2 | 1.18 | 1583 | 2.0 | | |
| Example 13B | 88 | 1.8 | 10.1 | 94.4 | 1.15 | 1857 | 2.0 | | |
| Example 14B | 102 | 1.9 | 10.6 | 94.1 | 1.18 | 2048 | 1.0 | 50,000 or more | 0.92 |
| Example 15B | 126 | 1.8 | 9.8 | 94.6 | 1.09 | 2014 | 1.0 | 50,000 or more | 0.88 |
| Example 16B | 66 | 1.8 | 12.2 | 93.2 | 1.05 | 1699 | 2.0 | | |
| Example 17B | 82 | 1.9 | 9.1 | 94.9 | 1.04 | 1912 | 3.5 | | |
| Example 18B | 97 | 1.9 | 7.9 | 95.6 | 1.09 | 1718 | 1.0 | 50,000 or more | 0.89 |
| Example 19B | 116 | 1.8 | 7.8 | 95.7 | 1.05 | 1955 | 3.0 | 20,000 to 30,000 | 0.93 |
| Example 20B | 14 | 2.2 | 3.8 | 97.9 | 1.10 | 1969 | | | |

TABLE 3-continued

| | Thickness of film-like graphite [μm] | Density of film-like graphite [g/cm³] | Half-width of (002) plane diffraction peak [°] | Crystal orientation degree P [%] | Surface area/film area [—] | Thermal conductivity [W/m · K] | Minimum bending radius [mm] | Folding number [times] | $S_g/S_m$ |
|---|---|---|---|---|---|---|---|---|---|
| Comparative Example 1B | 25 | 1.9 | 13.6 | 92.5 | 1.14 | 1600 | Less than 1 | | — |
| Comparative Example 2B | 50 | 1.7 | 12.4 | 93.1 | 1.16 | 1300 | Less than 1 | | — |
| Comparative Example 3B | 100 | 0.9 | 11.3 | 93.7 | 1.19 | 700 | Less than 1 | | — |
| Comparative Example 4B | 40 | 2.0 | 7.8 | 95.7 | 1.10 | 1500 | Less than 1 | | — |
| Comparative Example 5B | 40 | 1.7 | 10.2 | 94.3 | 1.27 | 1525 | Less than 1 | | — |
| Comparative Example 6B | 70 | 1.5 | 11.6 | 93.5 | 1.66 | 1069 | Less than 1 | | — |

As shown in Table 3 and FIG. 15, as the graphite crystal orientation degree P increases, the thermal conductivity of the film-like graphite tends to increase, and a high thermal conductivity is stably exhibited. The thermal conductivity of the film-like graphite in each of Examples 3B, 6B to 11B, and 20B in which the graphite crystal orientation degree P is 96% or more was particularly high, and the heat dissipation performance was particularly excellent.

In addition, the film-like graphite in each of Examples 1B to 9B, 12B to 16B, 18B, and 19B having (surface area/film area) of 1.05 or more had a small minimum bending radius and were excellent in flexibility. As shown in FIG. 12, it is considered that since cracks and unevenness were confirmed on a surface of the film-like graphite of Example 3B, the thermal decomposition gas was generated inside the film in the graphitization step, and voids were formed between the graphite crystallites, which causes flexibility to be improved.

[Evaluation Method for CF and AS]

By using a cutter (or an ultrasonic cutter), a sample was cut into a strip of about 5 mm×8 mm, and degassed and embedded at 40° C. by using an epoxy resin (trade name: epoxy resin (G-2), two-component thermoset resin (manufactured by Gatan, Inc.)), and molded into a sheet shape at 100° C. Next, an epoxy resin covering a surface (cross-section) of the sample to be observed is completely removed by polishing with a handy wrap (manufactured by JEOL Ltd.), and a smooth sample cross-section is produced by a cross section polisher (SM-09010 manufactured by JEOL Ltd.) using an argon ion beam. The observation was carried out using a digital microscope (DSX510 manufactured by Olympus Corporation), and a 20× objective lens (MPLFN20XBDP magnification, manufactured by Olympus Corporation) was used to obtain a bright field image (BF image) and a simple polarization image (PO image) at a zoom magnification of 5 times.

Regarding whether the sample was damaged or not in the pretreatment, plasma FIB-SEM was used separately, tungsten was deposited as a protective film, and a part other than the end of the sample was then excavated with an argon ion beam and observed by SEM By comparison with the image obtained in such a manner, the appropriateness of production of the above-described sample cross-section was ensured.

The obtained PO image was subjected to 8-bit conversion using image analysis software (image-J) and standardized (normalize processing) such that a distribution width of pixel values of the image was 0 to 255. A range to be analyzed was selected, and in that range, an image obtained by binarization of bright parts and dark parts observed on a polarization microscope image of the film-like graphite in the cross-section perpendicular to the film plane was obtained. A binarization threshold was 128, and a region of 128 or more was set as a bright region. The number of a plurality of bright regions obtained by this binarization was counted by image analysis software over the entire image. Similarly, an average area of the plurality of bright regions obtained by this method was calculated and used as AS.

Regarding the film thickness, by using image analysis software (Image-J) in the same manner, the void parts observed inside the film-like graphite were removed from the BF image obtained in the same observation manner described above to measure a total length of a solid part of the film-like graphite observed in the direction perpendicular to the film plane, and an average of 10 points in the image was used as a film thickness.

Regarding the film width, when the number N of the plurality of bright regions was measured from the PO image in the film plane direction, a width of the film-like graphite to be measured was used as a film width.

CN was calculated from the number N of the plurality of bright regions, the film thickness H, and the film width W obtained by the above-described method.

The press step in each of the following examples was carried out by using a hydraulic calendar embossing machine (manufactured by Yuri Roll Co., Ltd.) in accordance with the following procedures.

A graphitized film was sandwiched between commercially available polyimide films and compressed under conditions of a linear pressure of 900 kg/cm to 2,700 kg/cm and a roll rotation speed of 0.5 m/min. Compression was repeated until a difference in film thickness before and after compression was within 1 μm. The linear pressure was defined as a value obtained by dividing a load of rolls by a length in a roll width direction of the graphitized film inserted into the rolls.

Example 1C

A 20% by mass N-methyl-2-pyrrolidone solution containing 20% by mass of a polyamic acid obtained by polymerization of oxydianiline and pyromellitic anhydride was applied to one surface of a polyimide film KH having a thickness of 75 μm. Another polyimide film KH having a thickness of 75 μm was bonded to the solution-applied surface of the polyimide film, and the pressure rolls used in Example 1C were then used as a mangle to remove an excess solution. The bonded films were placed under a nitrogen atmosphere at normal pressure, the temperature was increased at an average temperature increase rate of 2° C./min up to 350° C. and held for 1 hour, and the films were then allowed to cool, thereby obtaining a laminated film having a thickness of 150 μm, which was formed of two polyimide films having a thickness of 75 μm with the polyimide films firmly adhered.

The carbonization step was carried out in the carbonization furnace by using the laminated film as the raw film. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.6° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2,800° C. while maintaining a temperature increase rate of about 5° C./min, held at 2,800° C. for 1 hour, and cooled to obtain a graphitized film.

The obtained graphitized film was sandwiched between two polyimide films and compressed under conditions of a linear pressure of 900 kgf/cm and a roll rotation speed of 0.5 m/min, and the sandwiched two polyimide films were removed to obtain a film-like graphite.

Example 2C

Figure 19:
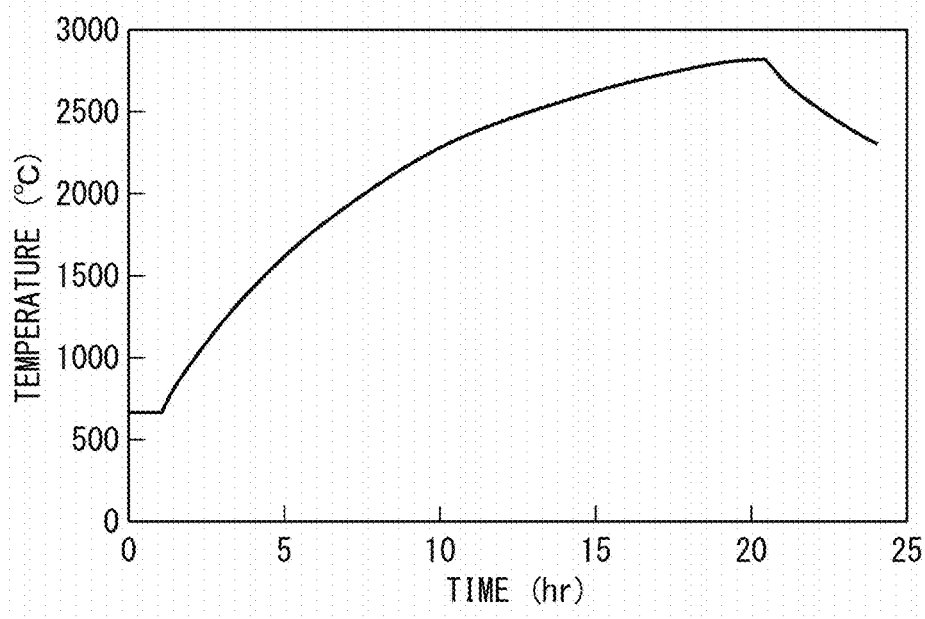
FIG. 19 is a temperature record of a graphitization step of Example 2C.

A polyimide film KH having a thickness of 125 μm was used as a raw film. A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization step, under an argon atmosphere, a power output value of the graphitization furnace was set to a constant value, and the temperature was increased according to the temperature profile shown in FIG. 19. In the temperature profile shown in FIG. 19, a temperature 30 minutes after the time when the temperature reached 2,000° C. was 2,062° C., the temperature 60 minutes after was 2,120° C., and the temperature 90 minutes after was 2,176° C. In the graphitization furnace, the temperature was maintained at 2,800° C. for 1 hour and then cooled to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Figure 23:
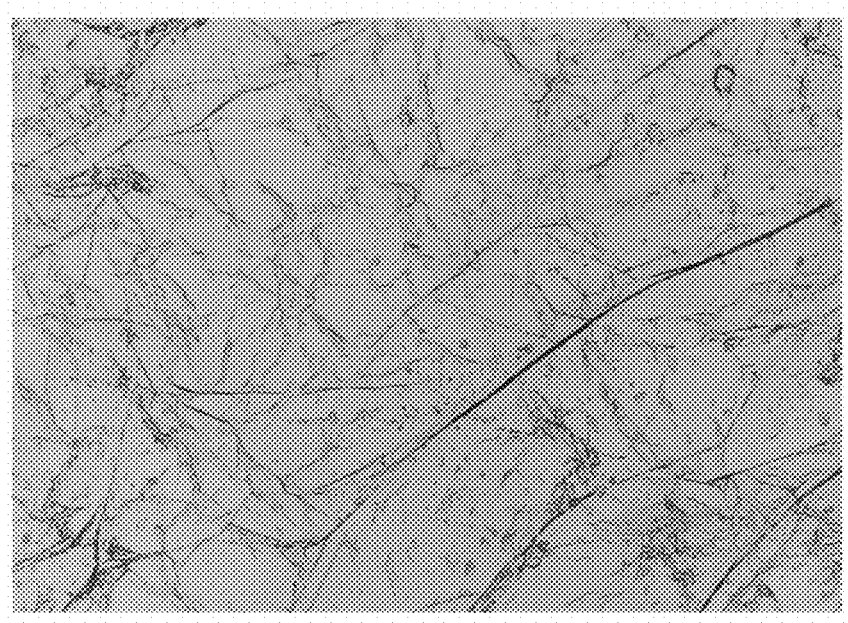
FIG. 23 is an example of an image obtained by the observation on a surface of a film-like graphite of Example 2C with a laser microscope.

A part of an image obtained by the observation on a surface of the obtained film-like graphite with a laser microscope is shown in FIG. 23.

Example 3C

A laminated film having a thickness of 175 μm was obtained in a same manner as in Example 2C, except that the polyimide film KH having a thickness of 125 μm and the polyimide film KH having a thickness of 50 μm were used.

A carbonization step of a raw film was carried out in a carbonization furnace by using a laminated film as the raw film. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A carbonized film obtained after the carbonization step was temporarily allowed to cool, and then transferred to a graphitization furnace to carry out a graphitization step. In the graphitization furnace, under an argon atmosphere, the temperature was increased up to 2,700° C. while maintaining a temperature increase rate of about 2° C./min, held at 2,700° C. for 1 hour, and cooled to obtain a graphitized film.

The obtained graphitized film was sandwiched between two polyimide films and compressed under conditions of a linear pressure of 900 kgf/cm and a roll rotation speed of 0.5 m/min to obtain a film-like graphite.

Example 4C

A film-like graphite was obtained in the same manner as in Example 4C, except that a laminated film having a thickness of 200 μm, which was obtained in a same manner as in Example 2C except to use the polyimide film KH having a thickness of 125 μm and the polyimide film KH having a thickness of 75 μm, was used as a raw film.

Example 5C

A film-like graphite was obtained in the same manner as in Example 3C except that the same laminated film having a thickness of 200 μm as in Example 5C was used as a raw film.

Example 6C

A film-like graphite was obtained in the same manner as in Example 3C, except that a laminated film having a thickness of 250 μm, which was obtained in a same manner as in Example 2C except to use the polyimide film KH having a thickness of 125 μm as a raw film, was used as a raw film.

Example 7C

A polyimide film KH having a thickness of 50 μm was used as a raw film. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.6° C./min (heating step in a mixed gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A film-like graphite was obtained in the same manner as in Example 4C, except that in the graphitization furnace, under an argon atmosphere, the temperature was increased up to 2,800° C. while maintaining a temperature increase rate of about 2° C./min, and held at 2,800° C. for 1 hour.

Example 8C

A film-like graphite was obtained in the same manner as in Example 8C, except that a laminated film having a thickness of 150 μm, which was obtained in a same manner as in Example 2C except to use two polyimide films KH each of which has a thickness of 75 μm, was used as a raw film.

Example 9C

A film-like graphite was obtained in the same manner as in Example 3C, except that in the graphitization furnace, under an argon atmosphere, the temperature was increased up to 2,800° C. while maintaining a temperature increase rate of about 2° C./min, and held at 2,800° C. for 1 hour.

Example 10C

A film-like graphite was obtained in the same manner as in Example 3C, except that in the graphitization furnace, under an argon atmosphere, the temperature was increased up to 2,800° C. while maintaining a temperature increase rate of about 10° C./min, and held at 2,800° C. for 1 hour.

Example 11C

A polyimide film KH having a thickness of 50 μm was used as a raw film. A film-like graphite was obtained in the same manner as in Example 2C, except that in the carbonization furnace, under a nitrogen gas atmosphere, the temperature was increased up to 1,000° C. from room temperature at a temperature increase rate of about 10° C./min, and held for 1 hour.

Example 12C

A polyimide film KH having a thickness of 75 μm was used as a raw film. A film-like graphite was obtained in the same manner as in Example 2C, except that in the carbonization furnace, under a nitrogen gas atmosphere, the temperature was increased up to 1,000° C. from room temperature at a temperature increase rate of about 10° C./min, and held for 1 hour.

Example 13C

Figure 20:
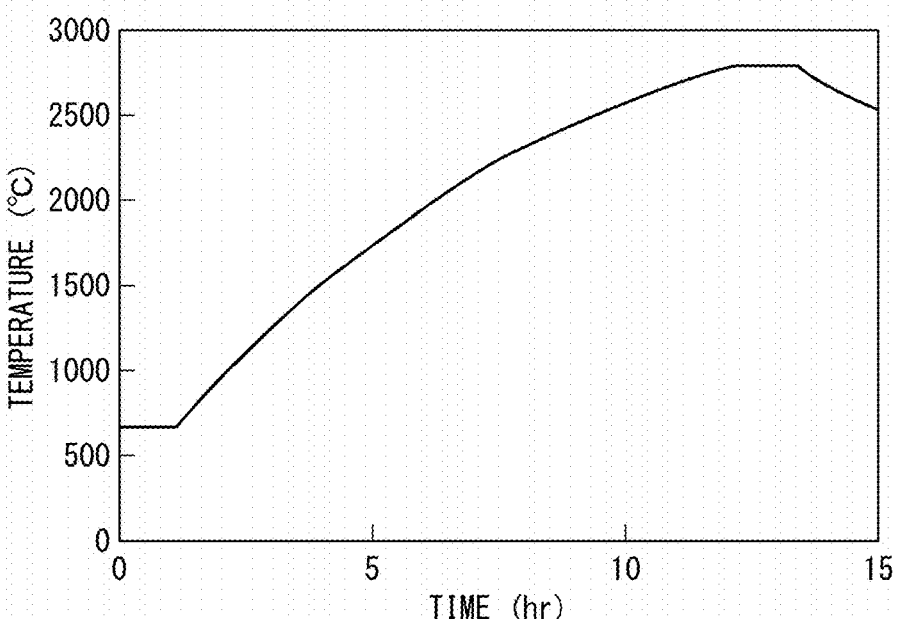
FIG. 20 is a temperature record of a graphitization step of Example 13C.

A polyimide film KH having a thickness of 125 μm was used as a raw film. A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 800° C. while maintaining the temperature increase rate at about 10° C./min. A carbonized film obtained after the carbonization step was temporarily allowed to cool, and then transferred to a graphitization furnace to carry out a graphitization step. A film-like graphite was obtained in the same manner as in Example 1C except that in the graphitization step, under an argon atmosphere, a power output value of the graphitization furnace was set to a constant value, and the temperature was increased to indicate the temperature record shown in FIG. 20 According to the temperature record shown in FIG. 20, a temperature 30 minutes after the time when the temperature reached 2,000° C. was 2,096° C., the temperature 60 minutes after was 2,185° C., and the temperature 90 minutes after was 2,270° C.

Example 14C

A laminated film having a thickness of 175 μm was obtained in a same manner as in Example 1C, except that the polyimide film KH having a thickness of 125 μm and the polyimide film KH having a thickness of 50 μm were used. A film-like graphite was obtained in the same manner as in Example 13C, except that this laminated film having a thickness of 175 μm was used as a raw film.

Example 15C

A laminated film having a thickness of 200 μm was obtained in a same manner as in Example 1C, except that the polyimide film KH having a thickness of 125 μm and the polyimide film KH having a thickness of 75 μm were used. A film-like graphite was obtained in the same manner as in Example 13C, except that this laminated film having a thickness of 200 μm was used as a raw film.

Example 16C

A laminated film having a thickness of 250 μm was obtained in a same manner as in Example 1C, except that the polyimide film KH having a thickness of 125 μm and the polyimide film KH having a thickness of 125 μm were used. A film-like graphite was obtained in the same manner as in Example 13C, except that this laminated film having a thickness of 250 μm was used as a raw film.

Example 17C

A polyimide film KH having a thickness of 125 μm was used as a raw film. A carbonization step of carbonizing the raw film was carried out in a carbonization furnace. In the carbonization furnace, under a nitrogen gas (acetylene gas concentration: 25% by volume) atmosphere including acetylene gas, the temperature was increased from room temperature to 500° C. at an average temperature increase rate of 10° C./min, and isothermal-holding was carried out at 500° C. for 3 hours (heating step in a mixed gas). The atmosphere was changed to the nitrogen gas atmosphere, the temperature was increased to 800° C. while maintaining the temperature increase rate at about 10° C./min. A film-like graphite was obtained in the same manner as in Example 13C except for the above.

Example 18C

A laminated film having a thickness of 175 μm was obtained in a same manner as in Example 1C, except that the polyimide film KH having a thickness of 125 μm and the polyimide film KH having a thickness of 50 μm were used. A film-like graphite was obtained in the same manner as in Example 17C, except that this laminated film having a thickness of 175 μm was used as a raw film.

Example 19C

A laminated film having a thickness of 200 μm was obtained in a same manner as in Example 1C, except that the polyimide film KH having a thickness of 125 μm and the polyimide film KH having a thickness of 75 μm were used. A film-like graphite was obtained in the same manner as in Example 17C, except that this laminated film having a thickness of 200 μm was used as a raw film.

Example 20C

A laminated film having a thickness of 250 μm was obtained in a same manner as in Example 1C, except that the polyimide film KH having a thickness of 125 μm and the polyimide film KH having a thickness of 125 μm were used. A film-like graphite was obtained in the same manner as in Example 17C, except that this laminated film having a thickness of 250 μm was used as a raw film.

Example 21C

A polyimide film KH having a thickness of 50 μm was used as a raw film. A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in a mixed gas). After the temperature was increased to 550° C., the atmosphere was changed to the nitrogen gas atmosphere, the temperature was increased to 800° C. while maintaining the temperature increase rate at about 10° C./min. A carbonized film obtained after the carbonization step was temporarily allowed to cool, and then transferred to a graphitization furnace to carry out a graphitization step. In the graphitization furnace, a film-like graphite was obtained in the same manner as in Example 1C, except that under an argon atmosphere, the temperature was increased up to 2,800° C. while maintaining a temperature increase rate of about 10° C./min, held at 2,800° C. for 1 hour, and cooling was carried out to obtain a graphitized film.

Example 22C

A film-like graphite was obtained in the same manner as in Example 21C except that a polyimide film KH having a thickness of 75 μm was used as a raw film.

Example 23C

A polyimide film KH having a thickness of 50 μm was used as a raw film. In the carbonization furnace, a temperature was increased from room temperature to 1,000° C. at an average temperature increase rate of 5° C./min under a nitrogen gas atmosphere, and held for 1 hour. A carbonized film obtained after the carbonization step was temporarily allowed to cool, and then transferred to a graphitization furnace to carry out a graphitization step. In the graphitization furnace, a film-like graphite was obtained in the same manner as in Example 1C, except that under an argon atmosphere, the temperature was increased up to 2,900° C. while maintaining a temperature increase rate of about 1° C./min, held at 2,900° C. for 1 hour, and cooling was carried out to obtain a graphitized film.

Example 24C

A film-like graphite was obtained in the same manner as in Example 23C except that a polyimide film KH having a thickness of 125 μm was used as a raw film.

Comparative Example 1C

A film-like graphite (EYGS121803, thickness of 25 μm) manufactured by Panasonic Corporation was used as a comparison object.

Comparative Example 2C

A film-like graphite (EYGS121805, thickness of 50 μm) manufactured by Panasonic Corporation was used as a comparison object.

Comparative Example 3C

A film-like graphite (EYGS121810, thickness of 100 μm) manufactured by Panasonic Corporation was used as a comparison object.

Comparative Example 4C

A film-like graphite (Grafinity, thickness of 40 μm) manufactured by KANEKA CORPORATION was used as a comparison object.

Comparative Example 5C

A film-like graphite (SDK, 40 μm) manufactured by Jiangsu Sidike New Materials Science and Technology Co., Ltd. was used as a comparison object.

Comparative Example 6C

A film-like graphite (SDK, 70 μm) manufactured by Jiangsu Sidike New Materials Science and Technology Co., Ltd. was used as a comparison object.

Figure 21:
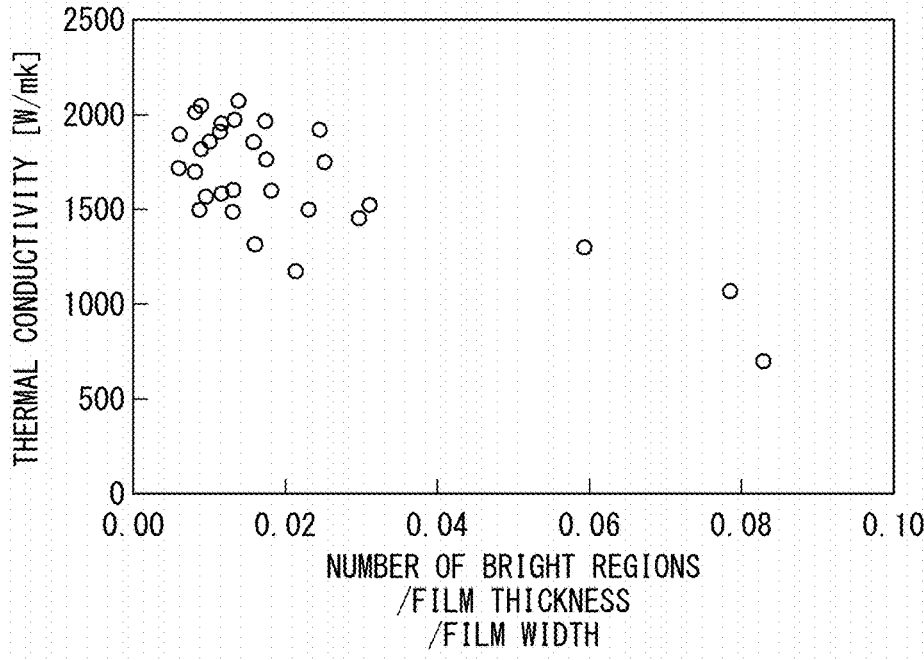
FIG. 21 is a plot diagram in which a thermal conductivity of the film-like graphite in each of Examples and Comparative Examples is plotted with respect to the number N of a plurality of bright regions/film thickness H (μm)/film width W (μm).
Figure 22:
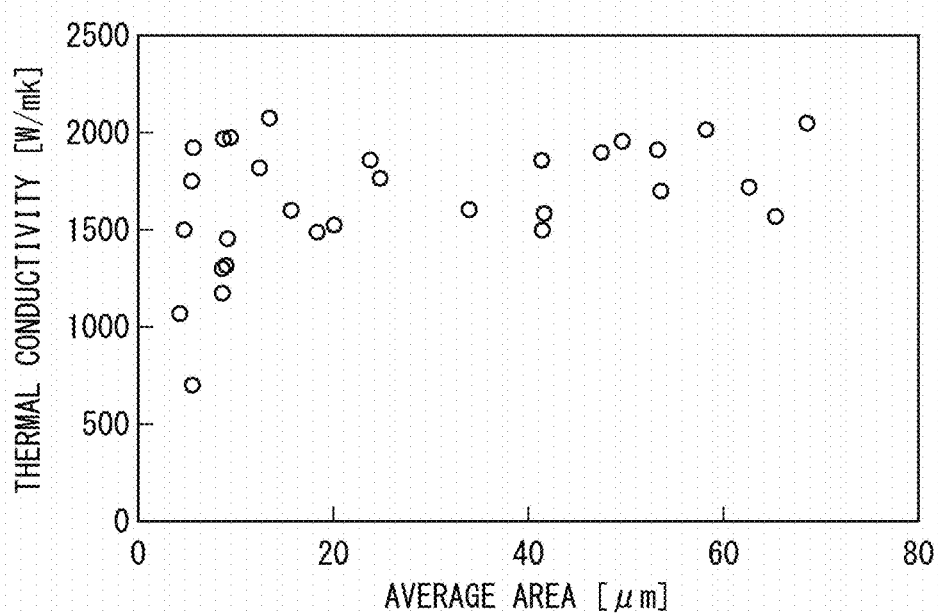
FIG. 22 is a plot diagram in which a thermal conductivity of the film-like graphite in each of Examples and Comparative Examples is plotted with respect to an average area of the plurality of bright regions.

The test results of the film-like graphite obtained in each of Examples and Comparative Examples were shown in Table 4. In addition, plots of the thermal conductivity of the film-like graphite of each of Examples and Comparative Examples with respect to the number N of the plurality of bright regions/film thickness H (μm)/film width W (μm) (CN) are shown in FIG. 21, and plots of the thermal conductivity of the film-like graphite in each of Examples and Comparative Examples with respect to the average area (AS) of the plurality of bright regions are shown in FIG. 22.

on a surface of the film-like graphite of Example 3C, the thermal decomposition gas was generated inside the film in

TABLE 4

| | Thickness of film-like graphite [μm] | CN [—] | AS [—] | Surface area/film area [—] | Thermal conductivity [W/m · K] | Minimum bending radius [mm] | Folding number [times] | $S_g/S_m$ |
|---|---|---|---|---|---|---|---|---|
| Example 1C | 68 | 0.013 | 18.3 | 1.06 | 1488 | — | | 0.87 |
| Example 2C | 62 | 0.010 | 23.8 | 1.07 | 1859 | 4 | 50,000 or more | 0.85 |
| Example 3C | 84 | 0.021 | 8.6 | 1.13 | 1174 | 4 | | 0.92 |
| Example 4C | 97 | 0.016 | 9.0 | 1.06 | 1315 | 4 | | 0.93 |
| Example 5C | 87 | 0.009 | 12.4 | 1.06 | 1819 | 8 | | 0.87 |
| Example 6C | 106 | 0.017 | 8.7 | 1.05 | 1968 | 10 | | 0.87 |
| Example 7C | 55 | 0.017 | 24.8 | — | 1764 | — | | 0.86 |
| Example 8C | 67 | 0.006 | 47.5 | — | 1898 | — | | 0.90 |
| Example 9C | 62 | 0.009 | 41.5 | — | 1497 | 4 | | 0.96 |
| Example 10C | 58 | 0.030 | 9.2 | 1.17 | 1454 | 2 | | 0.94 |
| Example 11C | 22 | 0.024 | 5.7 | 1.08 | 1923 | 1 | | |
| Example 12C | 39 | 0.03 | 5.5 | 1.07 | 1750 | 1 | | |
| Example 13C | 67 | 0.01 | 41.6 | 1.18 | 1583 | 2 | | |
| Example 14C | 88 | 0.02 | 41.4 | 1.15 | 1857 | 2 | | |
| Example 15C | 102 | 0.01 | 68.6 | 1.18 | 2048 | 1 | 50,000 or more | 0.92 |
| Example 16C | 126 | 0.01 | 58.2 | 1.09 | 2014 | 1 | 50,000 or more | 0.88 |
| Example 17C | 66 | 0.01 | 53.6 | 1.05 | 1699 | 2 | | |
| Example 18C | 82 | 0.01 | 53.3 | 1.04 | 1912 | 4 | | |
| Example 19C | 97 | 0.01 | 62.7 | 1.09 | 1718 | 1 | 50,000 or more | 0.89 |
| Example 20C | 116 | 0.01 | 49.6 | 1.05 | 1955 | 3 | 20,000 to 30,000 | 0.93 |
| Example 21C | 27 | 0.01 | 65.4 | 1.19 | 1568 | 2 | | |
| Example 22C | 38 | 0.01 | 33.9 | 1.21 | 1602 | 1 | | |
| Example 23C | 22 | 0.01 | 13.5 | 1.04 | 2074 | More than 16 | | |
| Example 24C | 60 | 0.01 | 9.5 | 1.04 | 1975 | More than 16 | | |
| Comparative Example 1C | 25 | 0.02 | 15.7 | 1.14 | 1600 | Less than 1 | | — |
| Comparative Example 2C | 50 | 0.059 | 8.6 | 1.16 | 1300 | Less than 1 | | — |
| Comparative Example 3C | 100 | 0.083 | 5.6 | 1.19 | 700 | Less than 1 | | — |
| Comparative Example 4C | 40 | 0.023 | 4.7 | 1.10 | 1500 | Less than 1 | | — |
| Comparative Example 5C | 40 | 0.031 | 20.1 | 1.65 | 1525 | Less than 1 | | — |
| Comparative Example 6C | 70 | 0.079 | 4.3 | 1.27 | 1068 | Less than 1 | | — |

As shown in Table 4 and FIG. 21, as the number N of the plurality of bright regions/film thickness H (μm)/film width W (μm) (CN) decreases, the thermal conductivity of the film-like graphite tends to increase. In each of Examples 1C, 2C, 5C, 8C, 9C, 13C, and 15C to 24C in which CN is 0.015 or less, the thermal conductivity of the film-like graphite was high, and the heat dissipation performance was particularly excellent.

Similarly, as shown in FIG. 22, as the average area (AS) of the plurality of bright regions (AS) increases, the thermal conductivity of the film-like graphite tends to increase. In each of Examples 2C, 7C to 9C, and 13C to 22C in which AS is 22 $\mu m^2$ or more, the thermal conductivity of the film-like graphite was high, and the heat dissipation performance was particularly excellent.

In addition, the film-like graphite in each of Examples 1C to 6C, 10 to 17C, and 19 to 22C in which (surface area/film area) is 1.05 or more had a small minimum bending radius and was excellent in flexibility. As shown in FIG. 23, it is considered that since cracks and unevenness were confirmed the graphitization step, and voids were formed between the graphite crystallites, which causes flexibility to be improved.

[Raw Film]

In all of the following examples, a polyimide film of Kapton (registered trademark) H type manufactured by DU PONT-TORAY CO., LTD. (hereinafter, referred to as "PIKH") was used as a raw film.

[Heat Diffusion Rate]

A heat diffusion rate (a) of the film-like graphite in the direction along the film plane was measured in an environment of 23° C., using Thermowave Analyzer TA33 manufactured by BETHEL Co., Ltd., by a periodic heating method according to JIS R 7240 (2018). Five measurement frequencies of 60 Hz, 70 Hz, 75 Hz, 80 Hz, and 90 Hz were used, and an average value of the heat diffusion rates individually measured at the five frequencies was used as the heat diffusion rate (a) of the film-like graphite in the direction along the film plane. During the measurement, the sample was cut out in the size of a length of 4 cm or more and 10 cm or less in a measurement direction and a length of 1.5 cm or more and 10 cm or less in a direction orthogonal to the film plane in the measurement direction, and a thickness of the cut sample was measured.

[Density]

The density d of the film-like graphite was obtained by measurement of weights of the film-like graphite in air and in ethanol to obtain a value from Expression 3.

$$d = \rho s \times Wa / (Wa - Ws) \qquad \text{Expression 3}$$

Here, each symbol in Expression 3 has the following meanings.

d: Density of the film-like graphite (g/cm³)
ρs: Density of ethanol (g/cm³)
Wa: Weight of the film-like graphite in air (g)
Ws: Weight of the film-like graphite in ethanol (g)

[Observation of Fracture Surface]

Information on an internal structure of the film-like graphite was obtained by observation on crack propagation in mode I fracture surface of the film-like graphite with a scanning electron microscope (SEM). Specifically, a rectangular sample having a short side of 10 mm or more is cut out from the film-like graphite, a depth of cut of 3 mm is made on each long side with a razor based on a straight line connecting the centers of a pair of long sides of the sample, tension was applied in the long side direction, and the crack was propagated to split the sample. The SEM observation was carried out on a fracture surface of the split sample at an acceleration voltage of 10 kV with a contrast at which the sample cross-section and the background part could be distinguished. In addition, the fracture surface was observed a plurality of times while changing the observation place so that the fracture surface could be continuously observed by 1 mm or more in the film plane direction.

[Compression Test]

In an environment of 25° C., a pressure of 100 MPa was applied to the entire film plane of the film-like graphite to compress the film-like graphite. Each of a film thickness $T_b$ (μm) of the film-like graphite before compression and a film thickness $T_a$ (μm) after compression were measured, and $T_a/T_b$ was calculated.

The press step in each of the following examples was carried out by using a hydraulic calendar embossing machine manufactured by Yuri Roll Co., Ltd. in accordance with the following procedures. A graphitized film was sandwiched between commercially available polyimide films and compressed under conditions of a linear pressure of 900 kg/cm to 2,700 kg/cm and a roll rotation speed of 0.5 m/min. Compression was repeated until a difference in film thickness before and after compression was within 1 μm. The linear pressure was defined as a value obtained by dividing a load of rolls by a length in a roll width direction of the graphitized film inserted into the rolls.

Example 1D

A 20% by mass N-methyl-2-pyrrolidone solution containing 20% by mass of a polyamic acid obtained by polymerization of oxydianiline and pyromellitic anhydride was applied to one surface of a polyimide film of PIKH having a thickness of 75 μm. Another polyimide film of PIKH having a thickness of 75 μm was bonded to the solution-applied surface of the polyimide film, and a mangle was used to remove an excess solution. The bonded films were placed under a nitrogen atmosphere at normal pressure, the temperature was increased at an average temperature increase rate of 2° C./min up to 350° C. and held for 1 hour, and the films were then allowed to cool, thereby obtaining a laminated film having a thickness of 150 μm, which was formed of two polyimide films having a thickness of 75 μm with the polyimide films firmly adhered. This laminated film was used as a raw film.

Figure 24:
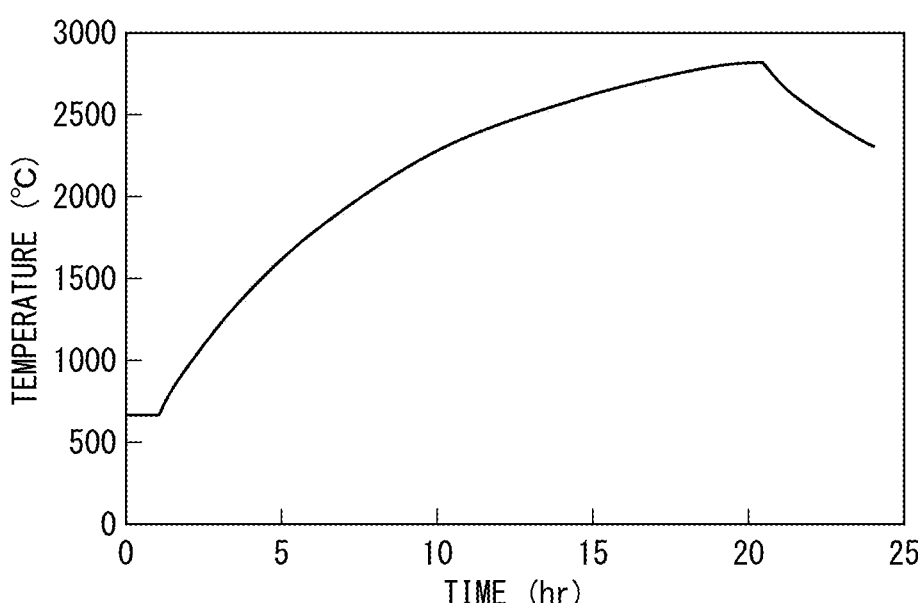
FIG. 24 is a temperature record of a graphitization step of Example 1D.

A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in an organic gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A film obtained after the carbonization step was temporarily allowed to cool, and then transferred to a graphitization furnace to carry out a graphitization step. In the graphitization furnace, a power output value of the graphitization furnace was set to a constant value, the temperature was increased to achieve the temperature record shown in FIG. 24, and cooling was then carried out to obtain a graphitized film.

The obtained graphitized film was sandwiched between two polyimide films and compressed 7 times under conditions of a linear pressure of 900 kgf/cm and a roll rotation speed of 0.5 m/min to obtain a film-like graphite.

[Raw Film]

In all of the following examples, a polyimide film of Kapton (registered trademark) H type manufactured by DU PONT-TORAY CO., LTD. (hereinafter, referred to as "PIKH") was used as a raw film.

[Heat Diffusion Rate]

A heat diffusion rate (α) of the film-like graphite in the direction along the film plane was measured in an environment of 23° C., using Thermowave Analyzer TA33 manufactured by BETHEL Co., Ltd., by a periodic heating method according to JIS R 7240 (2018). Five measurement frequencies of 60 Hz, 70 Hz, 75 Hz, 80 Hz, and 90 Hz were used, and an average value of the heat diffusion rates individually measured at the five frequencies was used as the heat diffusion rate (α) of the film-like graphite in the direction along the film plane. During the measurement, the sample was cut out in the size of a length of 4 cm or more and 10 cm or less in a measurement direction and a length of 1.5 cm or more and 10 cm or less in a direction orthogonal to the film plane in the measurement direction, and a thickness of the cut sample was measured.

[Density]

The density d of the film-like graphite was obtained by measurement of weights of the film-like graphite in air and in ethanol to obtain a value from Expression 3.

$$d = \rho s \times Wa / (Wa - Ws) \qquad \text{Expression 3}$$

Here, each symbol in Expression 3 has the following meanings.

d: Density of the film-like graphite (g/cm³)
ρs: Density of ethanol (g/cm³)
Wa: Weight of the film-like graphite in air (g)
Ws: Weight of the film-like graphite in ethanol (g)

[Observation of Fracture Surface]

Information on an internal structure of the film-like graphite was obtained by observation on crack propagation in mode I fracture surface of the film-like graphite with a scanning electron microscope (SEM). Specifically, a rectangular sample having a short side of 10 mm or more is cut out from the film-like graphite, a depth of cut of 3 mm is made on each long side with a razor based on a straight line connecting the centers of a pair of long sides of the sample, tension was applied in the long side direction, and the crack was propagated to split the sample. The SEM observation was carried out on a fracture surface of the split sample at an acceleration voltage of 10 kV with a contrast at which the sample cross-section and the background part could be distinguished. In addition, the fracture surface was observed a plurality of times while changing the observation place so that the fracture surface could be continuously observed by 1 mm or more in the film plane direction.

[Compression Test]

In an environment of 25° C., a pressure of 100 MPa was applied to the entire film plane of the film-like graphite to compress the film-like graphite. Each of a film thickness $T_b$ (μm) of the film-like graphite before compression and a film thickness $T_a$ (μm) after compression were measured, and $T_a/T_b$ was calculated.

The press step in each of the following examples was carried out by using a hydraulic calendar embossing machine manufactured by Yuri Roll Co., Ltd. in accordance with the following procedures. A graphitized film was sandwiched between commercially available polyimide films and compressed under conditions of a linear pressure of 900 kg/cm to 2,700 kg/cm and a roll rotation speed of 0.5 m/min. Compression was repeated until a difference in film thickness before and after compression was within 1 μm. The linear pressure was defined as a value obtained by dividing a load of rolls by a length in a roll width direction of the graphitized film inserted into the rolls.

Example 1E

A 20% by mass N-methyl-2-pyrrolidone solution containing 20% by mass of a polyamic acid obtained by polymerization of oxydianiline and pyromellitic anhydride was applied to one surface of a polyimide film of PIKH having a thickness of 75 μm. Another polyimide film of PIKH having a thickness of 75 μm was bonded to the solution-applied surface of the polyimide film, and a mangle was used to remove an excess solution. The bonded films were placed under a nitrogen atmosphere at normal pressure, the temperature was increased at an average temperature increase rate of 2° C./min up to 350° C. and held for 1 hour, and the films were then allowed to cool, thereby obtaining a laminated film having a thickness of 150 μm, which was formed of two polyimide films having a thickness of 75 μm with the polyimide films firmly adhered. This laminated film was used as a raw film.

Figure 25:
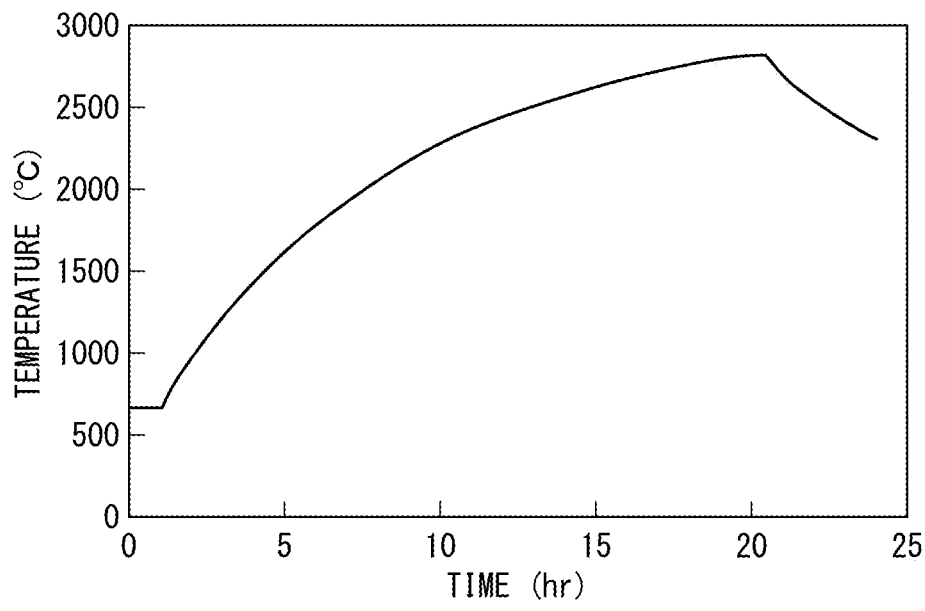
FIG. 25 is a temperature record of a graphitization step of Example 1E.

A carbonization step of carbonizing the raw film was carried out in a carbonization furnace. In the carbonization furnace, under nitrogen gas (acetylene gas concentration: 25% by volume) atmosphere including acetylene gas, a temperature was increased from room temperature to 450° C. at an average temperature increase rate of 10° C./min, and the temperature was then increased from 450° C. to 550° C. while maintaining a temperature increase rate of about 0.2° C./min (heating step in an organic gas). After the temperature was increased to 550° C., the atmosphere was changed to the nitrogen gas atmosphere, the temperature was increased to 1,000° C. while maintaining the temperature increase rate at about 10° C./min, and the temperature was held for 1 hour. A film obtained after the carbonization step was temporarily allowed to cool, and then transferred to a graphitization furnace to carry out a graphitization step. In the graphitization furnace, a power output value of the graphitization furnace was set to a constant value, the temperature was increased to achieve the temperature record shown in FIG. 25, and cooling was then carried out to obtain a graphitized film.

The obtained graphitized film was sandwiched between two polyimide films and compressed 7 times under conditions of a linear pressure of 900 kgf/cm and a roll rotation speed of 0.5 m/min to obtain a film-like graphite.

INDUSTRIAL AVAILABILITY

Industrial Applicability

According to the present invention, it is possible to provide the film-like graphite that is thick, has a high thermal conductivity, is excellent in the heat dissipation performance, and furthermore, is excellent in flexibility, with low-cost manufacturing, and the manufacturing method of the film-like graphite.

REFERENCE SIGNS LIST

1: Bright region
2: Film thickness measurement direction
3: Solid part
4: Void part While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A film-like graphite, satisfying condition (1) or condition (2):

Condition (1): a graphite crystal orientation degree P is 96% or more and less than 100% with respect to a film plane, and a thermal conductivity b is 1,550 W/mK or more; or Condition (2): a graphite crystal orientation degree P is 94% or more and less than 100% with respect to a film plane and a thickness is 42 μm or more and 250 μm or less, and a thermal conductivity b is 800 W/mK or more.

2. The film-like graphite of claim 1, further satisfying condition (5) and condition (6): condition (6), Condition (5): when a film thickness is denoted by a in μm, and a thermal conductivity is denoted by b in W/mK, in a direction along a film plane, the film-like graphite satisfies expression (1a)

$$2,140 \leq 12a + b \qquad \text{Expression (1a),}$$

Condition (6): a minimum bending radius measured in a bend test is 16 mm or less.

3. The film-like graphite of claim 1, having a thickness of 58 μm or more.

4. The film-like graphite of claim 1, having a thermal conductivity b of 800 W/mK or more in a direction along the film plane.

5. The film-like graphite of claim 1, having a density of 1.7 g/cm$^3$ or more.

6. The film-like graphite of claim 1, having an electrical conductivity of 9,000 S/cm or more in a direction along the film plane.

7. The film-like graphite of claim 1, having a multilayer structure in which a plurality of layers overlap with each other,
    wherein the multilayer structure has a width of 40 μm or more and a thickness of 8 μm or more, and
    wherein an angle between a direction of each layer constituting the multilayer structure and a direction along the film plane is 20° or less.

8. The film-like graphite of claim 7, wherein each layer constituting the multilayer structure has a large number of unevenness, and
    wherein adjacent layers are in contact with each other at a large number of positions.

9. The film-like graphite of claim 7, wherein each layer constituting the multilayer structure has a flat surface or a smooth curved surface, and
    wherein adjacent layers are in close contact with each other.

10. The film-like graphite of claim 1, wherein a minimum bending radius measured in a bend test is 16 mm or less.

11. The film-like graphite of claim 1, wherein, when a pressure of 100 MPa is applied to an entire film plane of the film-like graphite to compress the entire film plane in an environment of 25° C., a $T_a/T_b$ ratio of a film thickness $T_a$ after compression to a film thickness $T_b$ before compression is 0.7 or more.

12. The film-like graphite of claim 1, wherein in Tension-Free U-shape Folding Test, a folding number is 10,000 or more until breakage, performed at a bending radius R of 2 mm and a bending angle of 180°.

13. The film-like graphite of claim 1, having a thermal conductivity in a range of from 1 to 20 W/mK in a direction perpendicular to the film plane.

14. The film-like graphite of claim 1, wherein a surface area/film area ratio of a surface area to a film area is 1.05 or more.

15. The film-like graphite of claim 1, wherein a layer formed of an adhesive or a pressure-sensitive adhesive is not comprised in the film-like graphite in a film thickness direction.

16. The film-like graphite of claim 1, wherein an a×b product of a film thickness a in μm, and a thermal conductivity b in W/mK, in a direction along a film plane, is 88,000 or more.

17. The film-like graphite of claim 1, wherein a number N of a plurality of bright regions obtained from an image in a vertical cross-section of the film-like graphite with respect to a film plane, in which bright parts and dark parts observed in a polarization microscope image are binarized, a film thickness H in μm, and a film width W in μm satisfy expression (7) or (8) and (9)

$$N/H/W \leq 0.015 \tag{7},$$

$$N/H/W \leq 0.04 \tag{8},$$

$$H \geq 42 \tag{9}.$$

18. A lithium-ion secondary battery or an all-solid battery, comprising:
    the film-like graphite of claim 17 as a current collector or a negative-electrode active material; and
    negative-electrode current collector.

19. The film-like graphite of claim 1, wherein an average area of a plurality of bright regions obtained from an image in a vertical cross-section of the film-like graphite with respect to a film plane, in which bright parts and dark parts observed in a polarization microscope image are binarized, is 22 μm² or more, or a film thickness is 42 μm or more and the average area is 9 μm² or more.

20. A film-like graphite, satisfying condition (3) or condition (4):
    Condition (3): a film thickness a is 58 μm or more and a thermal conductivity b is 1,550 W/mK or more in a direction along a film plane; or
    Condition (4): a film thickness a is 50 μm or more, a thermal conductivity b is 1,550 W/mK or more in a direction along a film plane, and a×b≥100,000.

21. A film-like graphite, wherein an a×b product of a film thickness a in μm, and a thermal conductivity b in W/mK, in a direction along a film plane, is 88,000 or more and 500,000 or less, and a thermal conductivity b is 1,550 W/mK or more.

22. A film-like graphite, wherein a number N of a plurality of bright regions obtained from an image in a vertical cross-section of the film-like graphite with respect to a film plane, in which bright parts and dark parts observed in a polarization microscope image are binarized, a film thickness H in μm, and a film width W in μm, satisfy expression (7) or (8) and (9)

$$N/H/W \leq 0.015 \tag{7},$$

$$N/H/W \leq 0.04 \tag{8},$$

$$H \geq 42 \tag{9}.$$

23. A film-like graphite, wherein an average area of a plurality of bright regions obtained from an image in a vertical cross-section of the film-like graphite with respect to a film plane, in which bright parts and dark parts observed in a polarization microscope image are binarized, is 22 μm² or more, or
    wherein a film thickness is 42 μm or more and the average area is 9 μm² or more.

24. A method for manufacturing a film-like graphite, the method comprising:
    carbonizing a raw film made of an organic polymer to obtain a carbonized film; and
    graphitizing the carbonized film to obtain a graphitized film,
    wherein a film-like graphite that has a thermal conductivity of 800 W/mK or more and a minimum bending radius of 16 mm or less according to a bend test is manufactured from the raw film that has a thickness of 150 μm or more and 450 μm or less at a maximum value in a temperature increase range of 60° C. or higher during optional 30 minutes in a temperature increase pattern obtained by a monotonic temperature increase in a temperature increase history of 2,000° C. or higher in the graphitizing.

25. The method of claim 4, wherein a maximum heating temperature Tmax in the graphitizing is in a range of from 2,400 to 2,900° C.

26. The method of claim 24, wherein a laminated film in which two or more polymer films made of an organic polymer are bonded to each other by a pressure-sensitive adhesive or an adhesive is used as the raw film.

27. A method for manufacturing a film-like graphite, the method comprising:
    of carbonizing a raw film, made of an organic polymer and having a thickness of 70 μm or more, to obtain a carbonized film; and
    graphitizing the carbonized film to obtain a graphitized film,
    wherein the carbonizing comprises heating the raw film in a mixed gas comprising (a-1) acetylene and/or (a2) an acetylene derivative and (b) an inert gas.

28. The method of claim 27, wherein at least a part of the heating in the mixed gas is carried out at a temperature of $T_f$ or lower, wherein, in a thermogravimetric analysis in which a measurement sample made of the raw film is heated to 1,000° C. at a temperature increase rate of 10° C./min while flowing nitrogen gas at a flow velocity of 200 mL/min, and a temperature and a weight of the measurement sample are recorded, $T_f$ (C) is a highest temperature among temperatures at which a weight reduction rate, in weight (reduction per unit time,) of the measurement sample observed is 10% or more of a maximum value of the weight reduction rate.

29. The method of claim 28, wherein a period of 30 minutes or more in which an average temperature increase rate is 5° C./min or less is included in a temperature range of $T_s$ or higher and $T_f$ or lower in a temperature increase pattern obtained by a monotonic temperature increase in a temperature increase history in the heating step in the mixed gas, where in the thermogravimetric analysis, $T_s$ is a lowest temperature among temperatures of 100° C. or higher at which a weight reduction rate of the measurement sample observed is 0.8% or more of a maximum value of the weight reduction rate.

30. A manufacturing method for manufacturing a film-like graphite, the method comprising:

carbonizing a raw film, made of an organic polymer and having a thickness of 120 μm or more, to obtain a carbonized film;

graphitizing the carbonized film to obtain a graphitized film having a density of less than 1.7 g/cm$^3$; and compressing or rolling the graphitized file to obtain the film-like graphite, having a density of 1.7 g/cm$^3$ wherein an $S_g/S_m$ ratio of an area Sg of the graphitized film to an area $S_m$ of the raw film is 0.8 or more.

* * * * *